US008977600B2

(12) United States Patent
Crupi et al.

(10) Patent No.: US 8,977,600 B2
(45) Date of Patent: Mar. 10, 2015

(54) SYSTEM AND METHOD FOR CONTINUOUS ANALYTICS RUN AGAINST A COMBINATION OF STATIC AND REAL-TIME DATA

(71) Applicant: Software AG USA Inc., Reston, VA (US)

(72) Inventors: John Crupi, Bethesda, MD (US); Raj Krishnamurthy, Walnut Creek, CA (US); Deepak Alur, Fremont, CA (US); Karthic Thope, Fairfax, VA (US)

(73) Assignee: Software AG USA Inc., Reston, VA (US)

( * ) Notice: Subject to any disclaimer, the term of this patent is extended or adjusted under 35 U.S.C. 154(b) by 0 days.

(21) Appl. No.: 14/286,266

(22) Filed: May 23, 2014

(65) Prior Publication Data
US 2014/0351233 A1 Nov. 27, 2014

Related U.S. Application Data

(60) Provisional application No. 61/827,194, filed on May 24, 2013, provisional application No. 61/827,223, filed on May 24, 2013, provisional application No. 61/827,249, filed on May 24, 2013, provisional application No. 61/827,278, filed on May 24, 2013, provisional application No. 61/827,322, filed on May 24, 2013, provisional application No. 61/827,355, filed on May 24, 2013, provisional application No. 61/827,387, filed on May 24, 2013, provisional application No. 61/827,412, filed on May 24, 2013.

(51) Int. Cl.
*G06F 17/30* (2006.01)
*G06F 7/00* (2006.01)

(52) U.S. Cl.
CPC .............................. *G06F 17/30864* (2013.01)
USPC .......................... 707/688; 707/600; 707/607

(58) Field of Classification Search
CPC .......... G06F 17/30516; G06F 17/3064; G06F 17/3079
USPC .......................................... 707/600, 607, 688
See application file for complete search history.

(56) References Cited

U.S. PATENT DOCUMENTS

| 7,933,916 | B2 | 4/2011 | Dolin et al. | |
| 8,171,018 | B2 | 5/2012 | Zane et al. | |
| 8,200,612 | B2 | 6/2012 | Soylemez et al. | |
| 8,281,026 | B2 * | 10/2012 | Lankford et al. | 709/231 |
| 8,688,702 | B1 * | 4/2014 | Chapman | 707/736 |
| 2010/0250412 | A1 * | 9/2010 | Wagner | 705/31 |
| 2013/0191370 | A1 * | 7/2013 | Chen et al. | 707/718 |
| 2014/0082178 | A1 * | 3/2014 | Boldyrev et al. | 709/224 |

* cited by examiner

*Primary Examiner* — Jeffrey A Burke
(74) *Attorney, Agent, or Firm* — Posz Law Group, PLC

(57) ABSTRACT

A system for continuous analytics comprises an in-memory storage and a processor. The processor receives a query that indicates an analytic function to be performed on a combination of static data and real-time data. The processor loads the in-memory storage from a first source external to the processor with data that was stored as the static data. At the same time that the in-memory storage is already loaded with the static data, the processor continuously receives ephemeral real-time data as it is being generated by a second source external to the processor. The processor runs the analytic function from the query against the in-memory storage loaded with the first data and the real-time data that is being continuously received, in combination, to produce a result of the analytic function. The result is stored and time-stamped in the in-memory storage as an analytic cube.

15 Claims, 12 Drawing Sheets

Core RAQL Functions

| Simple | | | Aggregate | Window |
|---|---|---|---|---|
| lower | week | number | sum | lead |
| upper | week_of_month | decimal | svg | lag |
| concat | extract_date | long | min | lank |
| length | quarter | geo_distance | max | denserank |
| car_length | year | time_mask | count | correlation |
| aubstr | strToDate | | kmeans_clusters | kmeans_observations |
| split_part | day | | mean | rownumber |
| split_regex | hour | | variance | firstvalue |
| matches | minute | | stddev | lastvalue |
| month | second | | gmean | |

FIG. 4

RAQL Query Listing 401

```
      <raql outputvariable="result">
A1.   selectSymbol, extract_hour(datetime)as Hour, extract_minute(datetime) as Minute, Price,
A2.         avg(price)
A3.            over (partition by symbol, extract_year(datetime),
A4.                               extract_month(datetime),
A5.                               extract_hour(date time)

A6.            order by symbol, datetime) as RunningAvgPricePerHour
A7.   from stocks
A8.   order by symbol
      </raql>
```

| Symbol | Hour | Minute | Price | RunningAvgPricePerHour |
|--------|------|--------|-------|------------------------|
| AAPL   | 1    | 5      | 400   | 400                    |
| AAPL   | 1    | 15     | 410   | 405                    |
| AAPL   | 1    | 30     | 415   | 410                    |
| AAPL   | 1    | 59     | 420   | 415                    |
| AAPL   | 2    | 5      | 460   | 460                    |
| AAPL   | 2    | 15     | 480   | 470                    |
| AAPL   | 2    | 30     | 460   | 465                    |
| AAPL   | 2    | 59     | 475   | 470                    |

In-Memory Real-time Analytics

SYSTEM AND METHOD FOR CONTINUOUS ANALYTICS RUN AGAINST A COMBINATION OF STATIC AND REAL-TIME DATA

CROSS-REFERENCE TO RELATED APPLICATIONS

This application claims the benefit of the following Provisional applications: 61/827,194 filed May 24, 2013; 61/827,223 filed May 24, 2013; 61/827,249 filed May 24, 2013; 61/827,278 filed May 24, 2013; 61/827,322 filed May 24, 2013; 61/827,355 filed May 24, 2013; 61/827,387 filed May 24, 2013; and 61/827,412 filed May 24, 2013, all of which are expressly incorporated herein by reference.

TECHNICAL FIELD

The technical field relates in general to computer languages, and more specifically to computer languages which process data.

BACKGROUND

"Large data" is a collection of data sets that are so large that they are difficult to process using traditional database tools. "Large data" is sometimes referred to as "big data". Data sets tend to result from combinations of separate smaller sets of data. A typical approach to handling "big data" is massively parallel software running on multiples of servers, for example using a MapReduce programming model. However, this approach does not work for all applications. The problems associated with large data are of particular concern when dealing with analytics on the data.

Referring now to FIG. 13, a flow chart illustrating a conventional procedure for generating analytics will be discussed and described. FIG. 13 is a representation of a conventional process for handling large data and using analytics on the data. A data source 1301 provides data 1303 which has an a priori known data format, such as from a stock market. A process to generate conventional analytics 1321 inputs, in step 1323, a defined model for the data, such as a model for stock market data. In step 1325, the process runs the data into the pre-determined model which is known to be appropriate for the data. In step 1327, a user manually prepares queries which can be run on data in the pre-determined model. The queries are run, and the query results are displayed to the user in step 1329.

The problems emanating from this conventional process can be explained by considering two distinct areas addressed by conventional mechanisms.

The first area is Traditional Business Intelligence ("BI"). Traditional BI style systems extract data into a data warehouse or read data from a database and then analyze the highly structured data. Traditional BI systems or database systems are characterized by several problematic qualities. In these systems, data typically resides in a single highly structured source such as a database or data warehouse. Additionally, the data and data structure are tightly coupled.

Another key factor in these systems is that they required significant preparation, such as data collection, aggregation, and loading into some repository to prepare for analysis. In many cases, a large amount of data cleansing will also be required. Most of these steps are done manually.

Another concern with BI systems is that they produce static results. Analytic visualizations are bound to static data and are no longer live. Analysis and exploration are no longer attached to the original data source but instead to a snapshot of the data.

BI systems also exhibit a lack of extensibility. Analytics are limited to what is provided out of the box and cannot be dynamically extended.

BI systems are also limiting because real-time support does not exist. These systems cannot analyze real-time data that is constantly updated and pushed from the source systems.

The second area that is addressed by conventional mechanisms is Streaming Analytics. Streaming analytics systems analyze data in motion (event based) and are not designed to simultaneously analyze data in motion and data at rest. These systems are problematic because analytics is only performed on streaming or data-in-motion. Another issue with these systems is that there is an inability to efficiently process real-time data with data-at-rest. A third limitation is that these systems use cases for real-time data and are uniquely different from traditional BI analysis.

In short, conventional analytic systems are devised to either handle snapshot of transactional data or streaming data, but not both simultaneously.

One or more embodiments discussed herein can address the aforementioned problems with traditional mechanisms by not only resolving the problems and issues of performing continuous and dynamic analytics on a combination of static and real time data but also by resolving problems that occur when the data involved is exceptionally large.

SUMMARY

Accordingly, one or more embodiments provide a system, method, and/or non-transitory computer readable medium for continuous analytics run against a combination of static and real-time data.

Accordingly, an embodiment provides a system for a system for continuous analytics run against a combination of static and real-time data. The system comprises an in-memory storage and a processor. The processor is operably connected to the in-memory storage. The processor is programmed to receive, in a query engine, from a client, a query that indicates an analytic function to be performed on a combination of static data and real-time data; in response to receipt of the query that indicates the analytic function to be performed on the combination of static data and real-time data: load the in-memory storage from a first source external to the processor with data which was stored as the static data; at the same time that the in-memory storage is already loaded with the static data, continuously receive real-time data as it is being generated by a second source external to the processor, the real-time data being ephemeral; in response to the real-time data which is continuously received subsequent to receipt of the query: to temporally correlate the real-time data with existing static data in the in-memory storage, and to continuously run the analytic function from the query against, in combination, both the real-time data which is being continuously received and the existing static data which is loaded in the in memory storage and which is temporally correlated to the real-time data, to continuously produce a result of the analytic function.

According to another embodiment, the first source of the static data is from a different source than the second source of the real-time data, the combination of static data and real-time data is referenced in the query as a single variable, and the processor is further configured to determine a source of the data, the data being referenced in the single variable, and to process the data differently based on the source of the data.

According to another embodiment, the static data has a data structure different from the real-time data.

According to another embodiment, at least one of the static data and the real-time data is originated by the first or second sources respectively in a hierarchical format.

According to another embodiment, the processor is further configured to: analyze the real-time data and the existing static data which are temporally correlated, in a moving window of the real-time data, as streaming data; and discard the real-time data which has been analyzed and temporally correlated to make room for the real-time data which continues to be received.

According to another embodiment, the processor is further configured to store information about a running calculation being made by the analytic function, to re-use the information about the running calculation in continuously performing the analytic function with the real-time data which is newly received.

According to another embodiment, the combination of static and real-time data indicated in the query which is received and on which the analytic function is performed, indicates at least one of: (1) a combination of different types of static data, (2) combinations of different types of real-time data, and (3) combinations of different types of static data and real-time data; and the processor is further configured to: normalize the at least one of: (1) the combination of different types of static data, (2) the combinations of different types of real-time data, and (3) the combinations of different types of static data and real-time data, into normalized data which is stored in the in-memory storage in the form of a tuple. The analytic function which is run is applied against the normalized data stored in the in-memory storage.

According to another embodiment, the processor is further configured to store the result of the analytic function in the in-memory storage as an analytic cube for use in subsequent queries together with a time stamp in association with the result of the analytic function, as part of the analytic cube; and in response to a subsequent analytic function for the combination of static data and real-time data having a time period which includes the time stamp, re-use the result of the analytic function from the in-memory storage based on the time stamp associated therewith, as a source of data for the subsequent analytic function.

Another embodiment provides a method for continuous analytics run against a combination of static and real-time data. The method comprises: receiving, in a query engine, from a client, a query that indicates an analytic function to be performed on a combination of static data and real-time data; in response to receiving the query that indicates the analytic function to be performed on the combination of static data and real-time data: loading, by a processor, an in-memory storage from a first source external to the processor with data which was stored as the static data; at the same time that the in-memory storage is already loaded with the static data, continuously receiving, by the processor, real-time data as it is being generated by a second source external to the processor, the real-time data being ephemeral; in response to the real-time data which is continuously received subsequent to receipt of the query: temporally correlating, by the processor, the real-time data with existing static data in the in-memory storage; and continuously running, by the processor, the analytic function from the query against, in combination, both the real-time data which is being continuously received and the existing static data which is loaded in the in-memory storage and which is temporally correlated to the real-time data, to continuously produce a result of the analytic function.

Yet another embodiment provides a method for continuous analytics run against a combination of static and real-time data, comprising: by a processor, in response to a command that indicates an analytic function to be performed on at least real-time data: continuously receiving, by the processor, real-time data as it is being generated by a source external to the processor, the real-time data being ephemeral; in response to the real-time data which is continuously received subsequent to the command: continuously running, by the processor, the analytic function from the command against the at least real-time data which is being continuously received, to continuously produce a result of the analytic function; storing, by the processor, the result of the analytic function in an in-memory storage as an analytic cube for use in subsequent calculations together with a time stamp in association with the result of the analytic function, as part of the analytic cube; and in response to a subsequent calculation for the real-time data having a time period which includes the time stamp, re-using, by the processor, the result of the analytic function from the in-memory storage based on the time stamp associated therewith, together with the real-time data which is newly received, as a source of data for the subsequent calculation.

According to another embodiment, the command that indicates both the analytic function to be performed, and a combination of static data and real-time data on which to perform the analytic function; a source of the static data is different from a source of the real-time data, the combination of static data and real-time data is referenced in the command as a single variable, and further comprising determining, by the processor, a source of the data being analyzed by the analytic function, the data being referenced in the single variable; and processing, by the processor, the data differently based on the source of the data.

According to another embodiment, the subsequent calculation is a running calculation being made by the analytic function, further comprising continuously performing the analytic function.

According to another embodiment, the subsequent calculation is made in response to a subsequent command that indicates a second analytic function to be performed on the at least real-time data.

Another embodiment provides a non-transitory computer readable medium, which can perform a method according to one or more of these embodiments.

One, or a combination of more than one, or all, of the above embodiments, can be combined and provided in a single embodiment.

Moreover, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the embodiments.

FIG. 3 is a table of core RAQL functions.

FIG. 4 is an example of a RAQL query listing.

FIG. 5 is an example of an output table from a RAQL query listing.

DETAILED DESCRIPTION

I. Introduction

Figure 1:
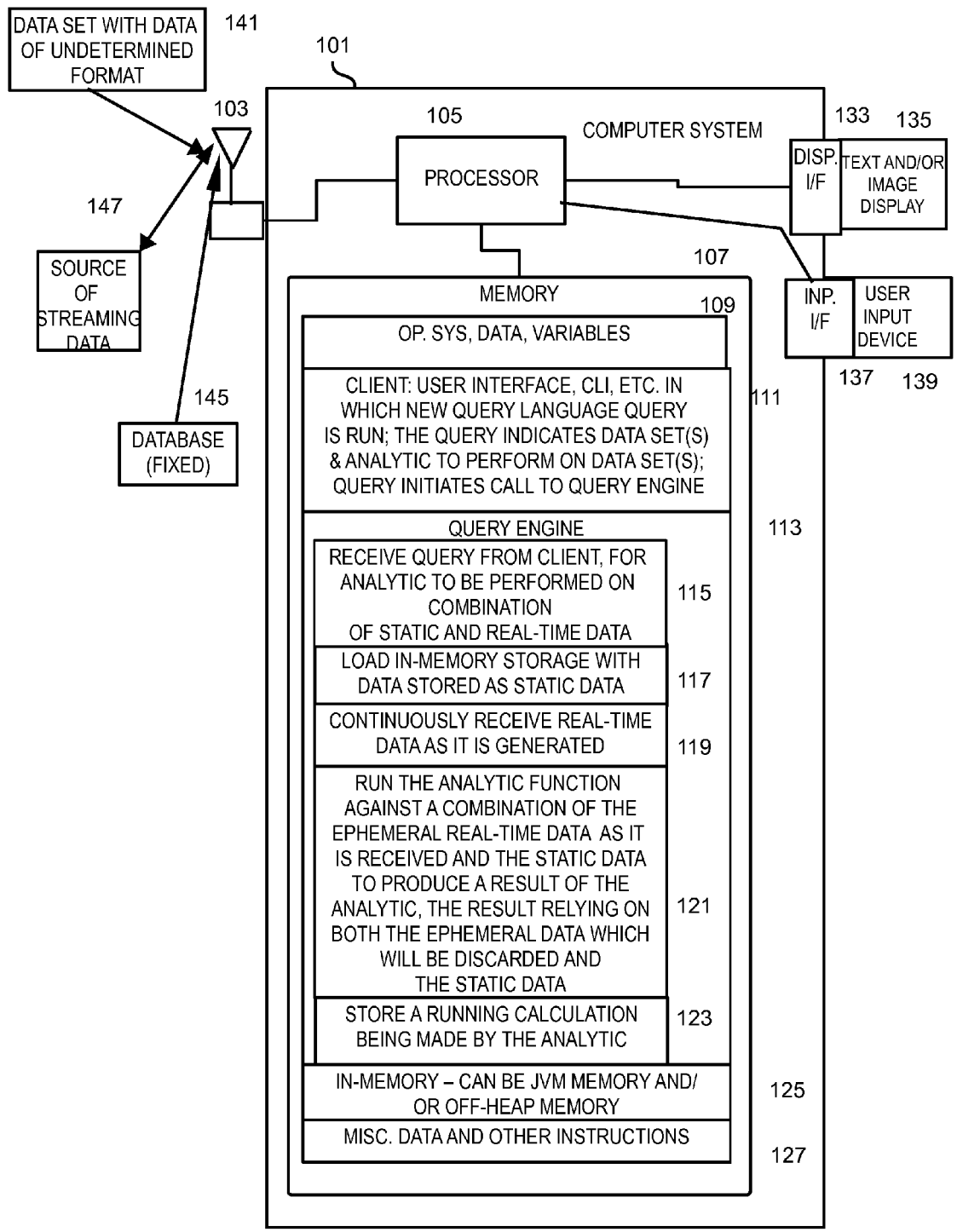
FIG. 1 is a block diagram illustrating portions of a computer system.

In overview, the present disclosure concerns computer systems, sometimes referred to as client/server networks, such as may be associated with computer systems providing apps. Such computer systems often involve running an app on a user's computer that invokes a web service providing live data. More particularly, various inventive concepts and principles are embodied in systems, devices, and methods therein for providing a computer language and/or underlying implementation and/or architecture useful for data analysis, optionally including discovery of data structure and/or analytics of such data, for example where the data is "big data", dynamic, real time, streaming, hierarchical, and/or the data structure is not known a priori.

The detailed description of the mechanism is explained through a detailed description of an embodiment involving the use of RAQL and EMML. While not limiting the mechanism, such discussion of RAQL and EMML is believed to provide the greatest clarity in explaining the mechanism. RAQL is merely a convenient example of a query language; the principles discussed herein can be applied to other query languages; EMML is an example of an XML markup language, which is useful for creating software applications, particularly for mashups that consume data from a variety of sources.

The present disclosure concerns a mechanism to continuously analyze data which is based on a combination of static (non-changing) temporal data and real-time temporal data (data that is continuously changing). Real-world operational decisions need decisions that are based on analytics derived from data that is changing and data "at rest."

Temporal data is data which contains a timestamp. The timestamp can represent the date/time of the data creation; date/time of the data collection and/or the date/time of the data analysis. As will be discussed in detail, for non-changing data, the system dynamically retrieves data from source such as a database or web service, time-stamps the data and places the data in an "in memory" store.

A query can be done, and if intermediate result sets are acquired, they can be stored into the memory with time stamps on the information. Thus, if dealing with data which changes constantly, data can be compared/analyzed on a temporal basis. Every time data is stored in the memory, it can be time stamped. Every record and every chunk of record can be time stamped. Further queries can be run on a temporal basis. For example, an initial query is done and the original time stamped results are stored; a later query is done which specifies, for example, time1 to time2. Consequently, temporal analyses and comparisons can be performed. To enable the continuous analysis of both real time and static together the mechanism can employ a Real-Time Analytic Query Language (RAQL) which will be described in detail later, a query engine and optimizer, connectors to the data sources and a declarative markup language Enterprise Mashup Markup Language (EMML). At the highest level, the RAQL query language, is similar in form to SQL, but is unique in at least three important ways First, the data that is being processed can be hierarchical (such as XML), not just tabular. Second, the source of the data represented in the query within the "from" clause can be any data source, such as a database, webservice and/or a data that is in-memory or even a messaging queue/topic. Third, the source and structure of the data does not have to be known at design time; it can be discovered and realized at query runtime.

EMML can serve as a "declarative wrapper" for the all the information needed to connect and to query the data to perform analytics and both RAQL and EMML are described in the "Welcome to the Presto Library for 3.7" in the section "Presto Analytics", currently accessible at the following weblink: http://mdc.jackbe.com/prestodocs/v3.7/raql/getStarted.html. EMML and RAQL can be written and run; or dynamically generated and run.

The instant disclosure is provided to further explain in an enabling fashion the best modes of performing one or more embodiments. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring principles and concepts, further discussion of such software and ICs, if any, will be limited to the essentials with respect to the principles and concepts used by the exemplary embodiments.

II. The Problem Observed

The primary problems associated with handling analytics and large data center around four main issues. First, it can be problematic to handle analytics on hierarchical data in the form of, for example, XML (extensible markup language) or JSON (JavaScriptObject Notation). Second, it can be challenging to deal with large data due to the nature of analytics. Third, it can be problematic to perform analytics on large data using a steaming approach where some mashups, for example, exceed their architectural limits when there are large amounts of data or steaming data being processed. Fourth, it can be difficult to run temporal based analytics on large data sets. Conventional approaches offer no practical solutions to these problems.

III. Overview of the Approach

Various inventive principles and combinations thereof are advantageously employed to provide a new analytics language that can handle large data. The language and implementation aspects to support the language and its data handling are quite different from conventional SQL.

The disclosure provides various principles that disclose the mechanism based in part on the new query language, its architecture, implementation, and abilities. The new query language may be considered to appear to be close to SQL because the new language is somewhat SQL standard oriented. However, the implementation is totally different from SQL.

The new query language can follow a standard format of SQL statements, albeit with some differences. Specifically, the new query language can follow ANSI SQL, for example SQL:2003, or other variants and evolutions such as SQL: 1999, SQL:2006, SQL:2008, SQL:2011. However, a new query language is provided herein which can resemble ANSI SQL language structure.

The new query language can be extended to hierarchical data instead of just tabular data as is handled by SQL. An embodiment can use SQL-like language with a slightly different syntax to query documents and streaming data. This can cover the ability to introduce a query against hierarchical data.

There are other differences of the new query language in comparison to SQL. For example, the UDF (user defined function) syntax and the namespace as used in the new query language is not part of SQL. There is a framework provided in the new query language to support this.

The new query language may be considered to be SQL-like, or partially SQL-compliant, in that it can use at least some of the constructs of SQL. However there are at least two major constructs that are significantly different from SQL. First, a FROM clause against hierarchical data, streaming data is used in the new query language. Second, the new query language can obtain data from a variable, versus the actual data source. For example, a streaming variable can be queried.

The new query language has an engine underneath. In an example of 10 mb of data, a tree has to be created in a conventional approach and then it can be queried. This puts lots of stress on the JVM (Java virtual machine) and memory, especially for big data. In the new query language, chunks of data can be processed instead, which avoids requiring lots of memory. The chunks can be discarded when done.

IV. Aspects of the Approach

An understanding of the features in the query language may help to clarify the mechanism. The following section discusses aspects of features, one or more of which can be included in embodiments: (1) the new query language itself, for example, new queries, new formats; (2) implementation underlying the new query language; (3) the ability to handle user-defined functions (UDF) in memory; (4) interaction with "in memory" data by the new query language; (5) the ability to support hierarchical and streaming data; (6) a functionality that works with static and real-time data; (7) the ability to run the new query language dynamically, including the ability of the new query language to discover the data format without being aware of a priori the data structures; (8) analytic data cubes for the new query language; and (9) an expanded discussion of the mechanism.

V. Detailed Discussion

1. The New Query Language, and 2. Underlying Implementation

The commands can work on hierarchical data, streaming data and/or large data sets. The format can be similar to SQL. The SQL-like statements in the new query language have a similar structure to SQL, but operate on non-SQL-like data, i.e., on non-tabular data. In SQL, one can SELECT columns from a table (as a normal statement). In comparison, in the new query language, it is not a table, but a hierarchical document or streaming data that is continuously changing. The style of SQL looks similar, but the function of SQL typically is for databases. An intention of the new query language is to be a real time analytical engine that works on variables and hierarchical data. It can also handle temporal data, streaming data, and/or large data.

With temporal data there can be a real-time nature of the data; data can be real-time; can be large data sets; and/or can be arbitrary data sets "in memory". There can be a time stamp of the record, or a single time stamp of a set of records, and/or a single time stamp on a chunk of records (also referred to as a "record chunk"). As a consequence, the mechanism using the new query language is not tied to the data source.

For the time stamping, when querying large data sets, the results are stored into "in-memory" stores. A query is done, and if intermediate result sets are acquired, they are stored into the memory with time stamps on the information. Thus, if dealing with data which changes constantly, data can be compared/analyzed on a temporal basis. Every time data is stored in the memory, it is time stamped. Every record and every chunk of record can be time stamped. Further queries can be run on a temporal basis. For example, an initial query is done and the original time stamped results are stored; a later query is done which specifies, for example, time1 to time2. Consequently, temporal analyses and comparisons can be performed.

The "in memory" storage may be characterized as a table that has a virtual column for "time stamp." The time stamp column is updated every time that record is updated. Every time that group of data is updated, the group level time stamp is updated also.

Note that the new query language puts its own time stamp in; the new query language has no expectation that data which is retrieved explicitly has its own time information.

The new query language uses a different syntax. For example, the "FROM" statement: FROM variable_name/path ("path" is optional) differs from conventional mechanisms. In SQL, there is a table name instead of a variable name ("FROM table_name"). The "FROM" clause has been extended. The "path" provides the hierarchy. For example, customer/customer/path . . . /

FROM Clause syntax
SELECT NAME, ADDRESS FROM congress/legislators/legislator
If the path is not given:
SELECT NAME, ADDRESS FROM congress
the "record path" is inferred by walking through the hierarchy of the data by looking for "repeating" nodes/elements in the data.

The new query language can query XML documents or a collection of XML documents or JSON data, for example.

The new query language can be used for querying one XML or JSON document (as an example of a simple case). The new query language can also be used for querying across multiple documents (i.e., a collection of entities). By contrast, in SQL, the statement operates on one entity.

As another example, consider a mashup that snapshots data at a period of time. The new query language can enable the mechanism to query across thousands of snapshots as they are snapshotted or while they are being snapshotted without having to load data into a database as with traditional database systems.

Internally, when the data is received, it can be normalized into a standard format, for example, a tuple format, or a format that includes a tuple, in which additional data is stored as part of the tuple. For example the XML data is changed into tuples and then stored into memory (by the engine), and the query is then applied on it. The tuple (ordered list of named values) also contains a timestamp for temporal queries. A single tuple or a set of tuples can be processed by the query language or stored in-memory and then processed by the query language.

To recap, data, for example, XML data, CSV (comma separated values) data and/or JSON data and/or other data may come in to the scope of the new query language. They can be internally normalized, for example to a tuple format. Then the new query language operation can be applied to the stored data. These normalized forms can be saved in the in-memory database and then later queried against.

A tuple can be, as an example without being limited to, Java, a normalized Java object (which is the data model for the new query language engine). Inside the tuple is: time stamp, name value (for example, a hash map).

No a priori structure is expected; there need be no required structure or canonical structure that the new query language puts data into. The tuple is not really a structure; it is an ordered list. This gives the mechanism the ability to handle any data with any structure. In SQL, by comparison, a database is both expected and required.

The new query language is schema-free (also referred to as "model-free"). The new query language can remember relevant meta data about the data as it is coming in. In SQL, schemas must be first created and then the data can be queried (in the pre-determined schema) by the SQL command. In the new query language, by contrast, the schema does not need to be created before the data is queried by the new query language command. The discovery of data source happens at the query. No pre-determined data format is stored. However, there can be a schema-helper that stores small metadata to help later. As the data arrives, the new query language can discover the data on the fly and then query it. That also allows the new query language to represent the hierarchical nature in the language.

There can be a data syntax inference engine. Regarding a hierarchical record path—the element path is optional. An inference engine can infer an element path. The high performance structure inference engine can infer the data path. In the "FROM" clause, for querying a hierarchical document, a path can be specified to whatever the record is. Sometimes these documents paths are straightforward. However, if the path is not given, the system tries to walk the hierarchy and can try to infer what the record path is most likely to be for this query. If the path is not given in the FROM clause, it tries to infer the path from the document. This is new for a query language. To "infer" the structure, the root of the path can be known, and then the hierarchy can be walked, if something repeats itself periodically, heuristics are used. This is not always correct.

For example, in the query discussed above, "SELECT NAME, ADDRESS FROM congress/legislators/legislator/path" has a full path. However, "SELECT NAME, ADDRESS FROM congress" does not have full path. In this example, the repeating elements can be used as the record to infer the path.

3. Ability to Handle User-Defined Functions (UDF) in Memory

UDF is an extension mechanism. The UDF in the new query language can work similar to an SQL UDF command. The user would implement a UDF and deploy it as a Java class to make those functions available in a UDF command. Once the function is plugged in (for example, installed), the user can access their logic. A SQL UDF is written typically in C, or PostScript.

The UDF can be hot deployed. That is, it can be automatically detected and loaded without a need for server downtime.

An example of a UDF is "SELECT, modulename.function_name. In this case, "function_name" is a user-written function. The functions can be written in accordance with known techniques. For example, there are generally three types of functions: (1) simple (scalar), (2) analytic aggregate functions, and (3) analytic windowing functions. The new query language can handle UDF by using a framework which enables users to write for the UDF. The function, which is written, is put into a framework. The framework does the work to deploy the functions. The functions can be written in Java or other languages; they can be a call to another service or they can be a call to libraries; or similar. Any of these can be conventional or known. This is a very different style of doing a UDF from that performed by SQL; SQL's UDF must operate within a known database.

In the new query language, the function is placed into the UDF framework, and then it can be called as a UDF function in an SQL-style functional call, and then it operates on the new query language type of data. This can be the tuple-formatted data, in which the grouping and temporal functions have been done to organize the data and present it to the analytic function.

In an alternate embodiment, there is a streaming UDF function which can handle streamed data. The data can be streamed in, and bottlenecks are avoided. In another embodiment, there can be a facility for intermediate interim in-memory storage. In yet another embodiment, there is hot deploy capability.

Referring now to FIG. 3, a table of core RAQL functions will be discussed and described. FIG. 3 is a table 301 that includes several examples of core RAQL functions. The functions can be categorized into one of three types of functions (for example, simple, aggregate, and window). These types of functions are discussed further below.

4. Interaction with "in Memory" Data

When the data is being streamed out of the new query language, the data can be re-directed to an "in-memory" store (sometimes referred to as an "in-memory cache"). The re-direction can be accomplished using a command, for example, an EMML statement <storeto>. Later, the system can load the data from the "in-memory" store using a LOAD statement, and the load-from data being read from the in-memory can be directed to new query language. A command, for example, an EMML statement called <loadfrom> can be used to load the information from the in-memory store. Initially, there may be a large amount of data. After the data is stored into the "in-memory" store, the new query language-based query analytics can be performed on the in-memory data.

"In-memory" refers to in-memory processing—everything happens in memory. "In-memory" can refer to off-heap memory, memory that is managed outside a Java JVM or outside the Java JVM process. In trying to overcome the bottleneck inside a process, when a process runs out of memory and fails, memory can be obtained outside the process and managed by the process itself. The memory is no longer limited to process-available memory. The "in-memory" store does not use the hard drive or outside drives. It uses only high-speed memory, for example, RAM. The "in-memory" store can span multiple RAMs and/or multiple machines.

A secondary index can be used for the in-memory store. The in-memory can be indexed so that the in-memory can be queried. For example, time-stamping allows ready access of, for example, the last 10-minutes of data. The in-memory structure can incorporate the time-based index, which can help in fast retrieval of queries that include a time-component.

The EMML streaming support is unique. The LOAD-TO and STORE-FROM commands are unique to the new query language. The in-memory usage can be done with, for example, EMML.

5. Ability to Handle Hierarchical and Streaming Data

Typically, the term "hierarchical" data refers to an XML document, JSON document, or the like. Streaming data can arrive as large data sets that do not need to be all loaded into memory at one time. The mechanism wants to carry out queries on the streaming data, but it also wants to avoid having all of the data in memory, because dealing with a huge amount of data will cause it to run out of memory.

Iteration and chunking can be used to avoid loading all of the data. Consider an example of 1 GB of large data (1 million records). The system can bring the big data into memory in "chunks" operate on the chunk, send the operated-on chunk to the client, and bring in the next chunk. This is referred to as "streaming" because it does not need to have all data in memory at the same time. This can be extremely useful for certain operations.

Some other operations do need all of the data in memory. For example, for sorting and grouping of data, when large amounts of memory are needed, it is stored so that it won't occupy all of the JVM. Also, when doing aggregate or window functions, the system can leverage streaming along with in-memory. The excess data can be stored in in-memory. The goal is to avoid, for certain types of operations (for example, filter), having all of the data in memory.

With respect to "chunking," consider 1 million records and a filter operation. The system can read each record, see if it validates, and if not successful the record is discarded/not stored anywhere. The chunk can be just one record. If the data is stored in-memory: the user can specify the chunk-size (=partition size), for example, 10,000 records. The system can read in and store the records in buckets of 10,000 tuples. The operation, for example, a filter operation, will be read in 10,000 chunks, operate on them, and then push them out to the client.

That is, the system can repeatedly validate, discard or forward depending on validation results. As a variation, the system can perform chunking before validating.

6. Functionality that Works with Static and Real-Time Data

Continuous analytics can be run against a combination of static and real-time data. In this functionality, the in-memory is loaded with data (or a database or a portion thereof). At the same time, real-time data is arriving and being processed, for example, using functionality discussed herein.

Continuous analytics can also be run against: (1) combinations of different types of static data; (2) combinations of different types of real-time data; or (3) combinations of different types of both static and real-time data.

7. Ability to Run the New Query Language Dynamically

The new query language can be dynamically generated and executed. The new query language does not need to know the data format (for example, the data schema) in advance. In comparison, SQL knows the data structure before the query is run. A part of this is a model-free functionality, in which the structure of the data can be discovered at run-time. The new query language can be generated on the fly. The new query language does not need to know the data format in advance. In comparison, SQL knows the data structure. The new query language can discover the data structure on the fly. This can come in handy if a user is doing something with a tool or application. The queries do not have to be written. The system can infer what the user is trying to do, and then can generate the query. The new query language engine (or server) has no pre-existing knowledge about the query itself.

There can be an engine that executes new query language statements. The server can run the new query language queries. The server can handle the real-time data that is coming in. If there is a database, it is just another data source (recall that new query language can obtain data from other sources); the system can invoke and get data from any other source, which becomes a data source for the new query language to run on. The new query language only needs a data source to be pointed to. Another way to point to the data source, for example, a web service or data base, is to run an actual conventional SQL to fetch the results which can then be stored in memory, to provide a data source for the new query language to start with.

It is dynamically generated and model-free. The new query language does not need any schema. The new query language can import data. Data coming from a database (for example) is not originally in a tuple format. The data is then placed into tuple format, for the query engine. For example, the data arriving from different/disparate data sources can be normalized into the above-discussed tuple format. Also, the data can be fetched in pre-defined sizes as chunks.

There can be adapters (in the new query language engine) to perform the formatting for the fetched data: convert JDBC to tuple, convert XML to tuple, convert JSON to tuple, and the like. Then the converted data can be operated on by the new query language engine. In context, the adapter knows that the data comes from, for example, XML, or example from the query, or from the query sub-type. The system can do an inference from the sub-type from the statement, and the like.

Regardless of where the data is coming from (for example, spread sheet, data base, web service or elsewhere), the system can figure out the data structure, can adapt the data to the normalized format for the new query language, and can then run the query on the data in the normalized format for the new query language.

8. Analytic Data Cubes

The system can pre-compute and store small sets of analytics about a data source that is repeatedly requested by a user. Analytic cubes can be created dynamically or in advance. Analytic cubes can be thought of as analytics which are stored in-memory for direct queries or as data provided for subsequent analytic queries. Analytic cubes are fully in-memory and are treated as an intermediate source of data for subsequent queries. For example, consider a list of transactions for stock purchases: the system can repeatedly aggregate average stock price, computer total stock price, and the like. For the analytic functions, the system can aggregate this information into a structure, which is sometimes referred to herein as an "analytic data cube" or a "mini-cube" which are the same thing. Then, instead of going through all of the data in response to a subsequent query on the data source, the system can just examine the mini-cube and retrieve the information from the mini-cube. The information stored in the mini-cube may not be 100% current, but it is good enough for further aggregations or analytics on the data source.

Consider another example: the analytics command is COUNT <data set>. Then, this command is repeated a minute later (and the count result which counts the data is stored into the mini-cube). The second time, the command performed on the same data set can retrieve the count result from the mini-cube and not go to re-count the data set. The result of the analytics command is stored in the mini-cube.

The analytics cubes can be stored as temporal data. That is, when the data is stored in one of the analytics cubes, a time stamp can be include in the analytic cube. The records themselves in the analytics cubes can also be time stamped.

Referring now to FIGS. 4 and 5, an example of a RAQL query listing and an example of an output table from a RAQL query listing, respectively, will be discussed and described. The RAQL query listing 401 in FIG. 4 illustrates the RAQL query that calculates the running (moving) average labeled aunningAvgPricePerHouf of a stock data and re-calculates the running average every hour. Line A1 shows the data that will be extracted. Line A2 shows the aggregation avg(price) which will be calculated for each time window partition is shown beginning in line A3. Lines A3 to A5 create the partition window by element and time. These lines show that the query should partition the aggregation shown in A2 by symbol, year, month and hour, which basically equates to the partition occurring every hour. Line A6 shows the order by clause with 'symbol' and 'datetime' and tells the analytic engine to calculate a running average for each symbol, by datetime. Line A6names the partition result 'RunningAvgPricePerHour' and, in this example, is calculated for a single stock which has four pricings per hour as illustrated in the table 501 in FIG. 5. The table 501 is an example of two hours worth of data.

Figure 6:
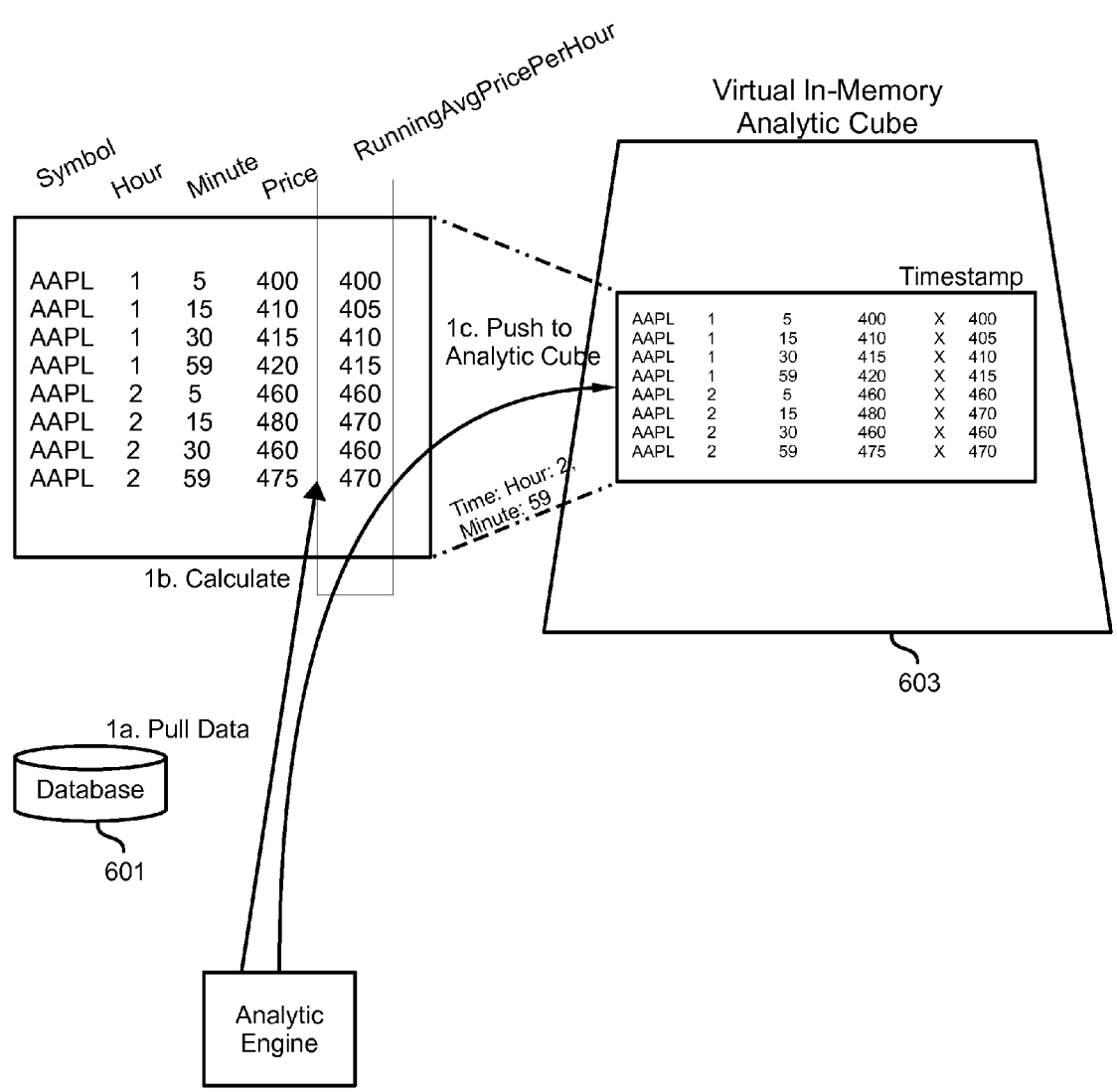
FIG. 6 is block diagram of a first batch of data retrieved from a database in a first hour and a second hour.

Referring now to FIG. 6, a block diagram of a first batch of data retrieved from a database in a first hour and a second hour will be discussed and described. FIG. 6 illustrates the first batch of data of Hour 1 and Hour 2 being retrieved from a database 601 in step 1a ("1a. Pull Data"). The retrieval gets the full eight data elements in one batch, and the query is run to calculate the aggregate data in step1b ("1b. Calculate"). In step 1c ("1c. Push to Analytic Cube"), the results are pushed into the Virtual In-memory Analytic Cube 603, which includes a time-stamp for each element. The data set in this example represents data up to Hour: 2 and Minute: 59.

Figure 7:
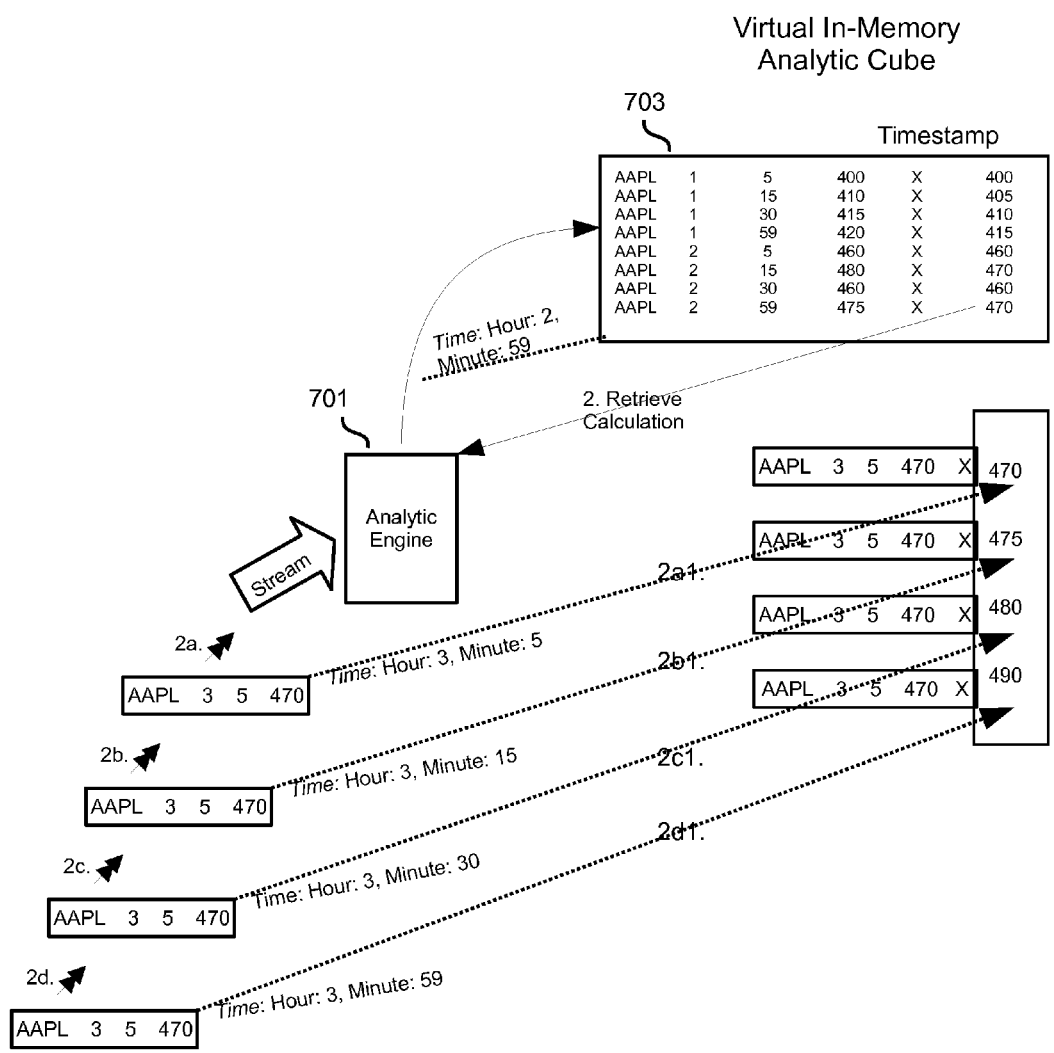
FIG. 7 is a block diagram illustrating the process of data streaming into the Analytic Engine.

Referring now to FIG. 7, a block diagram illustrating the process of data streaming into the Analytic Engine will be discussed and described. FIG. 7 illustrates how data begins streaming into the analytic engine 701. As the data stream begins, the analytic engine 701 is aware that the query is part of a continuous query (RAQL Listing 401) and the prior data and calculations (Table 501) are already stored in a Virtual In-memory Analytic Cube 703 and as part of the Query Optimizer, the analytic engine 701 knows to retrieve prior calculated values as required, as shown in step 2 ("2. Retrieve Calculation") of the block diagram in FIG. 7.

Since the data begins after the batch calculated data (Time Hour 2: Minute: 59) and the query partitions by hour, the first stream element (2a, Time: Hour: 3 Minute: 5) is processed by the analytic engine 701 and compared against prior calculated data and pushes the results into the analytic cube 703. In stream element 2b, at Time: Hour 3, Minute 15, the next data element arrives and the analytic engine 701 processes the new data against the prior data in the analytic cube 703 and pushes the new results into the analytic cube 703. This continues as long as the stream continues to arrive as shown in stream elements 2c and 2d.

Figure 8:
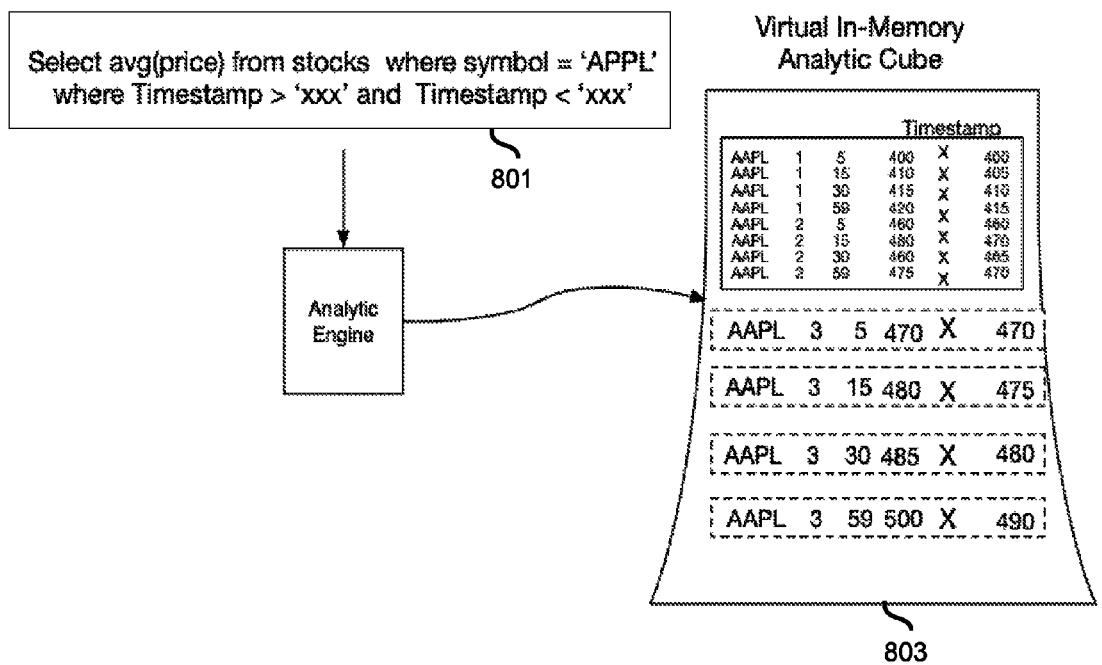
FIG. 8 is a block diagram illustrating a query that takes data from the Virtual In-Memory Data Cube.

Referring now to FIG. 8, a block diagram illustrating a query that takes data from the Virtual In-Memory Data Cube will be discussed and described. FIG. 8 includes a query 801 which, instead of calculating the data in its current place, retrieves the data from the Virtual In-Memory Data Cube 803.

Data cubes are modeled in EMML. The cubes specify assorted data sources, which may include, but are not limited to, data that is purely static (files); updatable datasets (SQL, Service); and/or real-time streaming channels. Data cubes measure aggregates and machine learning functions (kmeans, linear/logistic regression) to be computed. The measures can be computed both in batch and incrementally. Caches, such as BigMemory cache, can be associated with data cubes.

A sample EMML snippet is as follows:

```
<variable name="stocks" datafile= "stocks.xml" />
<variable name="stocks" />
<invoke outputvariable= "stocks" />
<variable name="stocks" />
<channel name= "stockStreams" outputvariable= "stocks "/>
<cube name="stocksCube>
    <datasource> stocks </datasources>
    <dimension>symbol, datetime, extract_time_units(datetime)
    </dimension>
    <measure>avg(volume), sum(volume), median(volume)
    max(open), max(close),
max(high), min(open), ...
    </measure>
    <bigmemory>stocksCache</bigmemory>
</cube>
```

The "stocks" data source elements semantically bind the cube to all three data sources in the above sample snippet (i.e., stocks.xml datafile; service that returns stock info; and stocksStreams channel).

Based on the cube definition, aggregates are computed using dimensions, and measures specifications. This involves computation of (a) whole-aggregates for static datasets and (b) incremental-aggregates for a hybrid of static and streaming datasets.

The BigMemory cache named in the cube is used for storing all states associated with the cube. This includes computed aggregates and partial computation states that aid in incremental aggregate calculation. The cube is not limited to a single cache mechanism such as the aforementioned BigMemory cache.

Regarding incremental aggregations, the UDF Framework supports, but is not limited to, Map/Reduce style paradigms to compute aggregations. This can be used for computing both whole-aggregations and incremental-aggregations. It facilitates incremental-aggregations by having functions store partial-computation state that can used in subsequent-calculations.

Sample function calls, with save and load data checkpoints are as follows:

```
UDFa.map( record1)
    s1.sum += record1.colA; s1.count += 1
UDFa.map (record2 )
    s1.sum += record2.colA; s1.count += 1
UDFa.map (record3 )
    s1.sum += record3.colA; s1.count += 1
UDFa.savePartialComputation( )
    cache.save(s1)
UDFa.reduce -> average1
    s1.sum/s1.count
        ****Code Comment: incoming new data(record4) ***
UDFa.restorePartialComputation ( )
    s1 = cache.load( )
UDFa.map(record4)
    s1.sum += record4.sum; s1.count += 1
UDFa.reduce( ) -> average2
    s1.sum/s1.count
................
```

With regard to the querying cube, the cube is referenced as a data source in RAQL for querying data. Examples include:

```
<raql query= "select avg(volume) from stocksCube group by symbol" />
<raql query= "select sum(volume) from stocksCube group by symbol" />
<raql query= "select sum(volume) from stocksCube group by datetime_hour" />
<raql query="select sum(volume) from stocksCube group by datetime_hour" />
```

With regard to the sampling cube, the cube has "sampling-based aggregation" mode, as follows:

```
<cube>
    <dimensions sampling="yes"> symbol, volume</dimensions>
</cube>
```

In sampling mode, aggregations are performed on a sampled dataset, instead of the whole dataset. This mode may be used for calculating approximate aggregates under heavy loads.

First variation. The analytic can be run on the data set behind the scenes as data is changing, and the results can be stored in mini-cubes. This avoids doing any calculations at run time, because the results have previously been calculated on the fly.

Second variation. The values for an analytic on a data source are pre-computed and stored in an analytics cube, and the process is repeated to create multiple analytics cubes. That means the results are temporal, and analytics can be performed which possible analyze temporal variations. The system can trend how the values are changing over time by having a series of analytic data cubes associated with a data source. This can provide a series of snapshots of the analytics cubes themselves. The series of snapshots, as history, can be reviewed, backward and forward, to determine what is trending.

9. Expanded Discussion of the Mechanism

RAQL can reference a variable in its queries. The variable acts as a pointer to the source of the data that is referenced by RAQL to perform the queries. The following are examples of using the same variable constructs to reference different data types and data that is at rest and streaming in motion.

The data variable that references the data can take the following forms, which are provided by way of example:

```
a.   Static Data file: CSV, XML, JSON, etc
     i.e. <variable name= "stocks" datafile= "stocks.csv" />
b.   Data source invocation: Database, Webservice, RSS/ATOM,
     Mashup, etc.
     i.e.
     <variable name= "myNews" />
     <invoke service= "CNN News" outputvariable= "myNews" />
c.   Direct database call using JDBC
     i.e. <variable name= "myInventory"/>
     <sql query="select item from inventory"
     outputvariable="myInventory"/>
d.   Data which is stored in-memory
     i.e. <variable name="InMemoryData"/>
     <loadFrom cache= "sensorDataCache"
     outputvariable="InMemoryData"/>
e.   Streaming Data in an event stream
     i.e. <variable name= "streamingData" />
     <channel name= "streamingSensorData"
     outputvariable= "streamingData" />
```

The above is explained and shown using the EMML constructs.

Data variable a. is an example of a variable which references a static data file which can be CSV, XML or JSON. The file can be located locally or remotely, as long as it is accessible to the analytic engine. The variable is given a name, in this case, "stocks" and references a CSV data file named, stocks.csv. All that may be required for variables that reference static data files is to include the "datafile" reference to the actual file name, which contains the data.

Data variable b. is an example of a variable which references a data source which requires invocation, such as a database, Webservice, REST/ATOM feed and/or a Mashup. In this example, it is a two step declaration. The first step is declaring the variable, in this example, named "myNews". The next step is invoking the service (data source) by name. In this example, the service name is "CNN News"; its endpoint ("feed://rss.cnn.com/rss/cnn_mostpopular.rss") was previously registered and given the name "CNN News" for easier reference by the analytic engine. It also provides the ability for the analytic engine to apply authorization security since the service is registered by an alias name, not its actual endpoint. The output of the data can be held in the variable named, "myNews".

Data variable c. is an example of a variable which references a database, directly as a data source using SQL. This, also, is a two step declaration. The first step is declaring the variable, named "myInventory." The next step is to use the sql construct and issue a query of which results are held in the variable named, "myInventory."

Data variable d. is an example of a variable which references data that is in-memory. This too can use two steps: the first is to declare the variable named "InMemoryData", the second is to use the "loadFrom" construct to load data from in-memory. This example loads data from a cache named, "sensorDataCache" into a variable named "InMemoryData."

Data variable e. is an example of a variable which references streaming data. It uses the "channel" construct which can reference a messaging Queue, Topic and/or any data source that provides streaming data and is referenced by the variable "streamingData."

The point in the above explanation is to illustrate the fact that different data formats, sources and types (streaming, data file and data source oriented) can all be referenced as a single variable with a name.

Once the data variable is attached to data, RAQL can perform its real-time queries and can transparently handle real-time data and static data using the same query mechanism.

RAQL takes the form of: "Select . . . from <variable> . . . ". The <variable> is any variable as described above. A characteristic of analytics against static and streaming data is demonstrated best using temporal data.

In this example, the RAQL queries work the same whether data source is A.) a Data File, B). a Data Service, or C). a Streaming Data Channel, as defined in the following. All three sources in this example will be based on stock prices.

```
A: Data file
    <variable name= "stocks" datafile="stocks.xml" />
B: Data Service
    <variable name= "stocks" />
    <invoke service= "stockService" outputvariable= "stocks"/>
C: Streaming Data Channel
    <variable name= "stocks" />
    <channel name= "stockStreams" outputvariable= "stocks"/>
```

The following RAQL queries behave the same running against the "stocks" variable irrespective of the source and the style of data (streaming or static).

```
1. Running opening-price avg by stock, year
<raql outputvariable="result" >
select symbol, datetime, open, avg(open) over (partition by symbol,
extract_year (datetime) order by symbol, datetime)
from stocks order by symbol
    </raql>
2. Running avg opening-price by stock, year, quarter
<raql outputvariable="result" >
    select symbol, datetime, quarter (datetime) as qtr, open, avg(open)
    over (partition
by symbol,
extract_year (datetime), quarter (datetime) order by symbol, datetime) as
qtr_run_avg
        from stocks
        order by symbol
    </raql>
3. Running avg opening-price by stock, year, quarter
<raql outputvariable="result" >
    select symbol, datetime, monthname(datetime) as mnth, open,
    avg(open) over
(partition by symbol, extract_year(datetime), extract_month(datetime)
order by symbol,
datetime) as mon_run_avg
        from stocks
        order by symbol
</raql>
```

Each of the above queries produces the exact same results (if the dataset contains the same data over the same time period) when running against the "stocks" variable. The underlying implementation of the analytic engine processes the data differently based on the source without requiring changes to the query itself. Specifically, the analytic engine identifies the source of the runtime data and selects the data scanner that is appropriate for data retrieval.

Figure 9:
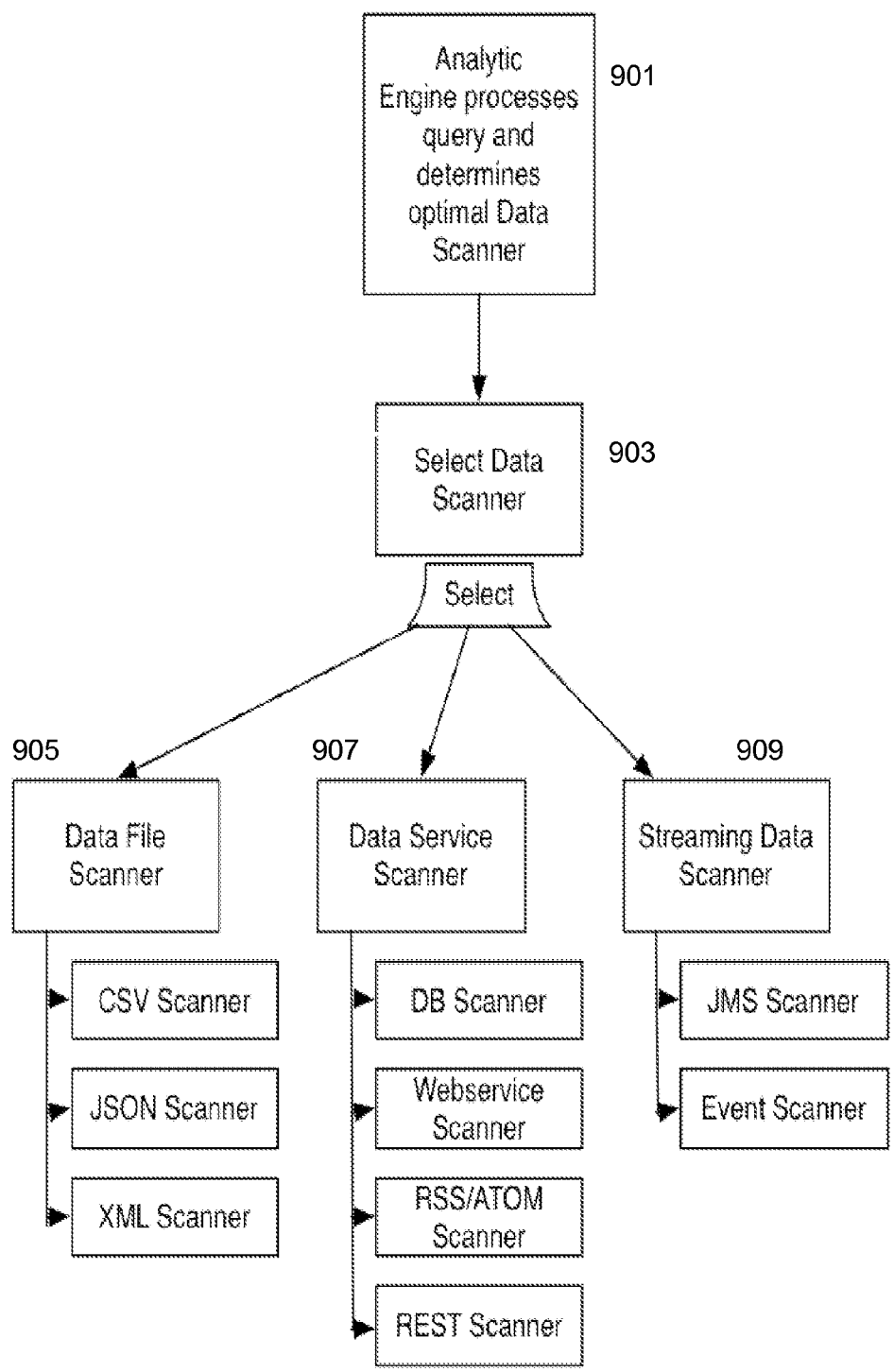
FIG. 9 is a block diagram illustrating the process flow of the analytic engine when it selects the proper data scanner referenced in the "from" variable of the RAQL query.

Referring now to FIG. 9, a block diagram illustrating the process flow of the analytic engine when it selects the proper data scanner referenced in the "from" variable of the RAQL query will be discussed and described. FIG. 9 shows the process flow of the analytic engine selecting the proper data scanner referenced in the "from" variable of the RAQL query. When the analytic engine processes 901 the query, it identifies the variable type based on runtime determination of the underlying data source. Then, it selects 903 the proper data scanner which can either be a data file scanner 905, a data service scanner 907 or a streaming data scanner 909.

If the analytic engine chooses the data file scanner 905, the engine creates a File 10 Reader and iterates over each line in the file (if CSV) or each element (if XML or JSON) using respective CSV Scanner, JSON Scanner, and/pr XML Scanner, and converts it to a Tuple format and hands off processing to the analytic engine. If the analytic engine chooses the data service scanner 907, the data source is further analyzed and the specific data scanner is selected, here represented by DB Scanner, Webservice Scanner, RSS/ATOM Scanner, and REST Scanner. If the DB Scanner is selected, a JDBC connection is established and the JDBC record iterator is handed to the analytic engine for processing. In the case of the Webservice Scanner, RSS/ATOM Scanner, and REST scanner, an HTTP or HTTPS connection is established and an iterator is handed to the analytic engine for processing. Finally, if the analytic engine detects a data variable which references streaming data, a future determination is made as to whether the source is a JMS source or an Event source which could be a proprietary event driven API.

The processing is similar between the data file scanner 905 and the data service scanner 907. The analytic engine synchronously processes the source data until the result set is complete. However, the streaming data scanner 909 processes a continuous stream of data with a scanner, herein represented by a JMS Scanner and an Event Scanner, and terminates the scan either after the stream is fully processed or a time window is defined. An example of a time window is based on the query time partition, but could be a time partition as small as a few seconds or as large as a minute, hour or days.

The in-memory is loaded with data, or a database or a portion thereof. At the same time data is arriving as it is being generated. The static data is data that has already been loaded in, and it can come from databases, real-time data which is in memory, or other data. The system can run the new query language over the data that is not changing and the new data that is coming through. Conventionally, analytic engines only work on static data, and CEP type analytic engines only work on data in motion. This system can do both at the same time.

An example of doing both at the same time could be machine-to-machine data. Machines are monitored by sensors, and the data is collected in real time to show the health; there is also historical information.

Using this, a user can say (in a situation that power consumption information is collected), for example, show me whether my power consumption in the last 5 minutes is greater than the power consumption in the last 3 months.

Figure 10:
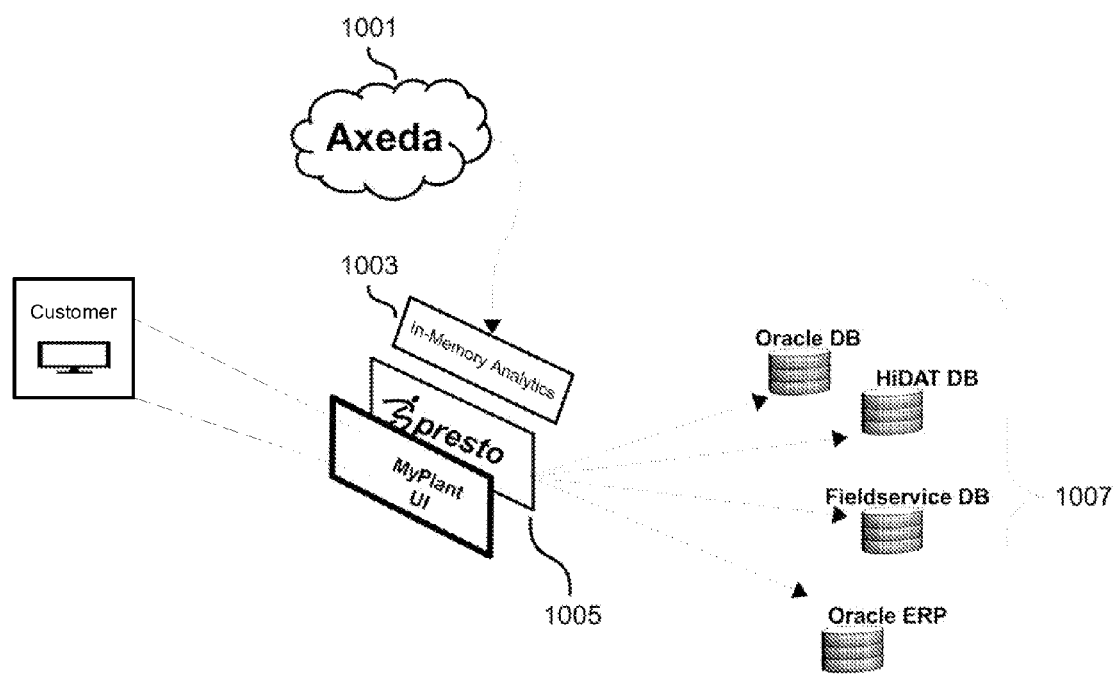
FIG. 10 is a block diagram illustrating in-memory real-time analytics using a combination of static and real-time data.

Referring now to FIG. 10, a block diagram illustrating in-memory real-time analytics using a combination of static and real-time data will be discussed and described. Entitled "In-Memory Real-Time Analytics", FIG. 10 illustrates Axeda 1001, which is an example real-time M2M cloud that is taking data off of machines being monitored. That data is coming directly into in-memory 1003. Presto 1005 is an application that is accessing the four illustrated databases 1007, and pushing that into the in-memory. The new query language can run analytics on the data that is in-memory (which is both static and real-time), using static/historical data from the four databases 1007 and real-time data which is being pushed into the in-memory 1003.

Figure 11:
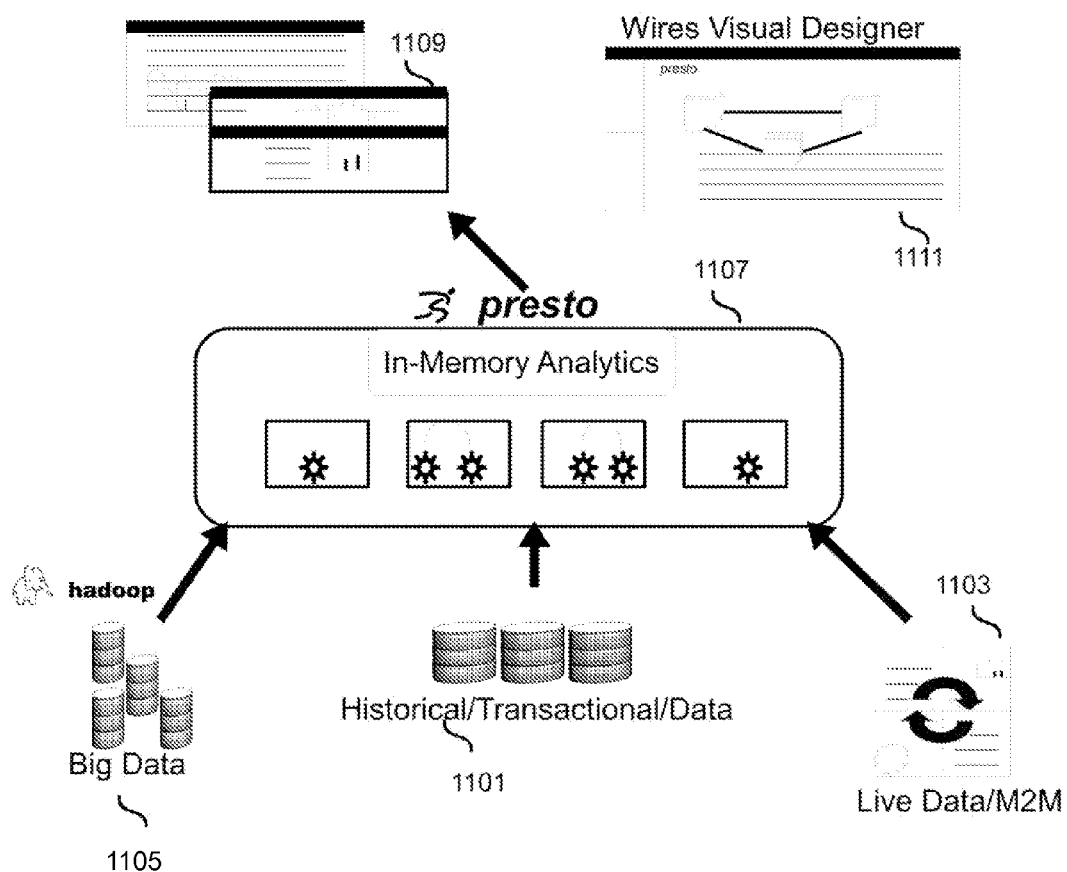
FIG. 11 is another block diagram illustrating real-time in-memory analytics using a combination of static and real-time data.

Referring now to FIG. 11, a block diagram illustrating real-time in-memory analytics using a combination of static and real-time data will be discussed and described. The example in FIG. 11, entitled "Real-Time In-Memory Analytics," illustrates historical/transactional/data 1101 retrieved from plural databases, which is static data, and stored into in-memory 1107; the live data (as real-time data) is pushed into the in-memory 1107 from an M2M source 1103, for example, as the live data is collected from the source; and Big Data 1105 is streamed in as it occurs (as real-time data). The analytics can be executed on a combination of the static and real-time data, which exists in the in-memory area 1107, to produce the results of the analytics (in this illustration, displayed on the User Interfaces 1109, 1111).

Figure 12:
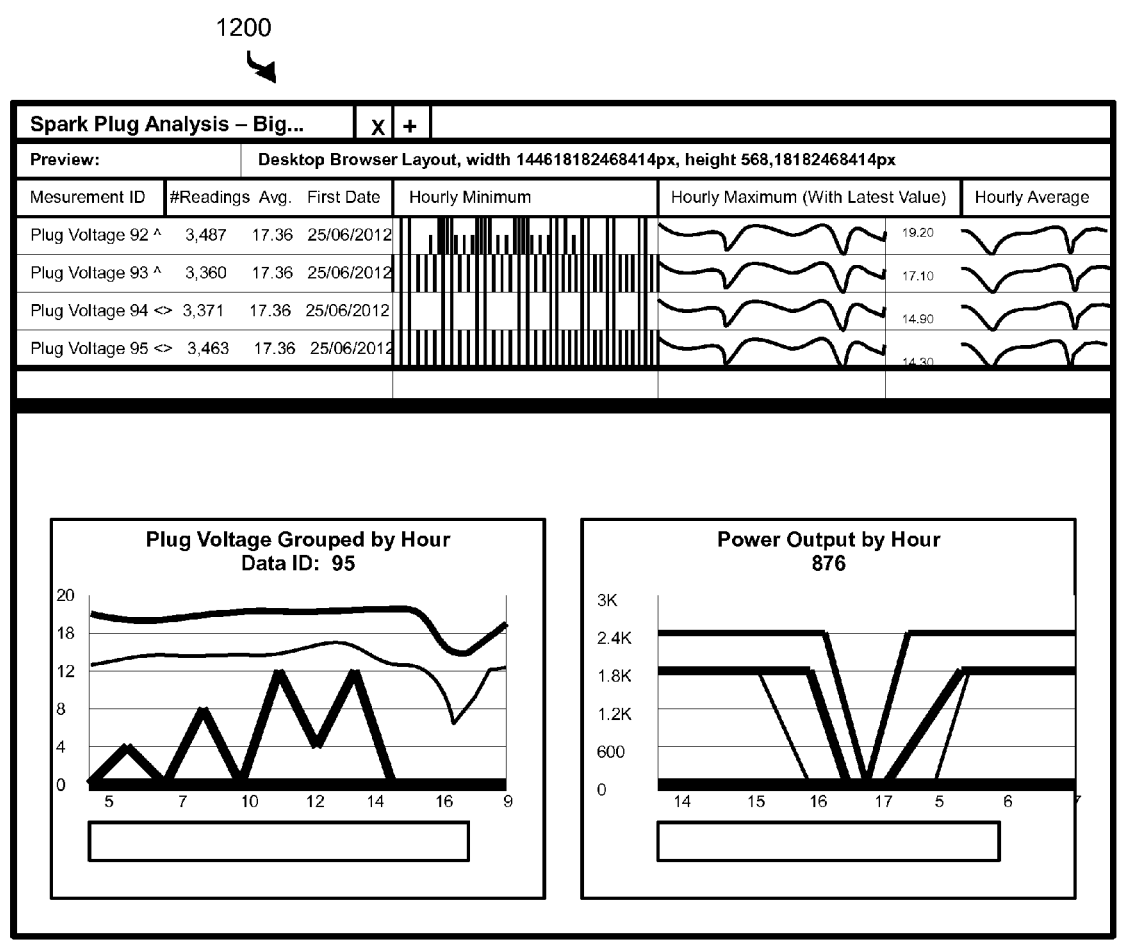
FIG. 12 is an example of a user interface illustrating real-time in-memory analytics using a combination of static and real-time data.
Figure 13:
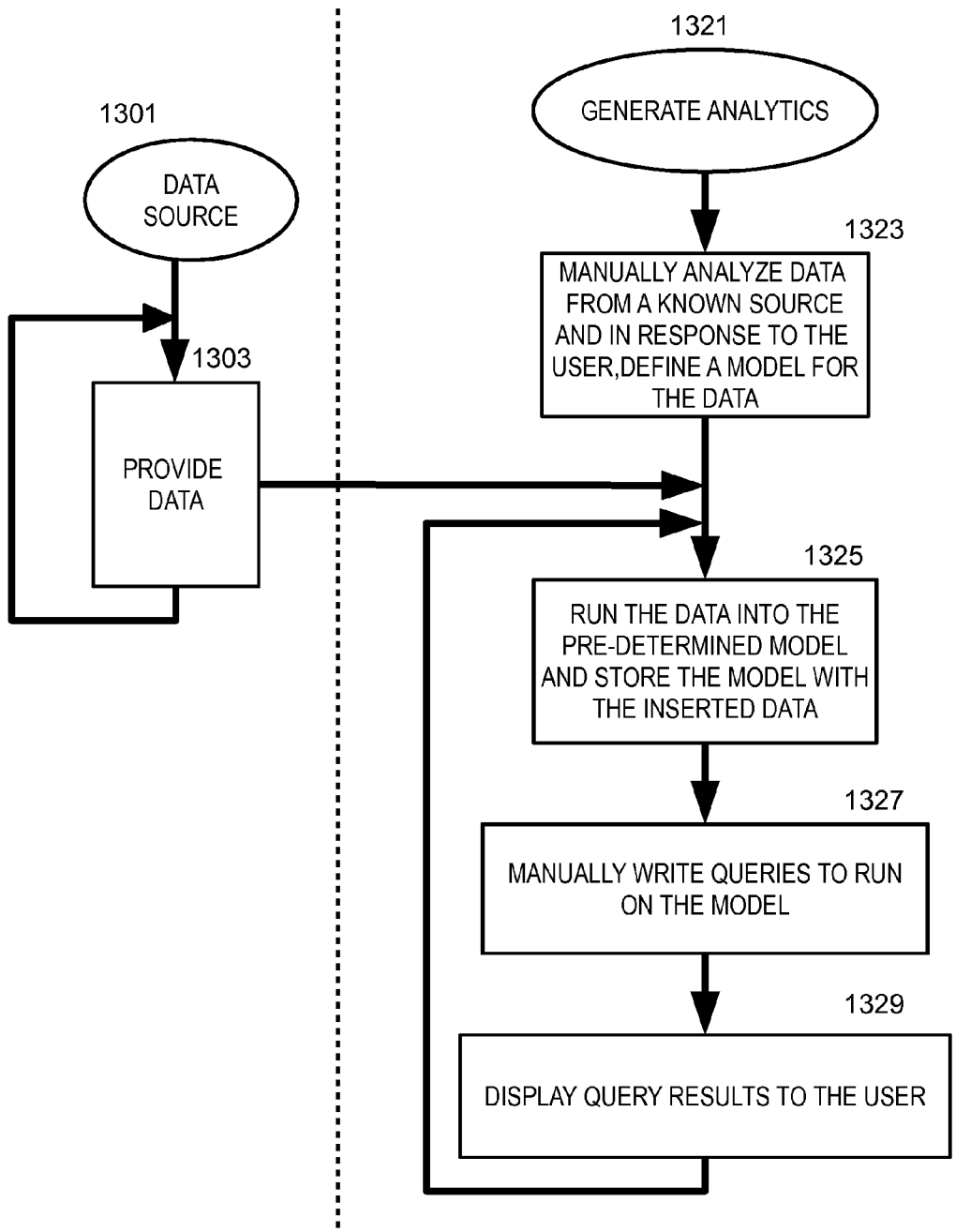
FIG. 13 is a flow chart illustrating a conventional procedure for generating analytics.

Referring now to FIG. 12, an example of a user interface 1200 illustrating real-time in-memory analytics using a combination of static and real-time data will be discussed and described. Some data is coming from historical transactional data, and some is coming from live data. This user interface 1200 illustrates output of analytics on a combination of historical and real-time data for Spark Plug Analysis. This example has 3 months of data, loaded into in-memory. The data is being examined for an hourly average, and an average by the minute. But there is also live data that is coming in, in this example from an M2M source, as it is being collected at the source. The system is able to look at the historical information and run the analytics against the live data and the historical data, in combination, to provide, for example, plug voltage grouped by hour and power output by hour, in addition to statistical charts with hourly minimum, hourly maximum (with latest value), and hourly average, and also number of readings and average by measurement ID. As real-time data is newly provided, the analytics can provide new results based on the newly provided data and the user interface 1200 can be updated to reflect the new results.

In this context, "Live data" can mean data that is coming in which is being reviewed and applied against historical information; live data has not been stored as historical data. "Live data" is not necessarily streaming data.

"Streaming data" streaming allows the data to be run over and processed as it arrives, vs. going to get the entire data set and processing it. Streaming refers to the way the data is processed. Streaming data is continuous; it continuously arrives as it continues to be generated; in some instances as a practical matter the streaming data does not stop coming. An example could be Twitter data.

"Chunking" is independent of the streaming. For example, in-memory data is not streamed because the data is already stored there. What the mechanism does is to partition the large data set into chunks which have a pre-determined size as pre-defined by the user. When it is read from the large data set in-memory, the mechanism can achieve that in-memory behavior by storing in chunks to simulate streaming; when processing that data, it reads the first chunk (of the pre-determined size) from in-memory and then process that data, reads the second chunk from in-memory and process that data, and so on. That will simulate streaming behavior from data that flows from in-memory into the new query language engine. When the "chunk" has been processed by new query language, it can be discarded from the in-memory.

"Hierarchical data" refers to the data format, to be contrasted to tabular format data.

The streaming data is processed as it arrives. The data is transient, is captured, and then analyzed and correlated with existing static data. The real-time data is correlated to the static data. Static data can be, for example, information about the devices that are being monitored such as device off/on, device characteristics, and the like. It does not get updated on a regular periodicity. The real-time data is updated/changed frequently, for example, what is the current voltage at this moment in time.

The new query language can be run on the streaming data, and/or the data can be loaded into the in-memory, and then the analytic is processed directly from the stream and/or from in-memory. The new query language provides the ability for the mechanism to run analytics on both static data and real-time data (as it arrives) simultaneously.

Regarding continuous aggregation: the analytic engine handles the new data and the static data, and stores information about the running calculation being made by the analytic engine and the current results of the analytic. What is stored might depend on the type of the analytic.

Reference is made to FIG. 1, a block diagram illustrating portions of a computer system. The computer system 101 may include a communication port and/or transceiver 103 or the like for optional communication with a data source such as a source of streaming data 147, a data set with data of undetermined format 141, and/or a database 145 (with a fixed format); a processor 105, a memory 107, a display interface 133, a display 135, an input interface 137, and/or a user input device 139 such as a keyboard, trackball, mouse, joystick, pointing device, and/or similar.

The computer system 101 can receive data of an undetermined format, for example, from one or more web services as an information-providing service as an example of streaming data 147, from a database 145, or other means to obtain data from a data source.

The illustrated communication port/transceiver 103 is representative of one or more receiver and/or transmitter and/or transceiver communication ports, for wired or wireless communication, over a computer network or communication network.

The processor 105 may comprise one or more microprocessors and/or one or more digital signal processors. The memory 107 may be coupled to the processor 105 and may comprise a read-only memory (ROM), a random-access memory (RAM), a programmable ROM (PROM), and/or an electrically erasable read-only memory (EEPROM). The memory 107 may include multiple memory locations for storing, among other things, an operating system, data and variables 109 for programs executed by the processor 105; computer programs for causing the processor to operate in connection with various functions such as a client 111 and a query engine 113; the client 111 can comprise a user interface, CLI, or the like in which a new query language query is run which indicates data set(s) and an analytic to perform on the data set(s) and the query initiates a call to the query engine; the query engine 113 can perform functions such as to receive 115 a query from the client for an analytic to be performed on a combination of static and real-time data, to load 117 in-memory storage with data stored as static data, to continuously receive 119 real-time data as it is generated, to run 121 the analytic function against a combination of the ephemeral real-time data as it is received and the static data to produce a result of the analytic which relies on both the ephemeral data which will be discarded and the static data which will remain in the in-memory storage, to store 123 a running calculation as it is continuously being made by the analytic for further use in a next iteration of the running calculation; an in-memory storage 125 which can be JVM (Java virtual machine) and/or off-heap memory; and a data storage location 127 for other information used by the processor 105. The computer programs may be stored, for example, in ROM or PROM and may direct the processor 105 in controlling the operation of the computer system 101. Each of these functions is considered in more detail elsewhere herein.

The user may invoke functions accessible through the user input device 139, and may interface with the processor 105 through an input interface 137. The user input device 139 may comprise one or more of various known input devices, such as a keyboard and/or a pointing device, such as a mouse; the keyboard may be supplemented or replaced with a scanner, card reader, voice control or other data input device; the pointing device may be a mouse, touch pad control device, track ball device, or any other type of pointing device; and the input interface 137 can be a known interface thereof to communicate with the processor 105.

The text and/or image display 135 is representative of a display that may present information to the user by way of a conventional liquid crystal display (LCD) or other visual display, and/or by way of a conventional audible device for playing out audible messages. The display interface 133 can be a known interface thereof to communicate between the processor 105 and the display 135.

Responsive to signaling from the user input device 135, in accordance with instructions stored in memory 107, or automatically upon receipt of certain information via the communication port and/or transceiver 103, the processor 105 may direct the execution of the stored programs.

The computer system 101 discussed here or elsewhere in this document can include a central processing unit (CPU) with disk drives (not illustrated), symbolic of a number of disk drives that might be accommodated by the computer. Typically, these might be one or more of the following: a floppy disk, a hard disk, a CD ROM, a digital video disk, an optical disk, a removable flash memory, or the like, or variations thereof. The number and type of drives may vary, typically with different computer configurations. Disk drives may be options, and for space considerations, may be omitted from the computer system used in conjunction with the processes described herein. The computer may also include a CD ROM reader and CD recorder, which are interconnected by a bus along with other peripheral devices supported by the bus structure and protocol (not illustrated). The bus can serve as the main information highway interconnecting other components of the computer, and can be connected via an interface to the computer. A disk controller (not illustrated) can interface disk drives to the system bus. These may be internal or external.

It should be understood that FIG. 1 is described in connection with logical groupings of functions or resources. One or more of these logical groupings may be omitted from one or more embodiments. Likewise, functions may be grouped differently, combined, or augmented without parting from the scope. Similarly the present description may describe various databases or collections of data and information. One or more groupings of the data or information may be omitted, distributed, combined, or augmented, or provided locally and/or remotely without departing from the scope.

Figure 2:
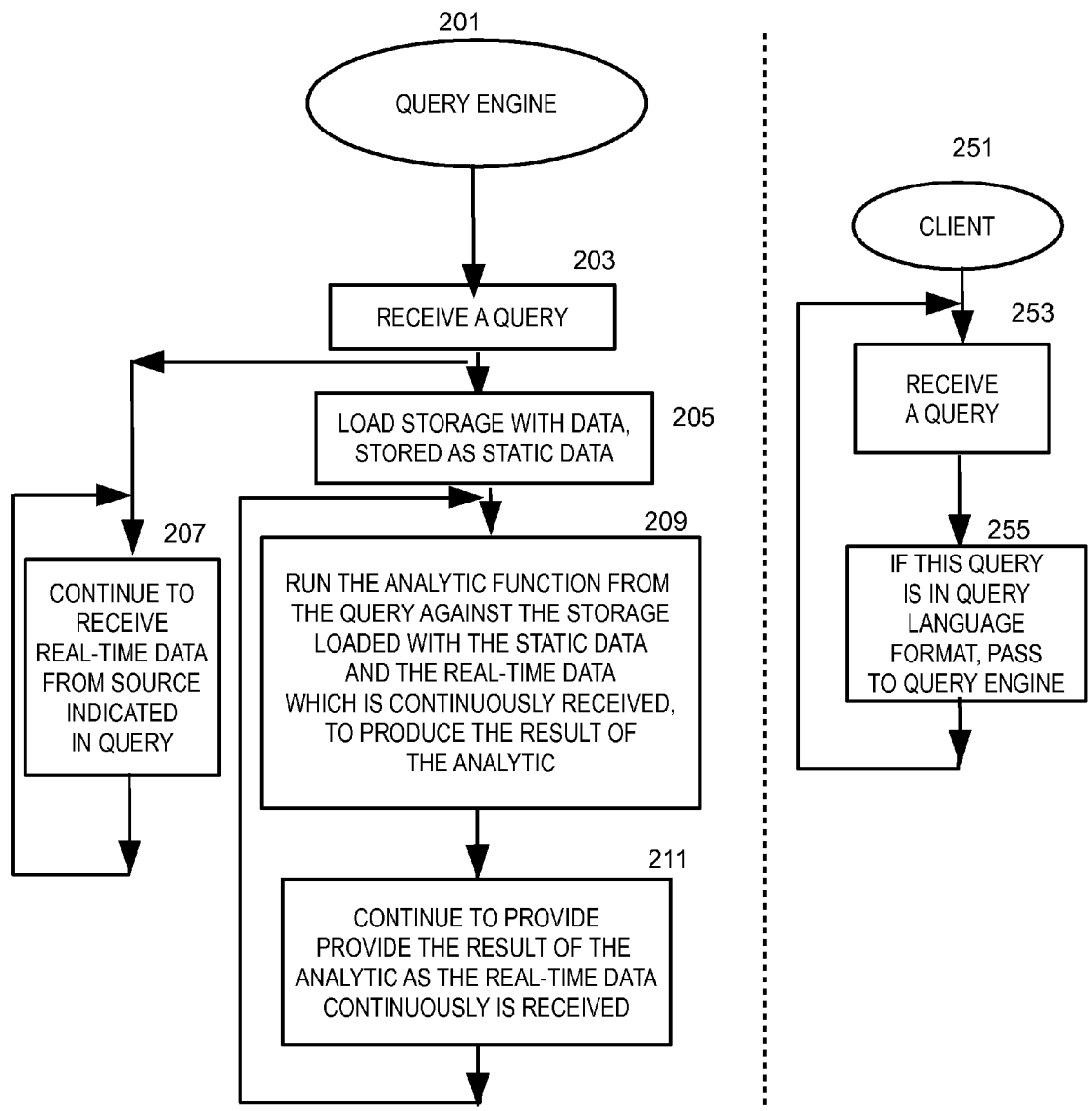
FIG. 2 is a flow chart illustrating a procedure supporting continuous analytics run against a combination of static and real-time data.

Referring now to FIG. 2, a flow chart illustrating a procedure supporting continuous analytics run against a combination of static and real-time data will be discussed and described. The procedure can be executed on the system of FIG. 1, or other hardware appropriately configured. The procedure can include both a query engine procedure 201 and a client procedure 251. The client procedure 251 can receive, in accordance with conventional techniques, a query 253. If the client procedure 251 determines 255 that the query is in the query language format, the client procedure 251 can pass the query to the query engine for handling. The query engine procedure 201 can receive 203 a query passed to it, such as from the client procedure 251. The query engine procedure 201 can load 205 a storage with data (indicated in the query on which the analytic function is to be run); the data is stored as static data. "Static data" can mean that the data will not be updated in the storage into which the query engine procedure 201 has stored it and which the query engine procedure 201 will be using for the analytic. The query engine procedure 201 can start receiving and continue 207 to receive real-time data from a data source which is also indicated in the query as another source of data for the analytic function. The query engine procedure 201 can run 209 the analytic function from the query against the storage loaded with the static data and the real-time data, which is being continuously received, to produce the result of the analytic. The query engine procedure 201 can continue 211 to provide the result of the analytic as the real-time data continuously is received and thus might be changing the result of the analytic. Note, the real-time data is continuously received in parallel with the query engine procedure 201 iteratively running the analytic function on the static and real-time data.

VI. Definitions

The claims may use the following terms, which are defined to have the following meanings for the purpose of the claims herein. Other definitions may be specified in this document.

The term "computer system" or "computer" used herein denotes a device sometimes referred to as a computer, laptop, personal computer, personal digital assistant, notebook computer, personal assignment pad, server, client, mainframe computer, or evolutions and equivalents thereof. As one example, the computer system may be a general purpose computer, or a specially programmed special purpose computer. It may be implemented as a distributed computer system rather than a single computer. Similarly, a communications link may be World Wide Web, a modem over a POTS line, data links, and/or any other wired or wireless method of communicating between computers and/or users. Moreover, the processing could be controlled by a software program on one or more computer system or processors, or could even be partially or wholly implemented in hardware.

The term "communication networks" used herein denotes those that transmit information in packets, for example, those known as packet switching networks that transmit data in the form of packets, where messages can be packetized and routed over network infrastructure devices to a destination. Such networks include, by way of example, the Internet, intranets, local area networks (LAN), wireless LANs (WLAN), wide area networks (WAN), cellular telephone networks, general packet radio service (GPRS) services, GSM (global system for mobile communications) cellular network, and others, and can be supported by networking protocols such as TCP/IP (Transmission Control Protocol/Internet Protocol) and UDP/UP (Universal Datagram Protocol/Universal Protocol) and/or other protocol structures, and variants and evolutions thereof. Such networks can provide wireless communications capability and/or utilize wireline connections such as cable and/or a connector, or similar. Any appropriate communication protocol may be used.

The term "app" is short for "application," and denotes a computer executable software program that performs a function to benefit the user. Typically the term "app" is used to refer to discrete applications that provide a single function and a simple user interface. The term "app" is sometimes used to refer to programs such as GoogleMaps. An "app" is a way to visualize a mashup. An "app" is different from an operating system that runs the computer.

The term "mashup" used herein is defined as a software application that combines pre-existing components from one or more information-providing services into a single tool which can comprise a server-side and a client-side application, where the components used by the mash-up are visually presented to a user on a display at the client-side in a manner which is different from the pre-determined presentation of the information-providing service; and is configured in accordance with standards such as Enterprise Mashup Markup Language ("EMML"), XML interchanged as REST or Web Services, RSS, Atom, and other evolutions and variations of mashup standards. A mashup is to be distinguished from a portal in which content is presented side-by-side in the manner which is the same as the pre-determined presentation of the information-providing service. The designation "component" as used in this paragraph refers to data which is retrieved by a mashup in real-time from an information-providing service. A mashup is frequently made by access to open APIs and other data sources to produce results that were not the original reason for producing the raw source data. An example of a mashup is the use of cartographic data from Google Maps to add location information to real estate data, thereby creating a new and distinct Web service that was not originally provided by either source.

The term "service", sometimes referred to herein as an "information-providing service", is used herein expressly to refer to an information-providing service that provides data from a server in a visual presentation on a display to a user, typically an application programming interface (API) or web API that can be accessed over a computer network and executed on a remote system hosting the requested services, in accordance with Extensible Markup Language messages that follow the Simple Object Access Protocol (SOAP) standard such as SOAP Version 1.2 specification, Web Services Description Language (WSDL) such as Web Services Description Language Version 2.0 Specification, Representational State Transfer (REST) constraints, and variations and evolutions thereof. An example of a service is Google Maps, a Web service or an RSS feed.

The term "live data" as used herein is defined as data that is coming in which is being reviewed and applied against historical information. Live data has not been stored as historical data. Live data is not necessarily streaming data.

The term "streaming data" as used herein is defined as data that is delivered and processed as soon as it arrives, versus going to get the entire data set and processing it. Streaming refers to the way the data is processed. Streaming data is continuous. It continuously arrives as it continues to be generated. In some instances, as a practical matter, the streaming data does not stop coming. An example could be Twitter data.

The term "chunking" as used herein is independent of the streaming. For example, in-memory data is not streamed because the data is already stored there. The mechanism partitions the large data set into chunks which have a pre-determined size as pre-defined by the user. When it is read from the large data set in-memory, the mechanism can achieve that in-memory behavior by storing in chunks to simulate streaming. Upon processing that data, it reads the first chunk (of the pre-determined size) from in-memory and then process that data, reads the second chunk from in-memory and process that data, and so on. That will simulate streaming behavior from data that flows from in-memory into the new query language engine. When the "chunk" has been processed by new query language, it can be discarded from the in-memory.

The term "hierarchical data" as used herein refers to the data format, to be contrasted to tabular format data.

The phrase "automatically without user intervention" if used in a claim is defined to mean that the particular step occurs after the step is initiated until limitations recited in the step are finished without requiring a user to provide input to a processor.

VII. Miscellaneous

The detailed descriptions, which appear herein, may be presented in terms of program procedures executed on a computer or a network of computers. These procedural descriptions and representations herein are the means used by those skilled in the art to most effectively convey the substance of their work to others skilled in the art.

Further, an embodiment has been discussed in certain examples as if it is made available by a provider to a single customer with a single site. An embodiment may be used by numerous users, if preferred, and the users can be at one or more sites.

A computer-readable storage medium is tangible and non-transitory; a computer-readable storage medium can be any of the memory or disks, such as those examples described herein, or other removable or fixed storage medium.

One or more displays for the system may be developed in connection with HTML display format. Although HTML may be the preferred display format, it is possible to utilize alternative display formats for interacting with a user and obtaining user instructions.

The system used in connection herewith may rely on the integration of various components including, as appropriate and/or if desired, hardware and software servers, applications software, database engines, server area networks, firewall and SSL security, production back-up systems, and/or applications interface software. The configuration may be, preferably, network-based and optionally utilizes the Internet as an exemplary interface with the user for information delivery.

The various databases may be in, for example, a relational database format, but other standard data formats may also be used. Windows 2007, for example, may be used, but other standard operating systems may also be used. Optionally, the various databases include a conversion system capable of receiving data in various standard formats.

The detailed description includes many specific details. The inclusion of such detail is for the purpose of illustration only and should not be understood to limit the invention. In addition, features in one embodiment may be combined with features in other embodiments of the invention. Various changes may be made without departing from the scope of the invention as defined in the following claims.

A procedure is generally conceived to be a self-consistent sequence of steps leading to a desired result. These steps are those requiring physical manipulations of physical quantities. Usually, though not necessarily, these quantities take the form of electrical or magnetic signals capable of being stored on non-transitory computer-readable media, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms such as adding or comparing, which are commonly associated with mental operations performed by a human operator. While the discussion herein may contemplate the use of an operator, a human operator is not necessary, or desirable in most cases, to perform the actual functions described herein; the operations are machine operations.

Various computers or computer systems may be programmed with programs written in accordance with the teachings herein, or it may prove more convenient to construct a more specialized apparatus to perform the required method steps. The required structure for a variety of these machines will be apparent from the description given herein.

Terms as used herein are intended to be interpreted as understood to one of skill in the art of computer languages which process data and secondarily, if not thus interpretable, then in the art of data processing and/or computer science, instead of as interpreted by a more general dictionary.

Furthermore, the networks of interest for communicating between computers onto which some embodiments may be distributed include by way of example but not limitation data and/or packet communications networks, which can provide wireless communications capability and/or utilize wireline connections such as cable and/or a connector, or similar. Any appropriate communication protocol may be used.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

VIII. Appendix—RAQL—Example Query Language

This section reproduces a guide to RAQL, which is the convenient example of a query language discussed herein. This guide was included as part of the provisional applications mentioned in the "Related Applications" section. This section is included for the sake of completeness. This section should not be interpreted to limit the embodiments to RAQL.

Contents:
Presto Analytics
Getting Started with Presto Analytics
RAQL Queries
Explore RAQL with Presto RAQL Explorer
Excape Characters for RALQ Queries
Load Data with <sql>
Load Data with <invoke>
Load Snapshot Data with <snapshot> or <raql>
Select Distinct Values
Alias Names for Columns or Calculations
Plain Functions on Select Columns
Dataset Paths, Names and Datatypes
From Subqueries
Limit the Rows Returned
Where Complex Conditions
Where Text Like Patterns
Where in Sets
Parameters in Where Clauses
Plain Functions in Where
Sort Directions and Multi-Level Sorts
Plain Functions in Sorts
Multi-Level Froup Calculations
Partitions and Windows
Running Aggregates
Number or Rank Rows
Analytic Functions for Partitions and Windows
Creating Dynamic RAQL Queries
RAQL Datatypes and Data Formats
RAQL Operators
Built-In RAQL Functions
Create and Add User-Defined Functions for RAQL
Working with the Presto Analytics In-Memory Store
Move the BigMemory Add-on to Separate Server(s) Store Data in Presto Analytics In-Memory Store Load Data from the Presto Analytics In-Memory Store Add Named In-Memory Stores for Presto Analytics
Presto Analytics Presto Analytics provides a simple method to work with 'big data' along with existing real-time, historical and transactional data to produce useful insights and intelligence delivered in visual apps that go anywhere your users need. You get the power and flexibility of mashups, a new query language to easily support your analytic needs, and the support for performant access to data, using streaming and memory management for large datasets. Try Getting Started with Presto Analytics.

What is Presto Analytics?

Business intelligence daily seems to encompass more data from very different sources: social media for your customers, increasing volumes of real-time data for monitoring operations or managing risk, plus all the traditional historical and transactional data of your organization. Managing this 'fire hose' of data and making sense of it requires:

Tools to easily combine, explore and analyze data.
An analytics toolbox to grapple with data complexity.
Many, flexible ways to visualize insights so they tell a clear, evocative story.

Presto Analytics leverages many of the existing features in Presto to do this and adds features to let you solve this problem:

Presto Analytics In-Memory Store: to handle 'big data' with good performance using streaming access and BigMemory, from Terracotta™, as an add-on to Presto to provide straight-forward, extensible, fast in-memory data management.

BigMemory can use heap and off-heap memory either in the local host for Presto, in a separate server and host or in an array of distributed servers. Server arrays provide an easily-extended architecture while off-heap memory can provide better performance, with no Java garbage collection to cause bottle necks. Streaming large datasets also removes other performance bottlenecks, such as keeping the entire dataset in Presto memory with a DOM to support XPath queries. Data is streamed in chunks (partitions) instead.

The Real-Time Analytics Query Language (RAQL) and Analytics Engine: to query large datasets in a simple but powerful way, without the overhead of a DOM, and easily apply analytic functions. Datasets use a flat, table-like structure to support queries. RAQL (pronounced) is a SQL-like query language that provides performant access and handles streaming datasets. It includes a set of built-in analytics functions and a straight-forward way to provide your own user-defined functions to meet new or unique analysis needs.

You use RAQL queries within mashups, thus leveraging the power and flexibility of mashups. Presto Analytics has extended EMML, the language for mashups, to provide streaming access to common sources for datasets as well as store datasets in or load dataset from the In-Memory Store.

Mashup Tools and the RAQL Explorer: use the RAQL Explorer to easily explore the features of RAQL syntax and the datasets you need to work with. You can also create RAQL queries for mashups in Wires, using simple graphic modelling and drag and drop blocks. Or use the full power of EMML+ RAQL in the Mashup Editor.

Once you have the mashup and RAQL queries you need to work with a dataset, simply add views and create apps or workspace apps using Presto's point-and-click wizards. New views have been added to Presto in this release as well as new capabilities for existing views covering visualization needs in more depth. Or, developers can create pluggable views and add them to Presto to meet your specific needs.

Presto Analytics: Features and Flow

Presto Analytics and RAQL give you access to datasets from a variety of sources, including:

Databases

CSV or XML files

Services addressable by URL

Presto mashables or other mashups

Presto snapshots of results for mashables or mashups

Datasets you have already loaded in the Presto Analytics In-Memory Store Users work with the final visual analytics that are published as apps or workspace apps. These apps are based on the mashups with RAQL queries and the views you choose to include in the app.

When users find and use these apps, the associated mashup is processed in Mashup Server using the EMML Engine, the Analytics Engine and any analytics functions defined in RAQL queries. They may work with datasets in the Presto Analytics In-Memory Store or directly access datasets from any supported data source.

Next Steps

For your next steps, see Getting Started with Presto Analytics, RAQL Queries and Working with the Presto Analytics In-Memory Store.

see Working with the Presto Analytics In-Memory Store. First let's take a look at a simple RAQL query.

A Basic RAQL Query

You use mashups in Presto to access and work with small or large datasets. To work with large datasets, mashups use EMML extension statements specifically designed for Presto Analytics and the RAQL query language.

To work with large datasets, a mashup must:

1. Load the dataset and give it a name.

One example loads the dataset directly from a file. You can also load data from URLs, databases, snapshots, any Presto mashable or mashup or from datasets already stored in the Presto Analytics In-Memory Store. An example can also ensure that the data is loaded using a stream. Streaming helps performance and also prevents the dataset from being treated as a document. Only RAQL queries or other RAQL extensions to EMML can work with dataset streams. This also affects what data the mashup can return in results. We will cover this in more detail a little later in Getting Started.

2. Run a RAQL query to filter, sort and analyze the dataset stream.

The <raql> extension element runs the query. The syntax for RAQL looks very similar to SQL. The congress variable holds the dataset stream and the RAQL engine automatically determines which elements from this XML file represent the rows of this dataset.

With XML datasets, you may add path information to override or clarify this auto-detection. See Dataset Paths, Names and Datatypes for more information.

The complete mashup for this example is:

```
<mashup
name="BasicQuery"xmlns="http://www.openmashup.org/schemas/v1.0/EMML"xmlns:macro="http://w
ww.openmashup.org/schemas/v1.0/EMMLMacro"xmlns:presto="http://wwwjackbe.com/v1.0/EMMLPr
estoExtensions"xmlns:xsi="http://www.w3.org/2001/XMLSchema-instance"
xsi:schemaLocation="http://www.openmashup.org/schemas/v1.0/EMML/../schemas/EMMLPrestoSpec.x
sd">
<operationname="Invoke"><presto:presto-meta name="created-using">RUI</presto:prestometa>
<presto:presto-meta name="alias">congress</presto:prestometa> <presto:presto-
metaname="filename">legislators.xml</presto:presto-meta>
<output name="result" type="document"/><variable datafile="legislators.xml"
name="congress"stream="true" subType="xml" type="document"/>
<raql outputvariable="result">select firstname, lastname, state, chamber from congress</raql>
</operation></mashup>
```

Getting Started with Presto Analytics

This topic presents basic examples to help you get comfortable with the features of Presto Analytics and the Real-Time Analytics Query Language (RAQL). Additional query techniques for RAQL are discussed in RAQL Queries and Working with the Presto Analytics In-Memory Store.

About the Real-Time Analytics Query Language Examples

Many of the example datasets used in this topic or other topics illustrating RAQL are available as either:

Files in the web-apps-home/presto/WEB-INF/classes folder in the Mashup Server.

Hosted resources at http://raw.github.com/jackbe/raql/master/data/file-name.

In a few cases, such as examples for snapshots, you must provide some initial configuration or perform some steps in Presto Hub to make the datasets used in the example available.

The example datasets used in this topic do not necessarily represent actual load or throughput requirements. Base memory settings for Presto may require tuning to provide adequate performance for actual loads. For more information, Structure, Format and Access to Datasets with RAQL Since data in large datasets may come from many different sources, the data must be in a format and structure that is supported by RAQL. Valid data formats include:

Comma-separated-values (CSV)

XML

JDBC Result Sets (from a database)

The structure of the dataset must also be flat, like a database table, containing two or more rows (records). Each row must contain at least one column with simple data. Each column must have a unique name.

JDBC result sets from database queries are always in the correct structure. For CSV and XML, however, this imposes some specific restrictions. See Supported Data Formats for RAQL for details.

You can load large datasets in a mashup from:

Files: using <variable>. Files must be in the classpath for the Mashup Server. URLs: using <directinvoke>. This can be a web service or any hosted resource with an appropriate data format.

This supports both GET and POST methods.

Any Presto mashable or mashup: using <invoke>.

Databases: using <sql>.

Snapshots of Presto Mashables or Mashups: using <snapshot>.

Datasets Stored in the Presto Analytics In-Memory Store in Big Memory: using <load>.

The RAQL Query Syntax

Once you have the dataset loaded, you can use RAQL queries to analyze and manipulate the data. RAQL is very similar to the Structured Query Language (SQL) used to access data in a database. It is:

Case-insensitive. WHERE, where and WhEre are all valid.

A focused subset of SQL features. Some SQL clauses and syntax are not found in RAQL.

Designed to handle streaming data.

Works only with flat, simple data, discussed previously in Structure, Format and Access to Datasets with RAQL. Like SQL, a RAQL query is composed of clauses.

We will explore a simple use of each query clause in this topic. See RAQL Queries for a synopsis of the valid expressions for each of these clauses along with links to other examples.

As with SQL, the Select and From clauses are required. All other clauses are optional.

The Select clause determines which columns to include in the result and can also perform analysis when it is used with either the Over clause or the Group By clause. The From clause determines which dataset to query, or can define a subquery to use as the source of data.

The Where clause filters rows from the dataset. Order By sorts rows.

The Over and Group By clauses both group dataset rows into different sets based on an expression. These groups determine the scope of rows that are used in analytic functions in the Select clause.

Over and Group By are mutually exclusive as they have different affects on the data returned by the query. The Over clause performs calculations and adds the calculations as additional columns to each row. Group By instead performs calculations and returns just the calculations for each group.

Most RAQL clauses also support the use of functions within their expressions. RAQL functions come in two varieties:

Plain functions, that perform some simple transformation to the values of a column for each row, such as upper( ) to change text to upper-case.

Analytic functions, more commonly known as aggregate or window functions, perform calculations using multiple rows in a group, partition or window defined in the Over or Group By clauses.

Aggregate analytic functions use all rows in the current scope, such as sum( ). While window analytic functions use specific rows, such as rownumber( ). These functions include simple arithmetic as well as statistical functions, machine learning functions or other analysis algorithms.

RAQL provides a set of built-in functions (plain and analytical) as well as a way for you to define your own functions. See Built-In RAQL Functions for more information. Let's try another query using CSV data and some conditions to filter rows.

Load Data with <directinvoke> and Filter Rows

Accessing files can be useful, but in most cases the datasets you want to work with come from databases or from other systems or applications. If applications provide a REST or Web Service interface, you can access and load data using <directinvoke> and the appropriate URL.

We're going to load a CSV dataset with information on global manufacturing plants that is accessible from http://raw.github.com/jackbe/raql/master/data/mfgplants.csv. Then we will use the Where clause to filter the rows the mashup should work with.

1. Login to Presto and click

RAQL Explorer in the main menu.

This is the RAQL Explorer that you can use to explore RAQL queries. You can use this tool to play with results and queries when your dataset is accessible as a file or from a URL. See Explore RAQL with the Presto RAQL Explorer for more information about this tool.

2. Enter http://raw.github.com/jackbe/raql/master/data/mfgplants.csv as the Data Source.

3. Enter plants as the Alias Name.

4. Then enter this query to see the first 20 rows of the result: select * from plants limit 20

5. Click Run. The results, showing the first 20 rows in this dataset display in a grid, something like this:

As the results show, this contains a list of manufacturing plants, by country and name, along with latitude/longitude information and statistics on the production lines at each site.

Let's add a Where clause to change the RAQL query:

1 Click Select Filter and choose Country as the column for this filter. This adds a Country field to the filters section.

1 2 Select BELGIUM and click Apply Filters. The Filters area should look something like this:

The query is updated to: select * from plants limit 20 where 1=1 and (Country in ('BELGIUM'))

3. Remove limit 20 from the query, since this limit is no longer needed. The results, shown here, now return rows for Belgium only:

Syntax points to keep in mind for this query:

The * wildcard in the Select clause works just like SQL to retrieve all columns for the dataset.

The From clause identifies the name of the variable for this dataset stream. No path is required because the CSV format of the data already fits the RAQL data model (see Structure, Format and Access to Datasets with RAQL for more information).

The Where clause shown here is a simple condition based on one column. Where clauses can:

a. Have several conditions linked by the standard logical operators: and or. See Where Complex Conditions for examples and information.

b. Use basic mathematical comparison operators as well as operators for text comparisons. See RAQL Operators for a complete list and Where Complex Conditions for examples and information.

c. You cannot currently use the standard SQL syntax for parameters in Where clause conditions, but you can build the full query itself dynamically. See Creating Dynamic RAQL Queries for an example and instructions.

If you save this query as a mashup, the mashup should look something like this:

```
<mashup
name="CSVFilter"xmlns="http://www.openmashup.org/schemas/v1.0/EMML"xmlns:macro="http://ww
w.openmashup.org/schemas/v1.0/EMMLMacro"xmlns:presto="http://wwwjackbe.com/v1.0/EMMLPres
toExtensions"xmlns:xsi="http://www.w3.org/2001/XMLSchema-instance"
xsi:schemaLocation="http://www.openmashup.org/schemas/v1.0/EMML/../schemas/EMMLPrestoSpec.x
sd"><operationname="Invoke"><presto:presto-meta name="created-using">RUI</presto:presto
meta> <presto:presto-meta name="alias">plants</presto:presto-meta><presto:presto-meta
name="endpoint
url">http://raw.github.com/jackbe/raql/master/data/mfgplants.csv</presto:presto-meta>
<output name="result" type="document"/><variable name="plants" subType="csv"
type="document"/><directinvoke outputvariable="plants" stream="true"
endpoint="http://raw.github.com/jackbe/raql/master/data/mfgplants.csv" /><raql
outputvariable="result">select * from plants where 1=1 and (Country
in("BELGIUM"))</raql></operation></mashup>
```

Some points in note in the EMML code for this mashup:
This explicitly declares a variable plants for the results from the <directinvoke> statements. The type for this variable is document with a subtype of csv. The csv subtype is only valid for dataset streams.

If you simply declare an output variable on <directinvoke> (an implicit variable), EMML creates a document-type variable which accepts only XML data and would cause an error in this case. You must explicitly declare variables to hold dataset streams.

The <directinvoke> statement has a stream attribute set to true to indicate that the results should be treated as a dataset stream. The <presto:presto-meta> elements are added by RAQL Explorer, but are not required for the mashup to run.

Use Plain Functions to Update, Select or Sort Rows

You can apply plain functions to individual columns in a dataset stream in any clause in a RAQL query. Plain functions can update data in each row in the Select clause, help to filter rows in Where conditions or help to sort results in Order By. They can also be used along with analytic functions in Over or Group By clauses or in subqueries in From clauses.

Presto includes a set of built-in plain functions. See Built-In RAQL Functions for details. You may also have additional plain, user-defined functions available. The first example uses the built-in plain function split_part in the Select clause, to split longitude and latitude data into two columns for the Manufacturing Plants dataset shown previously in Load Data with <directinvoke> and Filter Rows.

The Select clause uses the split_part function on the Location column to split the data into two separate pieces before and after a comma delimiter. The first call extracts the latitude and the second call extracts the longitude. In each case the result of the function is added to the query results as a separate column using as alias to provide the name of the new column. The next example uses the decimal casting function in a Where clause to ensure that the Active_Production_Lines column is treated as a number for filtering. Casting functions simply cast the data in the column to an appropriate datatype.

The last example uses the sample dataset for US legislators previously introduced in A Basic RAQL Query. It sorts legislators by state and district, using the decimalcasting function to ensure that their district is sorted numerically:

Datatype Information for Loaded Datasets

The plain functions used to cast the datatype of a column in the previous section point out one issue to be aware of for RAQL queries: in many cases, the RAQL Engine that runs the query has no datatype information for a given column. This is particularly true for data in CSV or XML formats. When datatype information is not available, the RAQL Engine considers column data to be untyped. For most purposes, this means that the data is treated as a string unless you explicitly cast it to another datatype.

Instead of using casting functions, you can provide datatype information for datasets in your mashup. See Providing Dataset Path and Datatype Information in a Schema for more information.

The Stream/Document Boundary

The examples so far have used an EMML statement to load the data as a stream, used RAQL extension statements to query the stream and then returned the query results as the mashup results. Currently, however, mashups cannot return streams as their results. As the following figure shows, streams must be converted to a document before being returned from the mashup.

You must also convert query result streams to documents to use EMML statements that are not RAQL extensions with query results. Any EMML statement that uses XPath expressions requires that the stream first be converted to a document.

Because of the volume of data, it is a good practice to avoid using the <display> statement with RAQL query results.

The <raql> statements used in earlier examples implicitly converted the query results to a document-type variable by using result as the output variable and not setting the streaming mode. You can have query results returned in a stream, when needed, by setting the stream attribute on the RAQL query. For example:

```
<!--performs query and returns results as a stream-->
<raql outputvariable="$queryresult" stream="true">
select firstname, lastname, state, chamber, party, gender
from congress where chamber='Senate'</raql>
```

In general, if a mashup statement or the receiving variable does not set stream='true', then the dataset will be treated as a document not a stream.

Use the Presto Analytics In-Memory Store to Store and Load Datasets

So far, the examples have actually not had a large set of data that would overload the memory available to Presto. The mashups have loaded all the data directly into the mashup and worked with it there without using Terracotta BigMemory or the Presto Analytics In-Memory Store.

The previous figure also illustrates the basic flow when you do need an in-memory store to handle large amounts of data:
1 Have a mashup that streams data from an original source, preprocesses this stream if needed, and then stores the stream in the Presto Analytics In-Memory Store.
2 In other mashups, load data previously stored in the Presto Analytics In-Memory Store and then perform further queries or analysis as needed.

Mashups that store datasets in the Presto Analytics In-Memory Store use the <storeto> EMML extension statement. Datasets are streamed to the in-memory store and stored with a unique key that other mashups can use to load this dataset. The dataset to store must also be the results of a RAQL query, although the query can simply select the entire dataset.

The following example mashup retrieves performance data for stocks from a URL using <directinvoke>. It uses a RAQL query to package all the data for storage with <raql> and includes stream='true' to treat the query results as a stream.

categorizes rows into sets based on the unique values of one or more columns. The analysis then is performed on each group defined by the analytic function(s) that are used in the query's Select clause. In this example, we group the stocks dataset that was stored in the Presto Analytics In-Memory Store in the previous section and determine the highest price for each stock symbol in each year. This mashup uses <loadfrom> to retrieve the stock dataset stream from the in-memory store and then issues the RAQL query.

```
<mashup name='storeStockDataset'
xmlns:xsi='http://www.w3.org/2001/XMLSchema-
instance'xsi:schemaLocation='http://www.openmashup.org/schemas/v1.0/EMML/../schemas/EMMLPrest
oSpec.xsd'
xmlns='http://www.openmashup.org/schemas/v1.0/EMML'
xmlns:macro='http://www.openmashup.org/schemas/v1.0/EMMLMacro'
xmlns:presto='http://www.jackbe.com/v1.0/EMMLPrestoExtensions'>
<output name='result' type='document' />
<variable name='diResult' type='document'/>
<variable name='stocksDS' type='document' />
<directinvoke method='GET' stream='true' outputvariable='diResult'
endpoint='http://raw.github.com/jackbe/raql/master/data/stocks.xml'
timeout='5' onerror='abort' />
<raql stream='true' outputvariable='stocksDS'>select * from diResult </raql>
<storeto key='stocks2011' variable='stocksDS' /></mashup>
```

The mashup finally stores the data selected in the query in the default in-memory store under the key stocks2011. This key is a simple string, but dataset keys can have different scopes or use other techniques to ensure they are unique. See Set Unique Keys for Datasets for more information.

This example did not filter or adjust the dataset in any way before storing it. But you can also use a RAQL query to preprocess the data you want to store in the Presto Analytics In-Memory Store. If you have multiple in-memory stores defined, you can also identify the store by name.

Once you store a dataset, other mashups can use the <loadfrom> EMML extension statement to load this dataset stream for queries and other processing. The following example shows a mashup to retrieve this stock dataset and return just the first 10 rows:

The Group By clause uses a list of column expressions to determine how rows are grouped. This can be as simple as one column, although it is quite common to group by two or more. Unique values from the combination of columns then determine which group a given row belongs to.

This query uses the plain function year( ) to extract the year for each row from the date and the max( ) analytic function in the Select clause to discover the highest price for all rows in each group. Because Group By returns a single row for each group, you must use aggregate analytic functions which perform calculations for all values in the current scope (group in this case) and return a single value.

RAQL has a set of built-in analytic functions that you can use in Group By clauses, or you can write and add your own

```
<mashup name='simpleStocksLoad'
xmlns:xsi='http://www.w3.org/2001/XMLSchema-
instance'xsi:schemaLocation='http://www.openmashup.org/schemas/v1.0/EMML/../schemas/EMMLPrest
oSpec.xsd'
xmlns='http://www.openmashup.org/schemas/v1.0/EMML'xmlns:macro='http://www.openmashup.org/sc
hemas/v1.0/EMMLMacro'
xmlns:presto='http://www.jackbe.com/v1.0/EMMLPrestoExtensions'>
<output name='result' type='document' /><variable name='stocks' type='document' stream='true' />
<loadfrom key='stocks2011' variable='stocks' onerror='abort'/>
<raql outputvariable='result'>select * from stocks limit 10 </raql></mashup>
```

This stored dataset, shown below, will be used in other examples in Getting Started to discuss Group By and Over query clauses for grouping and analysis:

Group and Analyze Rows

To analyze the data in a dataset stream you can use the Group By clause or the Over clause. Group By, as in SQL, analytical functions. See Built-In RAQL Functions for more information.

The results of this query using Group By, shown here, contain one row for each symbol+year combination:

The complete EMML for this mashup is:

```
<mashup name='stocksBySymbolYear'
xmlns:xsi='http://www.w3.org/2001/XMLSchema-
instance'xsi:schemaLocation='http://www.openmashup.org/schemas/v1.0/EMML/../schemas/EMMLPrest
oSpec.xsd'
xmlns='http://www.openmashup.org/schemas/v1.0/EMML'xmlns:macro='http://www.openmashup.org/sc
hemas/v1.0/EMMLMacro'
xmlns:presto='http://www.jackbe.com/v1.0/EMMLPrestoExtensions'>
```

```
<output name='result' type='document' /><variable name='stocks' type='document' stream='true' />
<loadfrom key='stocks2011' variable='stocks' onerror='abort'/>
<raql outputvariable='result'>select symbol, year(date) as year, max(high) as highestfrom stocks group by
symbol, year(date)order by symbol, year(date)
</raql></mashup>
```

Group and Analyze Rows with Row Detail

The other RAQL query clause that you can use to perform analysis is the Over clause. Like Group By, the Over clause segments the rows of the dataset into different groups, known as partitions. The primary differences between Group By and Over are:

All rows of the dataset that meet the conditions of the Where clause, if any, are returned from a query with an Over clause, rather than just one row per group.

You can also define windows within a partition. A window consists of the current row within a partition and the number of preceding and following rows you define.

Analytic functions are applied to either the full partition or to each window within the partition. The results of the analysis is added as a new column to either each row in the partition or to the current row for each window.

The results of analytic functions can also be running calculations, such as running totals, including the current row and all preceding rows.

Let's look at a simple partition example. The following mashup loads the stock dataset from the Presto Analytics In-Memory Store (stored earlier in Getting Started).

The Select clause selects each column that will be used in the calculation or in the definition of the partition (symbol, openand close).

Lastly, Select uses the built-in correlation analytic function to determine if there is a linear correlation between opening and closing prices for each symbol. The Over clause defines the partitions that this analytic function is applied to.

The Where clause filters the rows that are included in each partition to specific stock symbols based on a name pattern. With this dataset, this limits the results to the symbols DISH and NFLX.

The results of this query, shown below, include each row for the selected symbols and a new column, coefficient, that includes the result of this analysis function:

RAQL has a set of built-in analytic functions that you can use in Over clauses, or you can write and add your own analytic functions. See Built-In RAQL Functions for more information.

The complete EMML for this mashup is:

Where to go Next

This finishes the basic examples of RAQL queries and how to work with large datasets using Presto Analytics. For examples of other query techniques or advanced capabilities, such as dynamic queries, see RAQL Queries and Working with the Presto Analytics In-Memory Store.

For more information on the extensions that RAQL adds to EMML, see RAQL Extension to EMML Statements for Mashups.

RAQL Queries

The basics of using RAQL to query and analyze large datasets is discussed in Getting Started with Presto Analytics. For specific techniques on loading large datasets or using specific RAQL query clauses, see the links in these sections:

Techniques to Load Data
Select Techniques
From Techniques
Over Techniques
Where Techniques
Group By Techniques
Order By Techniques See also Escape Characters for RAQL Queries, RAQL Operators, RAQL Datatypes and Data Formats, Built-In RAQL Functions and Create and Add User-Defined Functions for RAQL Queries.

Techniques to Load Data
To load datasets from:
Files, see A Basic RAQL Query.
<directinvoke>, see Load Data with <directinvoke> and Filter Rows.
<sql>, see Load Data with <sql>.
<invoke>, see Load Data with <invoke>.
Snapshots, see Load Snapshot Data with <snapshot> or <raql>.
The in-memory store, see Load Data from the Presto Analytics In-Memory Store and Store Data in Presto Analytics In-Memory Store.
Select Techniques
Over Techniques
From Techniques
Where Techniques

```
<mashup name='stockPriceCorrelation'
xmlns:xsi='http://www.w3.org/2001/XMLSchema-
instance'xsi:schemaLocation='http://www.openmashup.org/schemas/v1.0/EMML/../schemas/EMMLPrest
oSpec.xsd'
xmlns='http://www.openmashup.org/schemas/v1.0/EMML'
xmlns:macro='http://www.openmashup.org/schemas/v1.0/EMMLMacro'
xmlns:presto='http://www.jackbe.com/v1.0/EMMLPrestoExtensions'>
<output name='result' type='document' />
<variable name='stocks' type='document' stream='true' />
<loadfrom key='stocks2011' variable='stocks' onerror='abort'/>
<raql outputvariable='result'>
select symbol, open, close,
correlation(open,close) over (partition by symbol) ascoefficient
from stocks
where symbol like 'D%' or symbol like 'N%'
</raql></mashup>
```

Group By Techniques
Order By Techniques
Explore RAQL with the Presto RAQL Explorer The RAQL Explorer lets you easily load large datasets from files or URLs and then play with different RAQL queries. You can save mashups based on queries you are happy with or open and update existing queries. See how to:

Open the Presto RAQL Explorer
Load Data and Run Queries
Save Queries as Mashups
Open/Manage Query Mashups
Open the Presto RAQL Explorer
To open the Presto Analytics Utility:
Login to Presto and click in the Presto main menu.
Load Data and Run Queries
To load a dataset with a compatible data format:
From a file, enter the file name in Data Source. The file must be accessible in the Mashup Server's classpath. This generates a <variable> statement in the mashup.
From a URL using the GET method, enter the URL in Data Source. This generates a <directinvoke> statement in the mashup.
Enter the Name to use for this dataset. Then enter a query and run it:
Enter the RAQL query in the field below the data source.
Click Run. The results for a successful query displays below in a grid.
Or open a query from the query list, to run queries you have already saved, and click Run.
Save Queries as Mashups Once you have useful results, you can save a query as a mashup. Simply click Save As and enter a name for the mashup. The new mashup appears in the list of queries. You can also find the mashup in Presto Hub search results, see it in Mashboard, Wires, the Mashup Editor or from other common links in Presto Hub.

The EMML code for mashup for the query shown previously is:
Example: Basic Query EMML

```
<mashup name="BasicQuery"
xmlns="http://www.openmashup.org/schemas/v1.0/EMML"
xmlns:macro="http://www.openmashup.org/schemas/v1.0/EMMLMacro"
xmlns:presto="http://www.jackbe.com/v1.0/EMMLPrestoExtensions"
xmlns:xsi="http://www.w3.org/2001/XMLSchema-
instance"xsi:schemaLocation="http://www.openmashup.org/schemas/v1.0/EMML/../schemas/EMMLPre
stoSpec.xsd" >
<operation name="Invoke">
<presto:presto-meta name="created-using">RUI</presto:prestometa>
<presto:presto-meta name="alias">congress</presto:prestometa>
<presto:presto-metaname="filename">legislators.xml</presto:presto-meta>
<output name="result" type="document"/><variable datafile="legislators.xml"
name="congress"stream="true" type="document"/>
<raql outputvariable="result">select firstname, lastname, state, chamber from congress</raql>
</operation></mashup>
```

And here are the result of the mashup shown in in XML:
Open/Manage Query Mashups Click a query from the query list to open it. Then click the Query Name to open the mashup's artifact page where you can:
Add views for the mashup
Create basic apps for the mashup
Manage information such as adding a description or tags or assigning a category for the mashup.
Grant permissions for other users to use the mashup.
See Running Mashables or Mashups and Other Tasks for more information and links.

Escape Characters for RAQL Queries
You enter RAQL queries as the value of the queryattribute on the <raql> element in a mashup. Because the query is in an XML file (the mashup), you must use the escaped form of the following XML delimiters when they appear in a RAQL query:
& use &
<use <
> use >
In addition, you may have to escape either the single or double quote mark when they appear in the query if that quote mark is used as the delimiters for the query attribute. The escaped forms are:
"use "
'use '
For example:
<raql query="select name,descr from myVar when descr like '%"Employee Rules"'" outputvariable="result"/>
Or:
<raql query='select name,descr from myVar when descr like "Arnold's %"' outputvariable="result"/>
Load Data with <sql>

You can also load a dataset directly from a database using the <sql> statement in EMML and then use RAQL to perform analysis. To query a dataset from a database you must:
1. Add a Datasource to Presto to Connect to the Database
2. Stream the Database Results and Query with RAQL
Add a Datasource to Presto to Connect to the Database If you do not already have a datasource defined in Presto for the database containing the data you want to work with, have your Presto administrator add one. See Add a Data Source for instructions.

The example shown in this topic is from a MySQL database with machine sensor data. Every half second various readings are added to this database for different devices. The dataset, shown below in XML format, includes the value (data_value) for a reading, a code (data_item_id) for the type of reading, a code for the device (device_id) and both a timestamp and a date/time in milliseconds when the reading was taken.

Stream the Database Results and Query with RAQL

Once you have an available datasource to connect to the database, use the <sql> statement in a mashup to query the database for the dataset and set streaming on with the streamattribute. The name of the datasource is set in the name attribute.

The following example queries for sensor data for a single type of reading across all devices. This also sets a fetchsize that is used to stream the dataset to Presto.

Use <raql> to further query and analyze the dataset just as you would with XML or CSV datasets. The results of the database query are already in a flat, table structure that matches the RAQL data model, so no additional path information is needed.

Query and Store to the Presto Analytics In-Memory Store

You can also query databases and then load the dataset directly into the in-memory store.

Load Data with <invoke>

You can load datasets, for analysis with RAQL, from any Presto mashable or mashup using <invoke>. Mashable or mashup results must be a document.

The following example loads results from the Yahoo local search mashable, one of the sample mashable you may register when you install Presto:

Some points to note with this example:

Streaming is not set for either the searchResults variable that holds the results of invoking Yahoo local search or for the <invoke> statement itself RAQL executes the query even though the result dataset is not streamed. To help clarify the exact XML elements in the mashable results that are considered a row for the RAQL query, the From clause uses both the variable name for the dataset and the full path to the element that is a row. Paths are sometimes useful to clarify rows when datasets are XML. See Dataset Paths, Names and Datatypes for more information.

The results for Yahoo local search and the results from the subsequent query are shown below:

All of the direct children of <Result> in the Yahoo local search results are accessible as columns in the RAQL query. Currently however, the following types of XML content are not accessible:

Ancestors of rows, such as <ResultSetMapUrl>
Descendants of row columns, such as <AverageRating>
Attributes, such as ResultSet/@TotalResultsAvailable
Load Snapshot Data with <snapshot> or <raql>
You can load snapshots of mashable or mashup results as dataset streams for analysis in RAQL queries using the:

This uses a local variable, named snapshots to hold the dataset stream which is only in scope for this RAQL query. See Load Snapshots Anonymously for an example.

Snapshot Queries

Queries to retrieve snapshots are SQL queries that require a Select, From and Where clause to define which snapshots to include in the dataset. You identify snapshots in the Where clause by one of these conditions:

- service='mashable ID or mashup ID' for snapshots of results for mashables or mashups with one operation. See Load Snapshots in a Named Variable for an example. service='mashable ID or mashup ID' and operation='operation ID' for snapshots of results for mashables that have multiple operations. createdtime=datetime, date or time for snapshots based on a time period. See Choose Snapshots by a Time Period for an example.
- job='job ID' for snapshots taken by a specific scheduled snapshot job. Job IDs include the mashable or mashup ID and the operation for that scheduled job plus the timestamp when the job was created. See Choose Snapshots for a Scheduled Job for an example.

You can, of course, use different operators to specify the conditions and functions as needed.

Load Snapshots in a Named Variable

This query creates a variable, named coffee, to stream the selected snapshots and then use in further RAQL queries. The snapshot query retrieves all snapshots for a single mashable, the sample Yahoo local search mashable identified by ID:

Once the dataset has been loaded, the RAQL query can act on the dataset or it can be stored in the Presto Analytics In-Memory Store.

The full EMML for this sample is:

```
<mashup
name="coffeeSnaps"xmlns="http://www.openmashup.org/schemas/v1.0/EMML"xmlns:macro="http://w
ww.openmashup.org/schemas/v1.0/EMMLMacro"xmlns:presto="http://wwwjackbe.com/v1.0/EMMLPr
estoExtensions"xmlns:xsi="http://www.w3.org/2001/XMLSchema-instance"
xsi:schemaLocation="http://www.openmashup.org/schemas/v1.0/EMML/../schemas/EMMLPrestoSpec.x
sd">
<operation name="Invoke"><output name="result" type="document"/><snapshot name="coffee"
query="select * from snapshots where
service='YahooLocalSearchREST' "/><raql outputvariable="result">select
Title,Address,City,State,Latitude,Longitude,Distancefrom coffee limit 60 </raql></operation></mashup>
```

<snapshot> EMML extension statement. This statement both creates a streaming variable to hold the snapshot dataset and executes the SQL query to retrieve snapshots from the Presto Snapshot Repository. See Load Snapshots in a Named Variable for an example.

<raql> EMML extension statement with the snapshotquery attribute to load the dataset.

Load Snapshots Anonymously

You can also load snapshots as a dataset into a local, anonymous variable with the snapshotquery attribute in <raql>. This example is identical to the named example shown previously except that the query to load snapshots in a dataset stream is specified on <raql>.

The full EMML for this sample is:

```
<mashup
name="coffeeAnonymousSnaps"xmlns="http://www.openmashup.org/schemas/v1.0/EMML"xmlns:macr
o="http://www.openmashup.org/schemas/v1.0/EMMLMacro"xmlns:presto="http://www.jackbe.com/v1.
0/EMMLPrestoExtensions"xmlns:xsi="http://www.w3.org/2001/XMLSchema-instance"
xsi:schemaLocation="http://www.openmashup.org/schemas/v1.0/EMML/../schemas/EMMLPrestoSpec.x
sd">
<operation name="Invoke"><output name="result" type="document"/><raql outputvariable="result"
snapshotquery="select * from snapshots where service ='YahooLocalSearchREST'"> select
Title,Address,City,State,Latitude,Longitude,Distancefrom snapshots limit
60</raql></operation></mashup>
```

Choose Snapshots by a Time Period

This example shows a snapshot query to select snapshots prior to a specific date:

Choose Snapshots for a Scheduled Job

This example shows a snapshot query based on a schedule snapshot job:

To find a snapshot job ID:

1 Open the mashable or mashup artifact page and run the operation for that snapshot job.
2 Click the Snapshots tab and search to find one snapshot for that job.
3 Open the snapshot and click Get XML to see the raw snapshot data in a new browser window or tab:

Select Distinct Values

Add the distinct keyword in Select clauses to retrieve only one row for each distinct value of a column. For example:

Alias Names for Columns or Calculations

You can change column names or supply column names for calculations using as in the Select clause. As example of changing a column name is shown here:

Examples of queries using as to provide column names for calculations are shown in Use Plain Functions to Update, Select or Sort Rows, Group and Analyze Rows and Group and Analyze Rows with Row Detail.

See also Alias Names for Columns or Calculations and Using Alias Names to Handle HTML Column Content Use Alias Names in Other Clauses The alias name for a column is defined in either the Select or Over clause. In general, you cannot use this alias to refer to the column in other RAQL clauses. This RAQL query, for example, will result in an error:

select Id, Descr, decimal(Qty) as Quantity from items whereQuantity>5

You can duplicate the original column, such as this example: select Id, Descr, decimal(Qty) as Quantity from items wheredecimal(Qty)>5

This can be cumbersome or in some cases impossible where the syntax is complex. The solution is to define the alias in a subquery so that you can refer to it in an outer query. For an example of this syntax, see From Subqueries.

Using Alias Names to Handle HTML Column Content

Columns in XML datasets can sometimes contain HTML markup, such as <img> tags. This is quite common in data from RSS or Atom web feeds. These HTML tags in column data can cause information to be missing from RAQLqueries or cause other problems because the tags are incorrectly interpreted. To overcome these errors, you can have RAQL escape the column content with HTML tags using CDATA sections by using a column alias in the following form: original-column-name as original-column-name_cdata This uses two understores (_) in the alias name.

With a column named title for example, the alias name to escape any HTML markup in the column content would be title_cdata.

Plain Functions on Select Columns

Plain functions can be used in any RAQL query clause. You may use any Presto built-in plain function (see Built-In RAQL Functions for a list) or user-defined plain functions that you or other Presto developers have added.

Simple examples of using plain functions in Select clauses are shown in Use Plain Functions to Update, Select or Sort Rows. Plain functions can also be nested, such as this example:

Dataset Paths, Names and Datatypes

When working with XML or CSV datasets, there are three potentially troublesome areas that you can improve with specific techniques:

The data model for XML datasets is frequently hierarchical, including additional metadata beyond the flat rows of interest to RAQL and adding additional layers of structure.

To simplify queries, RAQL automatically attempts to detect which elements in an XML dataset should be considered rows. This allows you to refer to rows in the dataset in RAQL queries using only the name of the variable containing the dataset, such as:

select firstname, lastname, state from congress

In some cases, this default may not be the dataset elements you actually need to work with or query results may be incomplete. You can override this default by Adding Paths to Clarify RAQL Row Detection or Providing Dataset Path and Datatype Information in a Schema.

In some cases, you may also need to alter column names to make them valid for RAQL or for EMML. See Valid Names for Columns and Paths for information.

With XML or CSV data, RAQL has no metadata about the datatypes for each column so the data is treated as a string. You can fill this gap, to simplify the need for casting functions, by Providing Dataset Path and Datatype Information in a Schema.

Adding Paths to Clarify RAQL Row Detection

If you need to override the default XML elements in a dataset that RAQL treats as rows, you can add a specific path to the elements you need to the variable in the From clause. For this example:

select firstname, lastname, statefrom congress/response/legislators/legislator

The variable is congressand /response/legislators/legislator is the path to the element for rows.

The path uses XPath syntax, starting with a slash (/) and separating each level of elements within the hierarchy with a slash. See Load Data with <invoke> for an example of a From clause using paths.

See also Providing Dataset Path and Datatype Information in a Schema for an alternative way to set path information.

Valid Names for Columns and Paths

Both RAQL and EMML have the following rules for valid column names and the names within paths to dataset rows:

Column names may contain letters, numbers and the underscore (_) character. They cannot contain:
 Spaces
 Common punctuation or special characters such as $, . (period) or: Column names must begin with a letter. A column name of "2000" is not a valid name, but "Y2000" is.

The names in paths used with XML datasets must follow XML name rules. They can contain letters, numbers, dashes (-) and underscores (_).

RAQL automatically fixes some of these problems. With CSV datasets, for example, RAQL will replace spaces with an underscore (_) in column names or change numeric column names to column_original-number.

Providing Dataset Path and Datatype Information in a Schema

Schemas provide three types of metadata to simplify or improve how RAQL queries interacts with XML or CSV datasets:

Path information to define what elements are rows for XML datasets. Datatype information for each column in the dataset for XML or CSV datasets. For columns that are a date type, this can also include the lexical format for the data. The delimiter character and whether the dataset has column names in the first row for CSV datasets.

See Dataset Schema Syntax for information on how to define a dataset schema.

The scope of this schema is based on where you define it: within a single mashup or as a global Presto attribute that can be used in any number of mashups. See Dataset Schemas Defined in Mashups and Global Dataset Schemas as Presto Attributes for information.

Dataset Schema Syntax

Schemas for datasets define a variable name for the schema, a set of columns with datatype and optional format information and an optional set of options for a dataset. The schema syntax is in the form:

define dataset variable-name (column-name datatype [format] [, column-name datatype [format], . . . ]) [with options option-name=value, option-name=value, . . . ]

For example:

define dataset stocks (symbol string,date datetime "yyyy-MM-dd",open decimal,close decimal,high decimal,low decimal,volume decimal) with options record="/stocks/stock"

See Valid RAQL Datatypes for the types you can use in dataset schemas.

The format metadata for date or time type columns accepts any lexical pattern that is valid for the Java SimpleDate class. For the most common patterns you can use, see the Date Formatter function for the Transformer block in Wires.

There are three different options you can specify:

record=/path/to/row identifies the elements within the dataset, starting from the root, that should be used as rows. This uses the same syntax as paths you specify in a From clause, excluding the variable name.

See Adding Paths to Clarify RAQL Row Detection for more information.

delimiter="character" identifies the delimiter used in CSV datasets when it is not the default delimiter (commas).
hasHeader=[true|false] indicates whether CSV datasets have column names as the first row. The default is true.

Dataset Schemas Defined in Mashups

You can declare a dataset schema in the mashup that loads a dataset using the EMML <variable> statement and a type of schema. For example:

In-Memory Store to Store and Load Datasets in Getting Started. This variable is then referenced in the variable named stocks, using a type of variable:stockType, that will hold the dataset once it is loaded. The type identifies the named variable containing the schema for this dataset.

The primary advantage of having the dataset defined is that RAQL queries now know datatypes so that filter conditions in Where, sorting criteria in Order By and functions or calculations in Over or Group By clauses work seamlessly without having to cast columns to the right datatype.

This is an example of this same mashup without schema information:

Sorting is defined on a numeric column, but because no datatype information is available from the original XML source the sort order in the result is wrong. But run the same query with schema information now available and the results are now sorted correctly:

Global Dataset Schemas as Presto Attributes

If a dataset will be used in many RAQL queries, you can define a schema for the dataset as a Presto global attribute that can be easily used in different mashups.

Presto administrators can create global attributes in the Admin Console. See Managing Presto Global Attributes for instructions. For dataset schemas, the value of the Presto global attribute is the full definition of the schema. In the following example:

The attribute name is yahooSearchSchema and the full definition of the schema is a single string as the attribute value.

Once you have the dataset schema defined as Presto global attribute you can use it in a mashup in a the <variable> statement with a name in the form global.attribute-name and a type of schema. This allows the mashup to use the global attribute to supply the schema definition. The following

```
<mashup xmlns:xsi='http://www.w3.org/2001/XMLSchema-instance'
xsi:schemaLocation='http://www.openmashup.org/schemas/v1.0/EMML/../schemas/EMMLPrestoSpec.x
sd'xmlns='http://www.openmashup.org/schemas/v1.0/EMML'xmlns:macro='http://www.openmashup.org
/schemas/v1.0/EMMLMacro'xmlns:presto='http://www.jackbe.com/v1.0/EMMLPrestoExtensions'name='
xmlSchema'>
<output name='result' type='document' />
<variable name="stockType" type="schema">define dataset stocks (symbol string,date datetime,
open decimal,close decimal,high decimal,low decimal,volume decimal,adjclose decimal)
</variable><variable name="stocks" type="variable:stockType"stream="true"/>
<directinvoke method='GET' stream='true' outputvariable='stocks'
endpoint='http://raw.github.com/jackbe/raql/master/data/stocks.xml'/>
<raql outputvariable='result'>select symbol, date, open, close, volume from stockswhere year(date) =
2011 order by close
</raql></mashup>
```

The variable named stockType defines a schema for the stock dataset introduced in Use the Presto Analytics example retrieves the schema defined above from the Presto global attribute named yahooSearchSchema:

```
<mashup name="globalAttrSchema"
xmlns="http://www.openmashup.org/schemas/v1.0/EMML"
xmlns:macro="http://www.openmashup.org/schemas/v1.0/EMMLMacro"
xmlns:presto="http://www.jackbe.com/v1.0/EMMLPrestoExtensions"
xmlns:xsi="http://www.w3.org/2001/XMLSchema-
instance"xsi:schemaLocation="http://www.openmashup.org/schemas/v1.0/EMML/../schemas/EMMLPre
stoSpec.xsd">
<output name="result" type="document"/>
<variable default="coffee" name="query" type="string"/>
```

```
<variable default="98102" name="zip" type="string"/>
<variable name="appid"
type="string"default=".kcC72DV34FYTpAGuwwbV8YGI.DsMBQ0RB9eZARS621ecnHq33c.g1XJV93
a64hrdaM3" />
<variable default="20" name="results" type="string"/>
<variable name="global.yahooSearchSchema" type="schema"/>
<variable name="searchResults" type="variable:global.yahooSearchSchema"/>
<invoke
inputvariables="appid,query,zip,results"operation="getData"outputvariable="searchResults"service="Ya
hooLocalSearchREST"/>
<raql outputvariable="result">select Title, Address, City, State, Phone, Latitude,Longitude,
Distancefrom searchResults </raql>
</mashup>
```

Then add the variable to hold the dataset and reference the schema variable using a typeof variable:global.attributename, that will hold the dataset once it is loaded. The typeidentifies the named variable containing the schema for this dataset, In this example, the variable searchResults has a type that pulls in the global.yahooSearchSchema global attribute containing the schema definition.

In this example query when no schema is used, the mashup shows results of a single row even though the query to Yahoo Local Search asked for up to 20 results:

When the schema is added, supplying specific path information to rows in Yahoo's results, the query now retrieves all 20 results:

From Subqueries

You can use subqueries in RAQL in the From clause only. The following example has two levels of subqueries based on the stocks dataset introduced in Use the Presto Analytics In-Memory Store to Store and Load Datasets in Getting Started.

The innermost query groups stocks data by year and quarter and calculates the average volume for each group. These results are used in the middle subquery to retrieve the previous quarter's average volume for each row and then calculate the percentage of change using a simple math expression.

Also of interest in the intermediate query is the use of the lag( )analytical function to add the previous quarter value to each row. The nvl( )plain function in the equation for the percentage of change handles the first row where the previous quarter value is null.

The final outer query then filters the results to include only those rows where the percentage of change is greater than 15%.

Use of Aliases and Subqueries

The example shown above also illustrates the use of subqueries to allow the use of aliases in the Where clause. The intermediate query defines prev_qtr as an alias. This alias is then used within that Select clause for the very next column, pct_change. This works because the alias reference is in the Select clause.

However, the use of pct_change in the Where clause of the outer query works only because pct_change exists from the subquery. If the query attempted to use this in Where in the intermediate query, it would fail with an error.

Limit the Rows Returned

You can use the limit keyword at the end of RAQL queries to limit the number of rows to return. One common use is to do an initial query that retrieves all columns, but a small number of rows to get a look that the dataset you are working with. For example:

Where Complex Conditions

Where clauses can use logical operators, comparison operators or arithmetic operators combined with parenthese to define complex conditions for queries. See RAQL Operators for a complete list of valid operators for Where clauses.

This topic provides examples of many of the common techniques you can use:

Multiple Required Conditions
Combining Logical Conditions
Comparing Dates or Numbers Calculations in Conditions
Negative Comparisons
Multiple Required Conditions Use the and logical operator to combine conditions when all are required:

Combining Logical Conditions

Use the or logical operator to define conditions where multiple matches are allowed. You can also combine and or to define more complex conditions. Use parenthese to indicate the appropriate precedence. This example selects senators from Texas, New York or California:

Comparing Dates or Numbers

You can use the common math comparison operators to compare numbers or dates. In many cases, you also need to cast column data to an appropriate datatype for the comparison to be successful.

This example selects legislators whose birthdate is Jan. 1, 1960 or later:

Calculations in Conditions

You can perform common arithmetic operations within the Where clause. Use parenthese to resolve any precedence issues with math operators.

This example selects plants based on the sum of currently active plants and plants under construction:

Negative Comparisons

For negative comparison, you can use the !=comparison operator or the not logical operator.

This example selects legislators whose birthdate is Jan. 1, 1960 or later and whose first name is not John: In many cases, however, the not logical operator is more flexible. This example query finds all senators whose last name does not begin with A or B:

Where Text Like Patterns

You can define filter conditions in the Where clause for string columns based on a simple matching pattern using the like pattern keyword. The Like pattern uses the % symbol as a wildcard to represent zero to any number of characters.

You can find an example of Like with a pattern using wildcards at the end in Group and Analyze Rows with Row Detail. This selects rows based on the stock symbol starting with either D % or N %.

You can also define patterns to match the end or middle of the string. For example:

Where in Sets

You can define filter conditions for string columns to match rows based on an enumerated set of values using the in ('value1', 'value2'[, . . . ]) keyword and set definition.

For example:

Parameters in Where Clauses RAQL does not currently support the :parm-name syntax in Where clauses to supply values for filter conditions from named parameters. You can, however, make RAQL queries dynamic by:

Supplying parameter values in Where clauses using Dynamic Mashup Expressions. This uses an EMML syntax in the form: {$parameter-name} To refer to input parameters or other variables defined in the mashup.

Building the entire query dynamically using the EMML <assign> element and variables or input parameters in the mashup. This technique is useful when you need to dynamically set different aliases, functions or entire query clauses.

See Creating Dynamic RAQL Queries for an example and more information. This example shows a simple Where clause where the threshold for a filter is supplied by an input parameter to the mashup:

Plain Functions in Where

Plain functions can be used in any RAQL query clause. You may use any Presto built-in plain function (see Built-In RAQL Functions for a list) or user-defined plain functions that you or other Presto developers have added.

You can find a simple example of using plain functions in a Where clause in Use Plain Functions to Update, Select or Sort Rows. See also Comparing Dates or Numbers for an example of using casting functions in Where clauses.

This example query uses nested functions to select manufacturing plants that are in the southern hemisphere, by comparing the latitude in the data:

Sort Directions and Multi-Level Sorts Sort Directions

By default, rows included in query results are sorted in ascending order based on the column expressions in the Order By clause. You can change the sort order for specific columns by using the desc or asc keywords in the column expression.

For example:

Character Sets and Sort Collations

For string values, sorting depends on both the character set of the text and the sort collation defined for that character set. For example, many European languages have upper-case and lower-case letters which are sorted separately. Many Asian languages use ideographs where this concept does not apply for sorting.

Both the character sets that RAQL can work with and the collations used for string sorting are defined by the version of Java used by the application server that Presto is hosted in.

Multi-Level Sorts

Multiple levels of sorting are defined simply by the columns included in the Order By column expression.

Columns are listed in the order for sorting separated by commas.

A simple, two-column sort is shown in Group and Analyze Rows in Getting Started. There is no specific limit for sorting levels, however. This example shows a three-level sort:

Plain Functions in Sorts

Plain functions can be used in any RAQL query clause. You may use any Presto built-in plain function (see Built-In RAQL Functions for a list) or user-defined plain functions that you or other Presto developers have added.

A simple example is shown here to sort by a column with dates:

Other examples of using plain functions in Order By clauses are shown in:

Sort Directions and Multi-Level Sorts
Use Plain Functions to Update, Select or Sort Rows
Presto Add-Ons
Presto Development and APIs
Presto Administration
Release Notes
Finding Videos, Additional Information and Support
About the Presto Library
Partitions and Windows The Group and Analyze Rows with Row Detail example in Getting Started introduced a simple partition using the Over clause to perform some analysis and add these results to each row in the dataset. This topic includes examples of:

Multi-Level Partitions
Windows as Relative Subsets Within Partitions
Windows to Show Selected Sibling Values
Multi-Level Partitions The column expression you use in a partition definition for Over clauses can use a list of multiple columns to define multi-level partitions, just like column expressions for Group By clauses. The following example segments US legislators into partitions for each chamber of Congress, state and political party to determine the number of legislators for each party in each state and legislative chamber:

Windows as Relative Subsets Within Partitions

Windows define subsets of rows within a partition that are relative to the current row based on row position.

You define windows by adding rows between to the partition definition, such as:

This example is centered where the number of preceding and following rows is equal. Windows can be asymmetric, using different numbers of preceding and following rows or omitting either. Analytic functions are applied to just those rows within the window based on the current row and the result is added to the current row.

Windows are useful for time-based datasets, although they are not limited to this. With time-based datasets, each row represents a different slice of data for a specific time. The following example uses windows with a time-based dataset to calculate moving averages:

The moving average is calculated over the rows in the window relative to the current row so each row potentially has a different moving average. Moving averages typically show a smoother trend for the column.

Windows to Show Selected Sibling Values

With window analytic functions, such as lag( ) or firstvalue ( ), you can select values for specific siblings for each row using window definitions. These functions return the column value for a sibling as shown in this example:

The lag( ) function selects the column value of the preceding sibling, while firstvalue( ) selects the column value of the first preceding sibling based on the partition or window definition. In this example, Prev is added to each row, using lag( ) to get the last sensor reading for the current row. First is also added to each row and gets the value 5 seconds previous, based on the window size (10 preceding rows) and readings every half second.

Here is an example of the results of this query:

Running Aggregates

You can get cumulative calculations, also known as running totals, using aggregate analytic functions over partitions or windows defined in Over clauses. Normally, aggregate analytic functions return a single value for all rows in a partition or window, such as the Multi-Level Partitions example. If you add an Order By clause within the partition or window definition, however, aggregate functions return cumulative values based on the current row and all previous rows in the partition or window.

The following example uses the sum( ) aggregate analytic function to provide a running total of volumes for the stocks dataset introduced in Use the Presto Analytics In-Memory Store to Store and Load Datasets in Getting Started. The dataset is segmented into partitions by symbol plus the year in the date column and then ordered by the same column expression.

The runningTotal column is added to each row and calculated as a running sum for each symbol+year combination.

Number or Rank Rows

You can use any of these built-in Presto analytic window functions to rank or number rows in partitions:

rownumber( )

rank( )

denserank( )

To support numbering you must include an Order By clause within the partition definition. The first column in the internal Order By clause is used to determine row or ranking order.

Rownumber, Rank and Denserank Example

This example uses all of these built-in numbering functions with the same partition (legislators within each chamber of the US congress) and sort order (ordered by state) to illustrate the different effects of each function:

rownumber( ) provides a simple sequential number for each row based on its position within the sorted partition.

rank( ) assigns the same index number to all rows that match one unique value for the first sort column in the Order By expression. Rows are sorted within the partition based on the full Order By expression. The actual rank numbers are not contiguous, however, skipping unused numbers to reflect the number of rows within that rank.

So in this example, the row number for the first legislator for Alabama is 2 and his rank is also 2. Rank for all the remaining legislators for Alabama remains at 2 although their row numbers continue to increment. When the first row for Arkansas is found, the row number increments to 9 and so does the rank, skipping ranks of 3-8.

denserank( ) also assigns the same index number to all rows that match one unique value for the first sort column in the Order By expression. Unlike rank( ) however, denserank( ) numbers are contiguous.

So in this example, the rank number for the first legislator from Arkansas is 9, matching his row number. The dense rank number is 3, being the next available ranking number.

Analytic Functions for Partitions and Windows

Analytic functions are used in Select clauses to perform analysis for partitions or windows defined in Over clauses. You can use either aggregate analytic or window analytic functions. See Built-In Analytic Functions: Aggregate and Window for a list of the Presto built-in analytic functions available to you. User-defined analytic functions may also be available.

For examples of analytic functions used in partitions or windows see:

Creating Dynamic RAQL Queries

At its simplest, dynamic queries use input parameters to provide the values used in Where clause conditions using dynamic mashup expressions. See Parameters in Where Clauses for an example.

But sometimes, you need more flexibility to make other clauses be dynamic. For these more demanding cases, you can build entire RAQL queries using the EMML <assign> statement, the concat( ) XPath function, and other EMML statements.

The following example builds the entire RAQL query based on an input parameter that chooses the time period to use for grouping stock volumes from the example dataset introduced in Getting Started.

This example uses that parameter to determine both the functions and aliases for fields to use in the Select clause as well as functions used in the Group By and Order By clauses. To do this, the mashup:

Defines am input parameter, queryScope, with the <input> statement to get the time period of interest. In this case it can be either quarter or month.

You can also use other EMML statements to provide the dynamic values needed.

Defines a variable, thisQuery, in a <variable> statement with a string datatype to hold the full query string.

You can also define the literal portions of the query in other string variables by assigning literal content as their default value.

Defines string variables for the alias names to be used in the query. Both volumeAlias and periodAlias have default values that correspond with the default value for queryScope.

These variables are altered to appropriate month names in the <if> statement when the queryScope parameter is set to month.

Combines the literal portions of the query with the dynamic portions using the <assign> statement and the concat( ) XPath function.

For the literal portions of the query, you can supply this directly as a string in the arguments to concat( ) as this example does. Or you can refer to other variables that contain this text.

You refer to variables in the function, or in other EMML statements, using $variablename.

Refers to the variable with the completed query, using $query-variable-name, in the query attribute of the <raql> statement.

Depending on the value of the queryScope parameter, the actual RAQL query that this mashup uses is either:

select symbol, year(date) as yr, quarter(date) as qtr,decimal (mean(volume)) as this_qtr from stocksgroup by year(date), quarter(date)order by year(date), quarter(date)

or select symbol, year(date) as yr, month(date) as month, decimal(mean(volume)) as this_month from stocksgroup by year(date), month(date)order by year(date), month(date)

RAQL Datatypes and Data Formats

Supported Data Formats for RAQL

RAQL can perform queries on datasets in the following formats:

CSV (comma-separated values):
a. The first line in a CSV dataset must identify column names for the data.
b. RAQL replaces any white space character in column names with an underscore (_).

For example, "First Name" becomes First Name.
Column names that are numeric have "column_" prepended to the name.
For example, "2010" becomes "column_2010". JDBC Result Sets: returned from databases when SQL queries or stored procedures are invoked.

XML: data must be well-formed. In addition, RAQL has the following limitations for XML data:

a. XML namespaces are ignored.

b. The structure of the XML should be flat, with a single set of repeating nodes (the rows) that contain a single level of elements (the columns) with simple content (text only). Data in any nodes that are ancestors of the repeating 'rows' is not accessible.

For example:

```
<records>
<record> <itemId>N2390</itemId><price>145.20</price> ...
</record>
<record> <itemId>G88</itemId><price>16.95</price> ...
</record> ...
</records>
```
o   Data in attributes may not be accessible in some situations.

Valid RAQL Datatypes

RAQL supports the following simple datatypes for column data:

JDBC results sets can contain columns with complex data, such as BLOB, CLOB or IMAGE, and these columns can be included in the query result. However, the query itself cannot access complex data to perform comparisons or calculations.

RAQL Operators Arithmetic Operators

You may use the standard arithmetic operators in RAQL expressions: +, −, * or /.

The division operator uses integer division unless the datatype of the data is decimal. You can set the datatype using casting functions or by additing datatype information in a schema. See Built-In Plain Functions and Providing Dataset Path and Datatype Information in a Schema for more information.

Comparison Operators

You may use the following comparison operators in Where clauses:

= or !=<or <=> or >=like: for matching text based on a pattern. Use % to indicate zero to any number of characters. For example: where lastname like 'A %' to find any last name starting with a capital A. in: to match values against an enumerated set of values defined within brackets. For example: where direction in ("N","NW","W")

Operators are not case sensitive. Text comparisons to patterns or enumerations are case sensitive.

Logical Operators

You may use the following logical operators in Where clauses:

and or not

Operators are not case sensitive. You can use parentheses to build complex logical expressions such as: where (service level in ("gold","silver")) and (rating>=or overdue <100).

Built-In RAQL Functions

Presto provides both Built-In Plain Functions and Built-In Analytic Functions: Aggregate and Window that you may use in RAQL queries. You can also define and add your own plain or analytic functions to RAQL. See Create and Add User-Defined Functions for RAQL Queries for instructions.

Built-In Plain Functions

Plain functions can be used in Select, Over, Where, Order By and Group By clauses in RAQL queries. They typically either cast (change) the datatype of column values, extract part of the values or transform values in some way.

Plain functions are applied individually to each value in the column specified without access to values in other rows.

Built-In Analytic Functions: Aggregate and Window

Analytic functions most commonly perform calculations using sets of rows within a dataset. This may be the entire dataset or specific sets of rows defined as groups, partitions or windows.

There are two types of analytic functions:

Aggregate analytic functions: use all rows in the dataset, group, partition or window to perform a calculation and return a single value. For example, sumadds the values of all rows in the current scope.

Aggregate analytic functions can be be used in the Select clause of RAQL queries:

a. To return a single value for each group defined in a Group By clause.

b. To return a single value for each partition or each window defined in an Over clause. This single value is added to each row in the partition or window. You can also use aggregate analytic functions to return running calculations for partitions or windows defined in an Over clause.

c. To return a single value for the entire dataset if no group definition or partition definition is specified.

Window analytic functions: use some of the rows in a partition or window to perform a calculation and return a value for each row. Typically, this uses rows that are relative to the current row, such as firstvalueor rownumber.

You must include an Over clause in queries that use window analytic functions. This defines the partitions or windows used by the function.

Create and Add User-Defined Functions for RAQL Queries

You can define your own functions to use in RAQL queries in addition to the Built-In RAQL Functions.

User-defined functions are Java classes that you write, configure and deploy to Presto.

User-defined function can be:

Plain functions: used in Select, Over, Where, Order By and Group By clauses in RAQL queries. They typically either cast (change) the datatype of column values, extract part of the values or transform values in some way.

Plain functions are applied individually to each value in the column specified without access to values in other rows.

Window analytic functions: use some of the rows in a partition or window to perform a calculation and return a value for each row. Typically, this uses rows that are relative to the current row, such as firstvalueor rownumber.

You must include an Over clause in queries that use window analytic functions. This defines the partitions or windows used by the function.

Aggregate analytic functions: use all rows in the dataset, group, partition or window to perform a calculation and return a single value. For example, sumadds the values of all rows in the current scope. Aggregate analytic functions can be used in the Select clause of RAQL queries:

a. To return a single value for each group defined in a Group By clause.
b. To return a single value for each partition or each window defined in an Over clause. This single value is added to each row in the partition or window. You can also use aggregate analytic functions to return running calculations for partitions or windows defined in an Over clause.
c. To return a single value for the entire dataset if no group definition or partition definition is specified.

```
package com.MyOrg.raqlUdf
/*
* Sample class in a library of plain user-defined functions for
RAQL*/
import org.raql.funcs.RaqlFunc;public class MyStringFuncs {
@RaqlFuncpublic static String replace(String val, String oldStr,String newStr) (return val.replace(oldStr, newStr);}
@RaqlFunc(name="capitalize")public static String upper(String val) (return val.toUpperCase( );}
}
```

To write user-defined functions for RAQL, you should Set Up Your Development Environment. Then:
Write Plain Functions for RAQL Write Window Analytic Functions for RAQL Write Aggregate Analytic Functions for RAQL Configure, Compile, Deploy and Test User-Defined Functions
Set Up Your Development Environment
To get started, you need:
The latest Java Development Kit 6. See JDK1.6 to download and install this, if needed. A folder for your user-defined function library with this structure:
User-defined functions are packaged and deployed as named libraries in Presto. The library name also uniquely defines your user-defined functions from built-in functions or user-defined functions in other libraries that have been deployed in Presto. Library names must match the name of the library folder containing your source code.
Valid library names must be unique for a Mashup Server. They can contain letters, numbers, dashes (-) or underscores (_).
The name analytics is reserved for the Presto UDF function library. See External UDF Library Deployment Folder for more information.
You can organize user-defined functions however you need. User-defined functions can be packaged in multiple libraries. Each library can contain one or more Java packages. Each package can contain multiple classes. For plain functions, each class can contain multiple functions. For analytic functions, each function is packaged as a class.
  JAR files for any third-party Java libraries that your user-defined functions depend on, placed in the library-name/lib folder.
  Update your classpath to include the JAR file for RAQL, web-apps-home/presto/WEBINF/lib/raql.jar, and any third party JARs you add to library-name/lib. For an example, see Configure, Compile, Deploy and Test User-Defined Functions.
It is not a good practice to copy web-apps-home/presto/WEB-INF/lib/raql.jar to your library-name/lib folder to simplify the classpath. This can cause errors when you deploy your user-defined function library. See Configure, Compile, Deploy and Test User-Defined Functions for more information.
Before you compile, deploy and test your user-defined functions, you will also need a library configuration file (lib.json). We will cover these requirements later, in Configure, Compile, Deploy and Test User-Defined Functions.
Write Plain Functions for RAQL
Plain functions are simple Java classes that:
Import the org.raql.funcs.RaqlFuncannotation interface. Implement functions as public static class methods that return primitive types. Include annotations to identify which methods are RAQL functions.
This example contains two plain functions, replaceand capitalize:

The @RaqlFunc annotation identifies which methods should be associated with RAQL functions. If you omit the name parameter, the name of the method becomes the name of the RAQL function within this UDF library. Use (name="alias") to use a different name for the function from the method name. Using annotations to configure the methods for user-define functions in RAQL is a best practice.
You can, however, skip the annotations in your Java classes and instead provide configuration that maps methods to user-defined functions in the lib.jsonconfiguration file for your UDF libraries. See External UDF Library Deployment Folder for more information.
Configure, Compile, Deploy and Test User-Defined Functions
To compile and deploy user-defined functions, you must:
1 Add a folder with the name of your library under the default external UDF library deployment folder presto-install/raql-udfs.
2 This new folder is the root deployment folder for your library. For example:
3 /Presto3.6/raql-udfs/MyOrgRaqlLib
4 Complete configuration that identifies the Java packages for this library in the lib.json file and place it in the root deployment folder for your library, created in the previous step.
5 This file uses the JSON format to identify packages that contain user-defined functions for a library. For example:

```
{
"exportedFuncs": {
"anotatedPackages":[
"com.MyOrg.raqlUdf",
"com.MyOrg.aggregate.raqlUdf",
"com.MyOrg.window.raqlUdf" ],
"classes": [ ]
}
}
```

This example identifies three packages for this library. The classes property must be present in configuration, but can be an empty array like this example. The RAQL Engine will search each class within the identified packages for function annotations to find the functions to add.
You can also optionally identify classes, functions and methods in this configuration. See UDF Library Configuration for more information.

Compile your Java class with user-defined functions, being sure to include the raqljar file and any third-party libraries you used in this class in the classpath. For example:

For Windows:
% JAVA_HOME %/bin/javac-classpathc:\Presto3.6\appserver\apache-tomcat7.0.27\webapps\presto\WEB-INF\lib\raql.jar-d classessrc\com\MyOrg\raqlUdf\MyStringFuncsjava For Linux, OS/X or UNIX:
javac-classpath/Applications/Presto3.6/appserver/apache-tomcat7.0.27/webapps/presto/WEB-INF/lib/raql.jar-d classessrc/com/MyOrg/raqlUdf/MyString-Funcs.java This will add the compiled class to the classes folder in your development folder for this library. Deploy the classes and any third-party libraries for this library to the Mashup Server. Copy the following folders to the root deployment folder for your library:

a. o /classes folder and all contents
b. o /lib folder and all contents

Restart the Mashup Server. See Starting and Stopping the Presto® Mashup Server for instructions. Use the RAQL Explorer or write mashups that use these new user-defined functions to test them. You refer to user-defined functions in the form library-name.functionname(arg[, . . . ) to identify both the library name and the function name. For example:

UDF Library Configuration

The lib.json file contains configuration that identifies the Java packages with user-defined functions for RAQL. It can also optionally contain configuration that identifies the specific classes and methods in these packages and the function names to map to methods.

The following example includes method and function mapping configuration along with the required package configuration information:

Write Window Analytic Functions for RAQL

With window analytic functions, each function is a single class that extends the org.raql.funcs.WindowAnalytic-Functionbase class in the Presto RAQL User Defined Function API. This API uses a map/reduce paradigm to handle large datasets.

Window analytic functions, unlike plain functions, have access to all rows, or tuples within the current partition or window which they can use to perform calculations. Unlike aggregate analytic functions, however, they provide a different calculation for each tuple.

To accomplish this, window analytic functions use the following methods:

initialize(FunctionContext fnctxt): is optional. The FunctionContext stores the result for the function and any interim state needed. Use this method to initialize the result, interim state or to validate function arguments.

map(FunctionContext fnctxt, Tuple current, List<Tuple> window): window analytic functions must implement this method with the core logic of the function and store the result of the calculation in the FunctionContext.

The reduce method is not used as each tuple has a result that is specific to that row.

You set up your development environment for window analytic functions just the same as for plain functions. See Set Up Your Development Environment for details.

We're going to use two examples. The first example shows the basics of a window analytics function and how to use the function context to track state and set the function result. This example implements the built-in analytics.discretize method.

To create this function, you:
1. Construct and Initialize the Window Analytic Function Class
2. Implement the map Method for the Window Analytic Function

```
{
"exportedFuncs": {
"anotatedPackages":["com.MyOrg.raqlUdf","com.MyOrg.aggregate.raqlUdf","com.MyOrg.window.raql
Udf" ],
"classes":[{ "name": "com.MyOrg.raqlUDF.MyStringFuncs","funcs":[ {"method": "replace" },{ "name":
"capitalize", "method": "upper"} ] },{ "name": "com.MyOrg.aggRaqlUdf.KurtosisFunction","funcs": [
{"name":"kurtosis" ] }]}}
```

External UDF Library Deployment Folder

A default external UDF Library Deployment folder is created when you install Presto at prestoinstall/raql-udfs where you can deploy all your user-define functions. The Presto analytics library with built-in Presto functions is also automatically deployed in this folder.

In clustered environments, you may want to create a shared external folder for Presto configuration and move all user-defined functions, including the Presto built-in function library, to this shared location for all members of the cluster. The structure would look something like this:

If you move user-defined functions from the default UDF Library Deployment folder, you must also update an environmental variable for each Mashup Server:

1 Edit the presto-install/prestoenv.bat file, for Windows systems, or the prestoinstall/prestoenv.sh file for Linux, OS/X or UNIX systems in any text editor of your choice.

2 Update the path for the presto.raql.udf.libsDir system property to point to the new shared location.

3 Save your changes and restart the Mashup Server. See Starting and Stopping the Presto® Mashup Server for instructions.

And Configure, Compile, Deploy and Test User-Defined Functions. For the complete code, see Complete Discretize Example.

The second example implements the Presto built-in lead function which illustrates techniques to Work with Specific Tuples in Window Calculations using the current position of a tuple.

Construct and Initialize the Window Analytic Function Class

This example is available in the sample user-defined functions package at TBD. It implements the built-in discretize (Number column, double min, double, max, intbinCount) function which assigns each tuple to one of a number of discrete bins based on their values in a column.

Your window analytic function class imports the classes in the Presto RAQL User Defined Function API and extends the org.raql.funcs.WindowAnalyticFunctionabstract base class:

```
package com.raql.samples;
import java.io.*;import java.nio.*;import java.util.*;
import org.raql.funcs.RaqlFunc;
import org.raql.funcs.WindowAnalyticFunction;import
```

```
org.raql.funcs.AggregateAnalyticFunction;import
org.raql.funcs.FunctionContext;import org.raql.Tuple;import
org.raql.types.TypeConv;
import java.math.BigDecimal;
@RaqlFunc(name="discretize")public class DiscretizeFunction
extendsWindowAnalyticFunction<Integer> {
@Override
public void initialize(FunctionContext<Integer> fnCtx) {
// validate args
Object arg1 = fnCtx.getArg(1);
if ( ! (arg1 instanceofNumber ) )
throw new RuntimeException("discretize 2nd argument mustbe
integer : " + arg1 + " is of type "
+arg1.getClass( ).getSimpleName( ) );
}}
```

This example overrides the default implementation for initializeto validate the function's argument. It uses the getArg method in FunctionContext to access these arguments. The FunctionContext object is also used to track the result and interim state for the function.

Implement the map Method for the Window Analytic Function

You implement the map method with the core logic for your window analytic function. This has three arguments: the FunctionContext with the current state and results for the function, the current Tuplein this partition or window, and a List of all the Tuples in this partition or window.

```
...
@Override
public void map(FunctionContext<Integer> fnCtx, Tuple
current,List<Tuple> window) {
Double minV, maxV;
```

```
if ( fnCtx.isFirstWindowTuple( ) ) {
// first-record in window partition => initialize min,maxvalues for window
    List<Double> dValues = new ArrayList<Double>( );
for ( Tuple tuple : window ) {double dval = evalArgAsDouble(fnCtx, 0,
tuple);
dValues.add(dval);}minV = Collections.min(dValues);
fnCtx.putInterimValue("minV" , minV);
maxV = Collections.max(dValues);
fnCtx.putInterimValue("maxV", maxV);
}
else {
minV = (Double)fnCtx.getInterimValue("minV");
maxV = (Double)fnCtx.getInterimValue("maxV");
}
int resultV = discretize(TypeConv.toDoubleV2(fnCtx.getArg(0)),minV,
maxV, TypeConv.toInt(
fnCtx.getArg(1) ) );
fnCtx.setResult(resultV);
}/* http://stackoverflow.com/questions/10793034/discretizationdilema
*/double normalize(double value,
double min, double max) (return (value − min)/(max − min);}
int clamp(int v, int lbound, int ubound) (if ( v < lbound ) v = lbound;if
( v > ubound ) v = ubound;return
v;}
int discretize(double value, double min, double max, intbinCount) {int
discreteValue = (int) (binCount *
normalize(value, min,max));return clamp(discreteValue, 0, binCount −
1);}
}
```

Some common techniques to keep in mind in this example:

The use of the setInterimValueand getInterimValue methods on the function context for interim state properties. These are Java properties of any type needed for the function.

The use of the setResult method on the function context to store the results for the function, for the current tuple. This is the value that RAQL adds to the current row of the dataset.

Complete Discretize Example

```
package com.raql.samples;
import java.io.*;import java.nio.*;import java.util.*;
import org.raql.funcs.RaqlFunc;import org.raql.funcs.WindowAnalyticFunction;import
org.raql.funcs.AggregateAnalyticFunction;import org.raql.funcs.FunctionContext;import
org.raql.Tuple;import org.raql.types.TypeConv;
import java.math.BigDecimal;@RaqlFunc(name="discretize")public class DiscretizeFunction
extendsWindowAnalyticFunction<Integer> {
@Overridepublic void initialize(FunctionContext<Integer> fnCtx) {
// validate argsObject arg1 = fnCtx.getArg(1);if ( ! (arg1 instanceofNumber ) )
throw new RuntimeException("discretize 2nd argument mustbe integer : " + arg1 + " is of type "
+arg1.getClass( ).getSimpleName( ) );
}
@Overridepublic void map(FunctionContext<Integer> fnCtx, Tuple current,
List<Tuple> window) {Double minV, maxV;if ( fnCtx.isFirstWindowTuple( ) ) {// first-record in window
partition => initialize min,max
values for window
    List<Double> dValues = new ArrayList<Double>( );
for ( Tuple tuple : window ) {double dval = evalArgAsDouble(fnCtx, 0, tuple);
dValues.add(dval);}minV = Collections.min(dValues);fnCtx.putInterimValue("minV", minV );
maxV = Collections.max(dValues);
fnCtx.putInterimValue("maxV", maxV);
}
else {
minV = (Double)fnCtx.getInterimValue("minV");
maxV = (Double)fnCtx.getInterimValue("maxV");
}
int resultV = discretize(TypeConv.toDoubleV2(fnCtx.getArg(0)),minV, maxV, TypeConv.toInt(
fnCtx.getArg(l) ) );fnCtx.setResult(resultV);
}/* http://stackoverflow.com/questions/10793034/discretizationdilema */double normalize(double value,
double min, double max) (return (value − min) / (max − mm);}
```

-continued

```
int clamp(int v, int lbound, int ubound) (if ( v < lbound ) v = lbound;if ( v > ubound ) v = ubound;return v;}
int discretize(double value, double min, double max, intbinCount) {int discreteValue = (int) (binCount * normalize(value, min,max));return clamp(discreteValue, 0, binCount − 1);}
}
```

Work with Specific Tuples in Window Calculations

This example is a window analytics function similar to the Presto built-in leadfunction which returns the value for the specified column for a row (a tuple) that follows the current row by a specific offset:

To accomplish this, aggregate analytic functions use the following methods:

initialize(FunctionContext fnctxt): is optional. The FunctionContext stores the result for the function and any interim state needed. Use this method to initialize the result, interim state or to validate function arguments.

```
package com.MyOrg.winRaqlUdf;
import java.io.*;importjava.nio.*;import java.util.*;
import org.raql.funcs.RaqlFunc; importorg.raql.funcs.BaseAnalyticFunction;
import org.raql.funcs.WindowAnalyticFunction;import org.raql.funcs.AggregateAnalyticFunction;import org.raql.funcs.FunctionContext;import org.raql.Tuple;import org.raql.types.TypeConv;
import java.math.BigDecimal;@RaqlFunc(name="myLead")public class MyLeadFunction
extends WindowAnalyticFunction<Object> {
@Override
public void map(FunctionContext<Object> fnCtx, Tuple current,List<Tuple> window) {
    org.raql.Expr.EE.Expr leadColumn = fnCtx.getArgExpr(0);
int leadOffset = 1;if ( fnCtx.getArgsSize( ) > 1 )leadOffset = ((Number)fnCtx.getArg(1)).intValue( );
int windowIdx = fnCtx.getCurrentPos( ) + leadOffset;
if ( (fnCtx.getCurrentPos( ) < window.size( )−1) && (windowIdx< window.size( ) ) )
fnCtx.setResult(evalExpr(leadColumn,window.get(windowIdx)));
else fnCtx.setResult(null);
}
```

To work with a specific tuple relative to the current tuple, this function uses the getCurrentPos method in the function context to get the position of the current tuple within the partition or window. It uses the size method to get the number of tuples in the partition or window.

This example also uses the evalExpr method inherited from the BaseAnalyticFunctionabstract class to evaluate the column passed as an argument for the tuple relative to the current tuple specified by the offset. This base class contains several helper methods to evaluate expressions that can be useful for window analytics.

Write Aggregate Analytic Functions for RAQL

Aggregate analytic functions are a single class that extends the org.raql.funcs.AggregateAnalyticFunction base class in the Presto RAQL User Defined Function API. This API uses a map/reduce paradigm to handle large datasets.

Like window analytic functions, aggregate analytic functions have access to all rows, or tuples in the current group, partition or window. They perform an aggregate calculation that uses all tuples to return a single result. Depending on where they are used in RAQL queries, this single result may be all the query returns or it may be returned as a column on every row.

map(FunctionContext fnctxt, Tuple current, List<Tuple> window): to perform any intermediate calculations required and store them in the FunctionContext.

reduce(FunctionContext fnctxt): to perform the core logic for the aggregate calculation based on interim calculations performed in the map method.

You set up your development environment for aggregate analytic functions just the same as for plain functions. See Set Up Your Development Environment for details. Write the class for your aggregate analytic function and then Configure, Compile, Deploy and Test User-Defined Functions.

We're going to use two examples. The first example shows the basics of an aggregate analytics function, how to use the function context to track state and then perform the final calculation. My Average Aggregate Example is an implementation of the built-in avg(Number column)method.

The second example, Kurtosis Using a Third Party Library, uses methods in the Apache Commons Math library to calculate the kurtosis for a column. This is an example of how to use the mapmethod to restructure column values and store them as an interim value in the function context to use then with statistics implementations from a third-party library.

My Average Aggregate Example

This example is available in the sample user-defined function package at TBD. It implements an aggregate function myavg(Number column) similar to the Presto built-in average function:

```
package com.raql.samples;
import java.io.*;import java.nio.*;import java.util.*;import org.raql.funcs.RaqlFunc;import
org.raql.funcs.WindowAnalyticFunction;import org.raql.funcs.AggregateAnalyticFunction;import
org.raql.funcs.FunctionContext;import org.raql.Tuple;import org.raql.types.TypeConv;
import java.math.BigDecimal;import java.math.RoundingMode;@RaqlFunc(name="myavg")public class
MyAvgAggFunction extendsAggregateAnalyticFunction<Object> {
/* user defined class & constants */
static class AvgState {Object cumulativeSum = new Long(0);long cumulativeCount = 0;
}
private final String COMPUTE_STATE = "ComputeState";
@Overridepublic void initialize(FunctionContext<Object> fnCtx) {
/* initialize compute state */
fnCtx.putInterimValue(COMPUTE_STATE, new AvgState( ));
}
/* map accumulates aggregate sum & count in interim state
(AvgState) */@Overridepublic void map(FunctionContext<Object> fnCtx, Tuple current,
List<Tuple> window) {Object atom, arg0 = null;try {
arg0 = fnCtx.getArg(0);atom = TypeConv.toNumber(arg0);
}catch(java.text.ParseException e) {throw new RuntimeException("Illegal numeric quantity : " +arg0 );}
AvgState state =(AvgState)fnCtx.getInterimValue(COMPUTE_STATE);
Object cumulativeSum = state.cumulativeSum;
if ( atom instanceof Long ) {if ( cumulativeSum instanceof Long )cumulativeSum =
((Long)cumulativeSum).longValue( ) +((Long)atom).longValue( );else cumulativeSum =
add((Long)atom,(BigDecimal)cumulativeSum);
}else (if ( cumulativeSum instanceof Long )cumulativeSum =
add((Long)cumulativeSum,(BigDecimal)atom);else cumulativeSum =
((BigDecimal)cumulativeSum).add((BigDecimal)atom);}
state, cumulative Sum = cumulativeSum;
state.cumulativeCount++;
fnCtx.putInterimValue(COMPUTE_STATE, state);
}
private BigDecimal add(Long op1, BigDecimal op2) {
return op2.add(BigDecimal.valueOf(op1.longValue( )));
}
/* reduce( ) computes average = cumulativeSum /cumulativeCount; */
@Override
public void reduce(FunctionContext<Object> fnCtx) {
AvgState state =(AvgState)fnCtx.getInterimValue(COMPUTE_STATE);
if ( state, cumulative Sum instanceof BigDecimal ) {
fnCtx.setResult
(((BigDecimal)state.cumulativeSum).divide(BigDecimal.valueOf(state.cumulativeCount), 2,
RoundingMode.HALF_UP) );
}
else {
fnCtx.setResult(BigDecimal.valueOf((Long)state.cumulativeSum).divide(BigDecimal.valueOf(state.cum
ulativeCount), 2,RoundingMode.HALF_UP));
}}
}
```

This example illustrates several common techniques for aggregate analytic functions:
- Overriding the initialize(FunctionContext fnctxt) method to reset interim values, such as the cumulative sum and cumulative count.
- The use of the setInterimValueand getInterimValue methods in the mapmethod to update interim state in the FunctionContext. In this case, this updates both the cumulative sum and the cumulate count which will eventually be used to perform the final aggregate calculation.
- The use of the reduce method to perform the final aggregate calculation using only the interim state held in the FunctionContext.

Kurtos is Using a Third Party Library

Kurtosis is a statistical measure of 'peakedness' in the values for a dataset compared to a normal distribution. This indicates how closely the distribution matches the rounded bell shape of a normal distribution.

In this example, we will use an implementation of kurtosis provided in the Apache Commons Math library, version 2.2. The method to calculate kurtosis, in the DescriptiveStatistics class in the Apache Library, expects the values to use as the probability distribution to be primitive values in an array.

To support this, the map method builds an array from the column values for tuples in a group, partition or window. The reduce method then uses this array to perform the calculation. As always, the function context object is used to hold state for both methods.

```
package com.MyOrg.aggRaqlUdf;
import java.io.*;importjava.nio.*;import java.util.*;
importorg.apache.commons.math.stat.descriptive.DescriptiveStatistics;
import org.raql.funcs.RaqlFunc;import org.raql.funcs.BaseAnalyticFunction;import
org.raql.funcs.WindowAnalyticFunction;import org.raql.funcs.AggregateAnalyticFunction;
import org.raql.funcs.FunctionContext;import org.raql.Tuple;import org.raql.types.TypeConv;import
java.math.BigDecimal;
```

-continued

```
@RaqlFunc(name="kurtosis")public class KurtosisFunction extendsAggregateAnalyticFunction<Object>
{
@Overridepublic void initialize(FunctionContext<Object> fnCtx) (fnCtx.setResult( new
ArrayList<Double>( ));}
     public void map(FunctionContext<Object> fnCtx, Tuple current,
List<Tuple> window) {Object atom = TypeConv.toNumberV2(fnCtx.getArg(0));List<Double> v =
(List<Double>)fnCtx.getResult( );if ( atom instanceof Number )
v.add( ( (Number)atom).doubleValue( ) );
else if ( atom instanceof BigDecimal )
v.add ( ((BigDecimal)atom).doubleValue( ) );
}
protected double [ ] toPrimitives(List<Double> values) {double [ ] pd = new double[values.size( )];int
i=0;for ( Double d : values ) {
pd[i++] = d;}return pd;
}
public void reduce(FunctionContext<Object> fnCtx) {
DescriptiveStatistics ds = new DescriptiveStatistics(toPrimitives(( List<Double>)fnCtx.getResult( ) )
);
if ( Double.valueOf ( ds.getKurtosis( ) ).isNaN( ) )fnCtx.setResult(0.0);else
fnCtx.setResult(ds.getKurtosis( ));}}
```

Points to keep in mind in this example:

The map method uses the FunctionContext to get the values for the column passed to the function, convert these values appropriately and add them to a ListArray stored in the result in FunctionContext.

map also uses convenience methods in TypeConv to cast values for the column to an appropriate numeric type. This method also throws a RuntimeExceptionfor casting errors which ensures the UDF function fails correctly in a RAQL query.

The reduce method gets the array with all values for the column for this group, partition or window. It converts these values to primitive values in a simple array and uses methods in the DescriptiveStatistics class from Apache Commons Math to calculate the kurtosis. The final calculation for the group, partition or window is then set as the FunctionContext result.

To compile this example, you must include the Apache Commons Math library, version 2.2, in the classpath. You may include the jar file for this library in the lib folder for the user-defined function library. This specific library is also used in Presto, so you also simply add the jar file for this library to the classpath. See Statistics and Analytics Third-Party Libraries for information.

Statistics and Analytics Third-Party Libraries

Presto Analytics includes the following third-party libraries with many common statistics and machine learning algorithms:

Apache Commons Mathematics Library, version 2.2. Include web-appshome/presto/WEB-INF/lib/commons-match-2.2.jar in the classpath. Apache Mahout Library, version 0.7. Include these jar files in the class path:

web-apps-home/presto/WEB-INF/lib/hadoop-core-1.1.1.jar web-apps-home/presto/WEB-INF/lib/mahout-core-0.7.jar web-apps-home/presto/WEB-INF/lib/mahout-core-0.7-job.jar web-apps-home/presto/WEB-INF/lib/mahout-integration-0.7.jar web-apps-home/presto/WEB-INF/lib/mahout-math-0.7.jar User-defined analytics functions can leverage these libraries directly. Simply include the associated jar file in the classpath along with the jar for RAQL when you compile your UDF classes.

Working with the Presto Analytics In-Memory Store

This in-memory store allows you to store large datasets for quick access or retrieve them for analysis using RAQL. Getting Started with Presto Analytics includes some very simple examples of how to do this.

You can also control the scope of key names, append data to an existing key, configure the partition size used for streaming to name just a few techniques when you store or load datasets. For more information, see Store Data in Presto Analytics In-Memory Store and Load Data from the Presto Analytics In-Memory Store.

Initial Memory Configuration and Performance

Installation for Presto optimizes memory configuration and configuration for the Presto Analytics In-Memory Store based on:

The available memory on your computer. License limits for the Presto Analytics In-Memory Store and Presto caches. The architecture (32-bit or 64-bit) supported by Java (the JRE or JDK) on your computer. A base configuration for a small web application.

In many cases, this base configuration is sufficient to work with Presto in development environments with individual user computers. You may need to adjust this configuration to provide adequate performance with large datasets, when you install Presto in staging or production environments or when you receive your full Presto license. See About BigMemory and the Presto Analytics In-Memory Store for an overview and links to configuration tasks.

About BigMemory and the Presto Analytics In-Memory Store

In-Memory Dataset Management

By default, the Presto Analytics In-Memory Store stores datasets in memory with no expiration, so they remain in memory indefinitely. The store uses no persistence, however, so Mashup Server restarts clear all datasets.

The In-Memory Store also does not overflow to disk if the datasets you store exceed available memory. If the memory allocated to BigMemory is full, datasets are evicted based on least recent use to make room for new datasets.

Memory Management

BigMemory manages memory and data for both the Presto Analytics In-Memory Store and all Presto caches. The initial configuration for memory when you install Presto may use only heap memory or it may also include off-heap memory as shown in the following figure:

Heap memory is configured for the JVM and used by Presto and the application server that hosts Presto.

If available memory is less than the recommended minimum for Presto Analytics, then heap memory is also used for the In-Memory Store and Presto caches.

For minimum recommendations for Presto and Presto Analytics, see System and Software Requirements.

Off-heap memory is direct memory that is not controlled by the JVM. This can improve performance if available memory is more than the recommended minimum for Presto Analytics. Off-heap memory can be allocated and used by BigMemory for the In-Memory Store and Presto caches.

Remaining direct memory is used by the operating system and other applications running on the local host, such as browsers or other applications.

This is a high-level summary of memory use and storage tiers available with BigMemory. For more detailed information, see the Configuration> Storage Tiers section in BigMemory documentation.

Local Memory Limitations

The amount of local memory that you can use for the Presto Analytics In-Memory Store plus Presto caches depends on the following:

The Presto license limits combined local heap and local off-heap memory to 8G during the evaluation period.

This limitation also applies to full Presto licenses that do not include the Presto Real-time Analytics Add-On with BigMemory.

If your full Presto license includes the Presto Real-time Analytics Add-On with BigMemory, you can extend available memory by deploying BigMemory on one or more external servers.

The architecture (32-bit or 64-bit) for Java:

With 32-bit architectures, Java has specific limitations accessing memory over 2G.

Because of this, 32-bit architectures are not appropriate for use with Presto Analytics and the In-Memory Store.

With 64-bit architectures, Java access to memory is unlimited.

Deployment and Configuration Options for BigMemory

When you have your full Presto license, you can deploy BigMemory to separate, additional servers to:

Easily scale additions to memory using BigMemory clusters or server arrays.

Support failover with mirror servers for better reliability.

Support distributed caching, required when Presto is deployed in clusters.

Have a management console for BigMemory or take advantage of other features that may be useful for production environments.

You can deploy one BigMemory server, optionally with a mirror, that is paired with one Mashup Server such as the following figure:

Presto uses heap memory from the local host as usual. Some local host memory is allocated for off-heap which is combined with a much large allocation of off-heap memory from the host for BigMemory.

The data for the Presto Analytics In-Memory Store and Presto caches are distributed across both local and external off-heap memory that is managed by BigMemory. And of course some memory is allocated for the operating system or other applications on both the Presto and BigMemory hosts.

You can also install BigMemory in a cluster to provide more memory capacity or support failover and other high availability features.

This is a high-level summary of memory use and storage tiers available with BigMemory. For more detailed information, see the Configuration> Storage Tiers section in BigMemory documentation.

How you update memory allocations, and optionally apply Presto and BigMemory licenses, depends on how Presto and BigMemory are deployed:

For deployments to the local Presto host only, see Memory Configuration for the Mashup Server and Managing Your Presto License Status. To extend memory for a stand-alone Presto host, see Move the BigMemory Add-On to Separate Server(s). See Distributed Caching for Presto Clusters for instructions on deploying BigMemory servers along with Presto clusters.

Move the BigMemory Add-On to Separate Server(s)

When you receive your full Presto license, you can move the BigMemory Add-On to one or more separate hosts to provide additional memory or added reliability using mirrors to handle failover. You must also update both your Presto license and the BigMemory license for Presto.

To upgrade the licenses, install a BigMemory server and update configuration:

1 When you receive an updated Presto license, apply the Presto license. See Managing Your Presto License Status for instructions.

2 Download the trial version of BigMemory Max from Terracotta and install this on a separate host. If needed, install BigMemory on a second host to use as a mirror. See BigMemory Getting Started for more information.

3 Put the BigMemory license update you received from JackBe in step 1 in a folder that is shared with both the host for Presto and the host(s) for BigMemory servers and add this folder to the classpath for Presto and for BigMemory.

4 Update the startup scripts for both BigMemory and Presto to identify the path to the BigMemory license using the following Java system property:

-Dcom.tc.productkey.path=path-to-shared-folder/terracottalicense.key

For Presto, edit the presto-install/prestoenv.bat file for Windows systems or the prestoinstall/prestoenv.sh file for Linux, OS/X or UNIX systems. This property is defined in the BIGMEM_OPTS environmental variable.

For BigMemory, see Operations topics in BigMemory documentation for more information on how to update startup properties.

1 Update BigMemory configuration for the BigMemory server and mirror, if any, that you installed earlier. See Terracotta Server Array topics in BigMemory documentation for information on the files and configuration properties to update.

2 Edit the web-apps-home/presto/WEB-INF/classes/ehcache.xml file for Presto in a text editor of your choice to configure Presto to work with the external BigMemory server.

3 Find the line in ehcache.xml with <terracottaConfig> that is commented out like this:

<!--<terracottaConfig url="localhost:9510"/>-->

Remove the comment markers and change the url attribute to the host (or IP address) and port for the BigMemory server(s) you installed. For example:

<terracottaConfig url="tcHost1:9510"/>

Find the <cache> element with a name of RAQL_DATA_CACHE in ehcache.xml. Remove the comment markers around the line inside this cache with <terracotta/>. This configuration should now look something like this:

```
<cache name="RAQL_DATA_CACHE">
<terracotta/>
</cache> ...
```

This <terracotta> element allows the In-Memory Store to use memory in both the local host and the BigMemory host. This combined memory is managed by the external BigMemory server.

For more information on the <terracotta> element, see Distributed Configuration topics in BigMemory documentation.

Save these changes to ehcache.xml.

Start the BigMemory server(s) that you installed. See Operations topics in BigMemory documentation for more information.

If needed, adjust memory configuration for the local Presto host. See Memory Configuration for the Mashup Server for instructions.

Restart Presto. See Starting and Stopping the Presto® Mashup Server for instructions.

Store Data in Presto Analytics In-Memory Store

The basics of storing a dataset in the Presto Analytics In-Memory Store is covered in Use the Presto Analytics In-Memory Store to Store and Load Datasets in Getting Started. You can also:

Set Unique Keys for Datasets
Set the Stream Partition Size
Append Query Results
Use Multiple, Named In-Memory Stores
Set Unique Keys for Datasets Keys for datasets must be unique strings within each In-Memory Store whether the store serves one Mashup Server or a cluster. If two mashups store different datasets under the same key name, the dataset is overwritten each time one of the mashups is run.

Although the In-Memory Store has a single namespace, RAQL supports two namespace 'layers' separated by 'scope'. You specify what namespace layer is used to find or create a key with the scope attribute in <storeto> and <loadfrom> statements.

The scopes you may use for keys are:

Global Keys use a scope of global. This is also the default key namespace that is used if you omit the scope when you store or load datasets. No prefix is added to global keys. User Keys use user as their scope. This defines a private namespace for each user as their username is added as a prefix to user keys.

Global Keys

Global keys have no prefix added to the key name you set, so the name of each key must be unique. This is the default namespace if you omit a scope. Or you can set scope="global" to put a key in this namespace.

The keys used in Use the Presto Analytics In-Memory Store to Store and Load Datasets, Group and Analyze Rows and Group and Analyze Rows with Row Detail are all examples of global key names that do not include a domain name.

User Keys

The user namespace for keys prepends the Presto username of the current user to the key name when a key is created in the In-Memory Store. Thus keys are automatically unique.

Each user can load data from the key with their username as prefix, but no other user can, so this namespace is also private to each user. To use this namespace, set scope="user" in mashups that store a dataset stream and the corresponding mashups that load data from that key.

This namespace is useful if the mashup that stores the dataset allows a user to dynamically preprocess the dataset before it is stored, based on input parameters. This ensures that each user sees the data they wanted in later analysis. For example:

```
<mashup name='dynamicStoreStockDataset'
xmlns:xsi='http://www.w3.org/2001/XMLSchema-
instance'xsi:schemaLocation='http://www.openmashup.org/schemas/v1.0/EMML/../schemas/EMMLPrestoSpec.xsd'
xmlns='http://www.openmashup.org/schemas/v1.0/EMML'xmlns:macro='http://www.openmashup.org/schemas/v1.0/EMMLMacro'xmlns:presto='http://www.jackbe.com/v1.0/EMMLPrestoExtensions'>
<output name='result' type='document' /><input name='stockList' type='string'/><variable
name='diResult' type='document'/><variable name='stocksDS' type='document' /><variable
name='finalQuery' type='string'/>
<assign outputvariable='$finalQuery'concat('select * from diResult where symbol in [',$stockList,']')/>
<directinvoke endpoint='http://raw.github.com/jackbe/raql/master/data/stocks.xml'method='GET'
stream='true' outputvariable='diResult'/>
<raql stream='true' outputvariable='stocksDS' query='$finalQuery'/>
<storeto key='stocks2011' scope='user' variable='stocksDS' /></mashup>
```

This mashup allows users to set the specific stock symbols they want to work with using an input parameter for the mashup. Each time this mashup is run by a different user, it retrieves the dataset, filters it by the symbols that user has chosen and stores this in the In-Memory Store with a key in the form username_stocks2011.

If the dataset is not customized when it is stored, however, the user key namespace can result in multiple copies of exactly the same data for different users.

Set the Stream Partition Size

Datasets are streamed in sets of rows, with the maximum number of rows defined as the partition size. For more information on streaming partitions, see Stream Partitions.

You set the partition size in <storeto> when you store the dataset in the In-Memory Store. If no partition size is set, RAQL uses a default partition size of 10,000 rows. The following example sets the partition size for this dataset to 20,000 rows:

```
<mashup name='storeStocksPartitions'
xmlns:xsi='http://www.w3.org/2001/XMLSchema-
instance'xsi:schemaLocation='http://www.openmashup.org/schemas/v1.0/EMML/../schemas/EMMLPrest
oSpec.xsd'
xmlns='http://www.openmashup.org/schemas/v1.0/EMML'xmlns:macro='http://www.openmashup.org/sc
hemas/v1.0/EMMLMacro'xmlns:presto='http://www.jackbe.com/v1.0/EMMLPrestoExtensions'>
<output name='result' type='document' /><variable name='diResult' type='document'/><variable
name='stocksDS' type='document' />
<directinvoke endpoint='http://raw.github.com/jackbe/raql/master/data/stocks.xml'method='GET'
stream='true' outputvariable='diResult' />
<raql stream='true' outputvariable='stocksDS'>select * from diResult </raql>
<storeto key='stocks2011' variable='stocksDS' partitionsize='20000' /></mashup>
```

Load Data from the Presto Analytics In-Memory Store

To load data from the Presto Analytics In-Memory Store, datasets must first be stored using <storeto> (see Store Data in Presto Analytics In-Memory Store for more information and examples). The basics of using <loadfrom> to load a dataset stored with a global key are covered in Group and Analyze Rows and Group and Analyze Rows with Row Detail in Getting Started.

You can also:

Load Datasets with User Keys Load Dataset Rows for Specific Time Periods Load Datasets from a Named In-Memory Store Handle Missing In-Memory Keys Load Datasets with User Keys To load datasets that are stored in the In-Memory Store with a global key, you simply enter the key name in <loadfrom>. No scope information is required. Group and Analyze Rows and Group and Analyze Rows with Row Detail in Getting Started are examples of loading datasets from global keys. Keys with a user scope have a username added as a prefix to the key value. To get the current user's username for this prefix, you must set the scope attribute so that Presto can find the correct key, such as the example:

```
<mashup name='loadUserStockDataset'
xmlns:xsi='http://www.w3.org/2001/XMLSchema-
instance'xsi:schemaLocation='http://www.openmashup.org/schemas/v1.0/EMML/../schemas/EMMLPrest
oSpec.xsd'
xmlns='http://www.openmashup.org/schemas/v1.0/EMML'xmlns:macro='http://www.openmashup.org/sc
hemas/v1.0/EMMLMacro'xmlns:presto='http://www.jackbe.com/v1.0/EMMLPrestoExtensions'>
<output name='result' type='document' /><variable name='stocksDS' type='document' stream='true'/>
<loadfrom key='stocks2011' scope='user' variable='stocksDS' />
<raql outputvariable='result' >select symbol, high, low from stocksDS</raql></mashup>
```

In this case, the key exists only if the current user has also run the mashup that stores the key.

Load Dataset Rows for Specific Time Periods

In many cases, analysis is only interested in the most recent updates to a dataset. You can load specific rows from a dataset stream stored in the In-Memory Store based on a time interval starting back from now, using the period attribute in the <loadfrom> statement.

You specify the recent time period for the rows you want to load as a number of seconds, minutes, hours, days or weeks. See <loadfrom> for the syntax to use.

The following example works in conjunction with the example shown in Append Query Results to illustrate the effect of retrieving dataset rows based on a recent time period:

It retrieves all rows from the storeAppendPlants in-memory key that were added within the last 10 minutes and then selects the list of distinct countries within those rows. The following examples of results for different time periods shows which rows were loaded:

To try this example, use the following EMML code for this loadLastPeriod mashup and open it in Mashup Editor. Also create or open the storeAppend mashup shown in Append Query Results. Then run storeAppend. Wait a few seconds or minutes, update the value of period in loadLastPeriod and run it to see which rows it loads.

```
<mashup xmlns:xsi='http://www.w3.org/2001/XMLSchema-
instance'xsi:schemaLocation='http://www.openmashup.org/schemas/v1.0/EMML/../schemas/EMMLPrest
oSpec.xsd'
xmlns='http://www.openmashup.org/schemas/v1.0/EMML'xmlns:macro='http://www.openmashup.org/sc
hemas/v1.0/EMMLMacro'xmlns:presto='http://www.jackbe.com/v1.0/EMMLPrestoExtensions'name='lo
```

-continued

```
adLastPeriod'> <output name='result' type='document' /><variable name="last30Minutes"
type="document" stream="true"/><loadfrom key='storeAppendPlants' variable='last30Minutes'
period='7m' /><raql outputvariable='result'>
select distinct Country from last30Minutes</raql></mashup>
```

Load Datasets from a Named In-Memory Store

If the dataset you need to load has been stored in an In-Memory Store that is not the default, you must identify which In-Memory Store holds the dataset by name using the cache attribute in the <loadfrom> statement.

The Presto Analytics In-Memory Store can be split into multiple stores with unique names to manage specific datasets differently.

The following example loads earthquake data from a USGS Atom feed that is stored in an In-Memory Store named RAQL_NONCRITICAL_DATA:

```
<mashup name="loadFromName"
xmlns="http://www.openmashup.org/schemas/v1.0/EMML"
xmlns:macro="http://www.openmashup.org/schemas/v1.0/EMMLMacro"
xmlns:presto="http://www.jackbe.com/v1.0/EMMLPrestoExtensions"
xmlns:xsi="http://www.w3.org/2001/XMLSchema-
instance"xsi:schemaLocation="http://www.openmashup.org/schemas/v1.0/EMML/../schemas/EMMLPre
stoSpec.xsd">
<operation name="Invoke">
<output name="result" type="document"/>
<variable name="quakesDS" stream="true" type="document"/>
<loadfrom key="M4dot5Week" scope="mashup"
cache="RAQL_NONCRITICAL_DATA"variable="quakesDS"/>
<raql outputvariable="result">select title, date, lat, long from quakesDS</raql>
</operation></mashup>
```

If you do not specify the name of an In-Memory Store in <loadfrom>, Presto Analytics looks for the dataset in the default In-Memory Store as expected.

Handle Missing In-Memory Keys

Errors can occur in mashups that load datasets from an In-Memory Store key if the key is missing unexpectedly. One way to avoid this is to have a mashup optionally store the dataset if it is not present using the <try> and <catch> statements in EMML. These EMML statements allow you to test to see if the key exists and handle both cases appropriately.

The following example uses a memorization pattern to try to load the key and if not found then store the key and work with the data.

This example uses data from an Atom feed from the USGS on recent earthquakes.

The EMML and RAQL code for this single mashup is shown here:

```
<mashup xmlns:xsi='http://www.w3.org/2001/XMLSchema-instance'
xsi:schemaLocation='http://www.openmashup.org/schemas/v1.0/EMML/../schemas/EM
MLPrestoSpec.xsd'xmlns='http://www.openmashup.org/schemas/v1.0/EMML'xmlns:macro='http://www.
openmashup.org/schemas/v1.0/EMMLMacro'xmlns:presto='http://www.jackbe.com/v1.0/EMMLPrestoE
xtensions'name='tryLoadCatch'>
<output name='result' type='document' /><variable name="quakesDS" stream="true" type="document"/>
<try><loadfrom key="quakeLastWeek" scope="mashup" variable="quakesDS"/><raql
outputvariable="result">
select title, date, lat, long from quakesDS</raql><display message="data key found"/>
<catch type='EMMLException e'><variable name="quakeSrc" type="document"/><variable
name="quakeStore" stream="true" type="document"/>
<directinvoke endpoint='http://earthquake.usgs.gov/earthquakes/feed/atom/4.5/week/method='GET'
stream='true' outputvariable='quakeSrc'/>
<raql outputvariable="quakeStore" stream="true">select id, title, date, link.href as link,split_part(point,'
',' 1') as lat,split_part(point,' ',' 2') as long,concat(category.term,' magnitude') as mag from
quakeSrc/feed/entry
</raql>
<storeto key="quakeLastWeek" scope="mashup" variable="quakeStore"/>
<display message="key stored"/>
<loadfrom key="quakeLastWeek" scope="mashup" variable="quakesDS"/><raql
outputvariable="result">select title, date, lat, long from quakesDS</raql></catch></try>
</mashup>
```

The <try> loop tries to retrieve the dataset stream from the mashup-scoped key. If the key already exists, it executes a simple RAQL query.

The <catch> portion of the loop will catch the exception thrown if the key is not found in the <try> loop. It then invoke the REST mashable, query the results and load the dataset to the mashup-scoped key.

If you run this mashup in the Mashup Editor, look at the Console section to see the messages output from the <display statements in the <try> and <catch> loops. The first time you run the mashup you should see the <catch> message. Run it again and you should see the message from <try>.

Add Named In-Memory Stores for Presto Analytics

Presto Analytics has a single In-Memory Store by default. You can define additional In-Memory Stores with unique names to use with Presto Analytics. This can be useful if you need to manage memory for specific datasets differently.

Steps:
1. In a text editor of your choice, open the ehcache.xml file from the presto-config folder.
2. This file defines the caches that Presto uses as well as the In-Memory Store for Presto Analytics.
3. Find the <cache> element with RAQL_DATA_CACHE as the name.
   Copy and paste this element as another cache.
   Change the value of the name element to the name you want to use for an additional In-Memory Store.
   Change any other configuration for this new In-Memory Store as needed. For information, see BigMemory documentation.
   Repeat these steps if you need more In-Memory Stores and save your changes.
4. Restart the Mashup Server to apply these changes. See Starting and Stopping the Presto® Mashup Server for instructions.
5. Use this named In-Memory Store in mashups to store and load datasets for Presto Analytics. See Use Multiple, Named In-Memory Stores and Load Datasets from a Named In-Memory Store for examples.

What is claimed is:

1. A system for continuous analytics run against a combination of static and real-time data, comprising:
   an in-memory storage; and
   a processor, the processor being operably connected to the in-memory storage, the processor being programmed to:
      receive, in a query engine, from a client, a query that indicates an analytic function to be performed on a combination of static data and real-time data;
      in response to receipt of the query that indicates the analytic function to be performed on the combination of static data and real-time data:
         load the in-memory storage from a first source external to the processor with data which was stored as the static data;
         at the same time that the in-memory storage is already loaded with the static data, continuously receive real-time data as it is being generated by a second source external to the processor, the real-time data being ephemeral;
      in response to the real-time data which is continuously received subsequent to receipt of the query:
         temporally correlate the real-time data with existing static data in the in-memory storage, and
      continuously run the analytic function from the query against, in combination, both the real-time data which is being continuously received and the existing static data which is loaded in the in-memory storage and which is temporally correlated to the real-time data, to continuously produce a result of the analytic function, wherein the first source of the static data is from a different source than the second source of the real-time data,
      the combination of each of the static data and the real-time data is referenced in the query as a single variable, and
      the processor is further configured to determine a source of the data, the data being referenced in the single variable, and to process the data differently based on the source of the data;
      wherein the combination of static and real-time data indicated in the query which is received and on which the analytic function is performed, indicates at least one of: (1) a combination of different types of static data, (2) combinations of different types of real-time data, and (3) combinations of different types of static data and real-time data;
      wherein the processor is further configured to: normalize the at least one of: (1) the combination of different types of static data, (2) the combinations of different types of real-time data, and (3) the combinations of different types of static data and real-time data, into normalized data which is stored in the in-memory storage in the form of a tuple; and
      wherein the analytic function which is run is applied against the normalized data stored in the in-memory storage.

2. The system of claim 1, wherein the static data has a data structure different from the real-time data.

3. The system of claim 1, wherein at least one of the static data and the real-time data is originated by the first or second sources respectively in a hierarchical format.

4. The system of claim 1, wherein the processor is further configured to:
   analyze the real-time data and the existing static data which are temporally correlated, in a moving window of the real-time data, as streaming data; and
   discard the real-time data which has been analyzed and temporally correlated to make room for the real-time data which continues to be received.

5. The system of claim 1, wherein the processor is further configured to store information about a running calculation being made by the analytic function, to re-use the information about the running calculation in continuously performing the analytic function with the real-time data which is newly received.

6. The system of claim 1, wherein the processor is further configured to
   store the result of the analytic function in the in-memory storage as an analytic cube for use in subsequent queries together with a time stamp in association with the result of the analytic function, as part of the analytic cube; and
   in response to a subsequent analytic function for the combination of static data and real-time data having a time period which includes the time stamp, re-use the result of the analytic function from the in-memory storage based on the time stamp associated therewith, as a source of data for the subsequent analytic function.

7. A method for continuous analytics run against a combination of static and real-time data, comprising:
   receiving, in a query engine, from a client, a query that indicates an analytic function to be performed on a combination of static data and real-time data;
   in response to receiving the query that indicates the analytic function to be performed on the combination of static data and real-time data:

loading, by a processor, an in-memory storage from a first source external to the processor with data which was stored as the static data;

at the same time that the in-memory storage is already loaded with the static data, continuously receiving, by the processor, real-time data as it is being generated by a second source external to the processor, the real-time data being ephemeral;

in response to the real-time data which is continuously received subsequent to receipt of the query:

temporally correlating, by the processor, the real-time data with existing static data in the in-memory storage; and continuously running, by the processor, the analytic function from the query against, in combination, both the real-time data which is being continuously received and the existing static data which is loaded in the in-memory storage and which is temporally correlated to the real-time data, to continuously produce a result of the analytic function, wherein the first source of the static data is from a different source than the second source of the real-time data, the combination of each of the static data and the real-time data is referenced in the query as a single variable, and further comprising determining, by the processor, a source of the data, the data being referenced in the single variable; and processing, by the processor, the data differently based on the source of the data;

wherein the combination of static and real-time data indicated in the query which is received and on which the analytic function is performed, indicates at least one of: (1) a combination of different types of static data, (2) combinations of different types of real-time data, and (3) combinations of different types of static data and real-time data; and further comprising:

normalizing, by the processor, the at least one of: (1) the combination of different types of static data, (2) the combinations of different types of real-time data, and (3) the combinations of different types of static data and real-time data, into normalized data which is stored in the in-memory storage in the form of a tuple; and wherein the analytic function which is run is applied against the normalized data stored in the in-memory storage.

8. The method of claim 7, wherein the static data has a data structure different from the real-time data.

9. The method of claim 7, wherein at least one of the static data and the real-time data is originated by the first or second sources respectively in a hierarchical format.

10. The method of claim 7, further comprising analyzing the real-time data and the existing static data which are temporally correlated, in a moving window of the real-time data, as streaming data; and discarding the real-time data which has been analyzed and temporally correlated to make room for the real-time data which continues to be received.

11. The method of claim 7, further comprising storing information about a running calculation being made by the analytic function, and re-using the information about the running calculation in continuously performing the analytic function with the real-time data which is newly received.

12. The method of claim 7, further comprising storing the result of the analytic function in the in-memory storage as an analytic cube for use in subsequent queries together with a time stamp in association with the result of the analytic function, as part of the analytic cube; and in response to a subsequent analytic function for the combination of static data and real-time data having a time period which includes the time stamp, re-using the result of the analytic function from the in-memory storage based on the time stamp associated therewith, as a source of data for the subsequent analytic function.

13. A method for continuous analytics run against a combination of static and real-time data, comprising:

by a processor, in response to a command that indicates an analytic function to be performed on at least real-time data:

continuously receiving, by the processor, real-time data as it is being generated by a source external to the processor, the real-time data being ephemeral;

in response to the real-time data which is continuously received subsequent to the command:

continuously running, by the processor, the analytic function from the command against the at least real-time data which is being continuously received, to continuously produce a result of the analytic function;

storing, by the processor, the result of the analytic function in an in-memory storage as an analytic cube for use in subsequent calculations together with a time stamp in association with the result of the analytic function, as part of the analytic cube; and in response to a subsequent calculation for the real-time data having a time period which includes the time stamp, re-using, by the processor, the result of the analytic function from the in-memory storage based on the time stamp associated therewith, together with the real-time data which is newly received, as a source of data for the subsequent calculation, wherein the command indicates both the analytic function to be performed, and a combination of static data and real-time data on which to perform the analytic function, a source of the static data is different from a source of the real-time data, the combination of each of the static data and the real-time data is referenced in the command as a single variable, and further comprising determining, by the processor, a source of the data being analyzed by the analytic function, the data being referenced in the single variable; and processing, by the processor, the data differently based on the source of the data;

wherein the combination of static and real-time data indicated in the query which is received and on which the analytic function is performed, indicates at least one of: (1) a combination of different types of static data, (2) combinations of different types of real-time data, and (3) combinations of different types of static data and real-time data;

further comprising, by the processor, normalizing the at least one of: (1) the combination of different types of static data, (2) the combinations of different types of real-time data, and (3) the combinations of different types of static data and real-time data, into normalized data which is stored in the in-memory storage in the form of a tuple; and wherein the analytic function which is run is applied against the normalized data stored in the in-memory storage.

14. The method of claim 13, wherein the subsequent calculation is a running calculation being made by the analytic function, further comprising continuously performing the analytic function.

15. The method of claim 13, wherein the subsequent calculation is made in response to a subsequent command that indicates a second analytic function to be performed on the at least real-time data.

* * * * *

UNITED STATES PATENT AND TRADEMARK OFFICE
CERTIFICATE OF CORRECTION

PATENT NO. : 8,977,600 B2  
APPLICATION NO. : 14/286266  
DATED : March 10, 2015  
INVENTOR(S) : Crupi et al.

Page 1 of 1

It is certified that error appears in the above-identified patent and that said Letters Patent is hereby corrected as shown below:

In the Specification

Column 13, line 34, change "aunningAvgPricePerHouf" to --'RunningAvgPricePerHour'--.

Column 18, line 4, change "and/pr" to --and/or--.

Column 59, cancel all the text in lines 14-19 beginning with "To accomplish this" and ending with "validate function arguments."; in column 59, after line 64 insert the following text:

--To accomplish this, aggregate analytic functions use the following methods:
initialize(FunctionContext fnctxt): is optional. The FunctionContext stores the result for the function and any interim state needed. Use this method to initialize the result, interim state or to validate function arguments.--.

Signed and Sealed this
Twenty-seventh Day of October, 2015

Michelle K. Lee
*Director of the United States Patent and Trademark Office*